Figure 1:
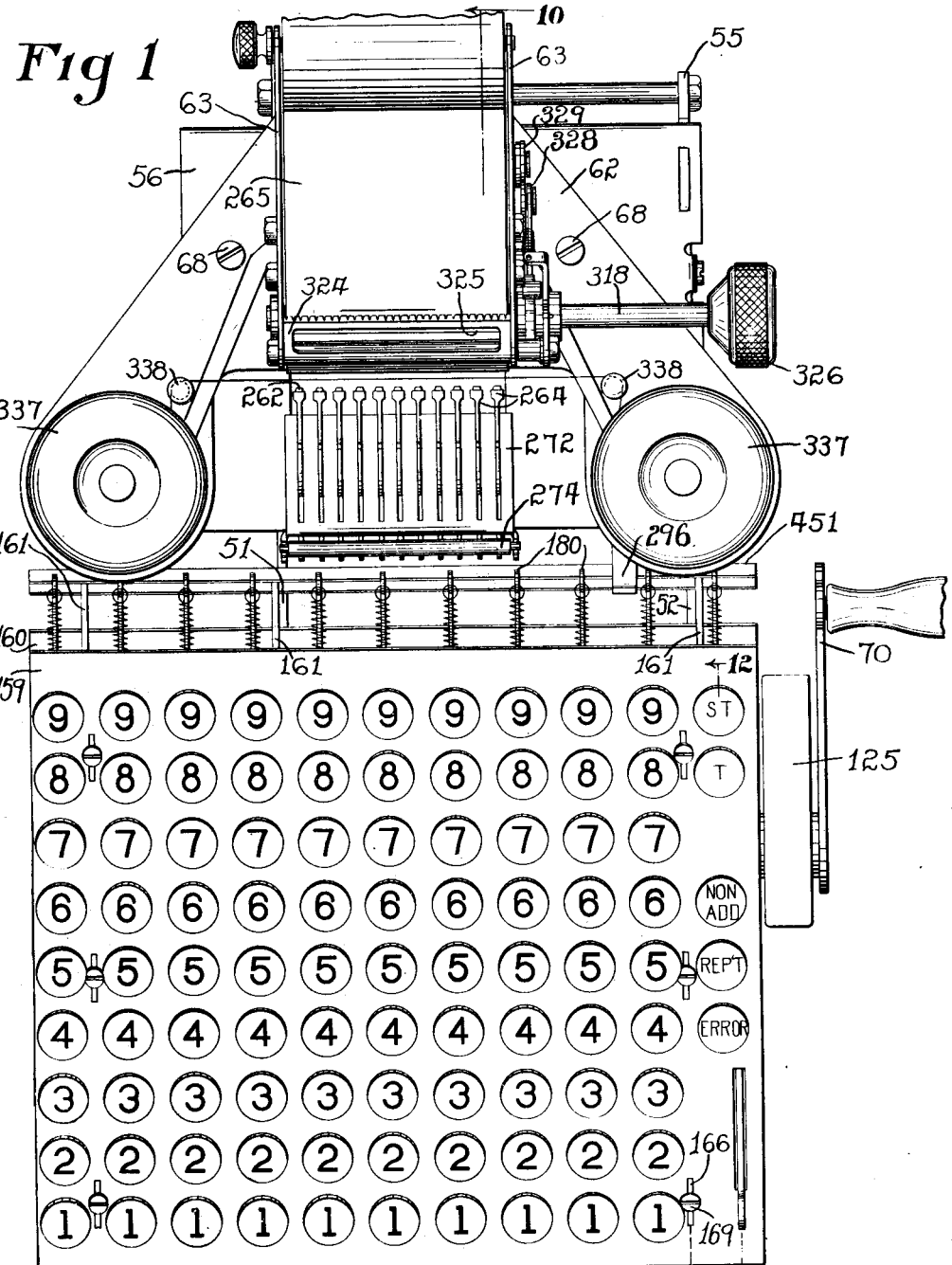

April 12, 1932.　　　A. A. HORTON　　　1,853,050

CALCULATING MACHINE

Filed Jan. 29, 1926　　20 Sheets-Sheet 1

INVENTOR
Allen A. Horton

BY Redor, Hibben, Davis, & Macauley
ATTORNEYS

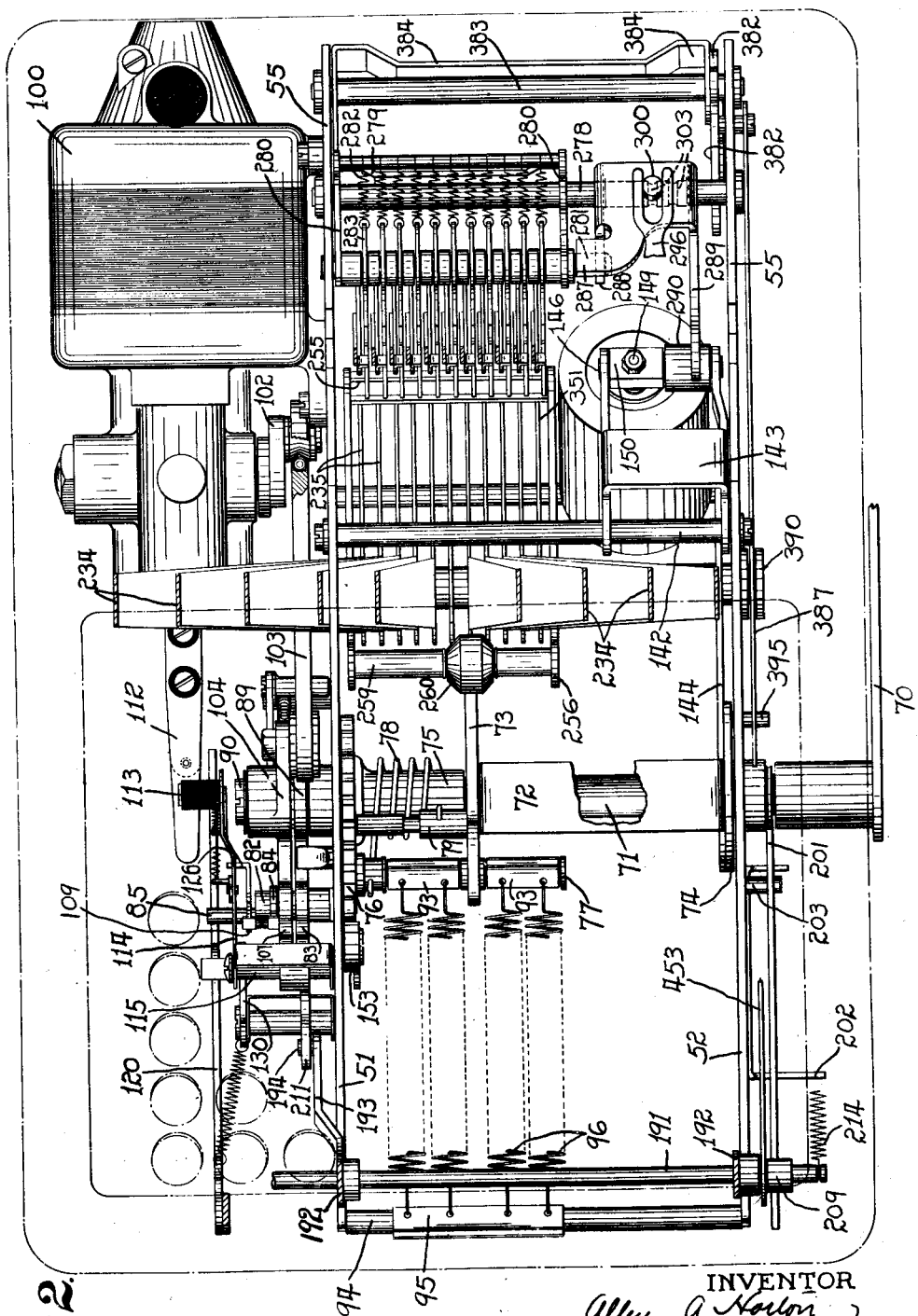

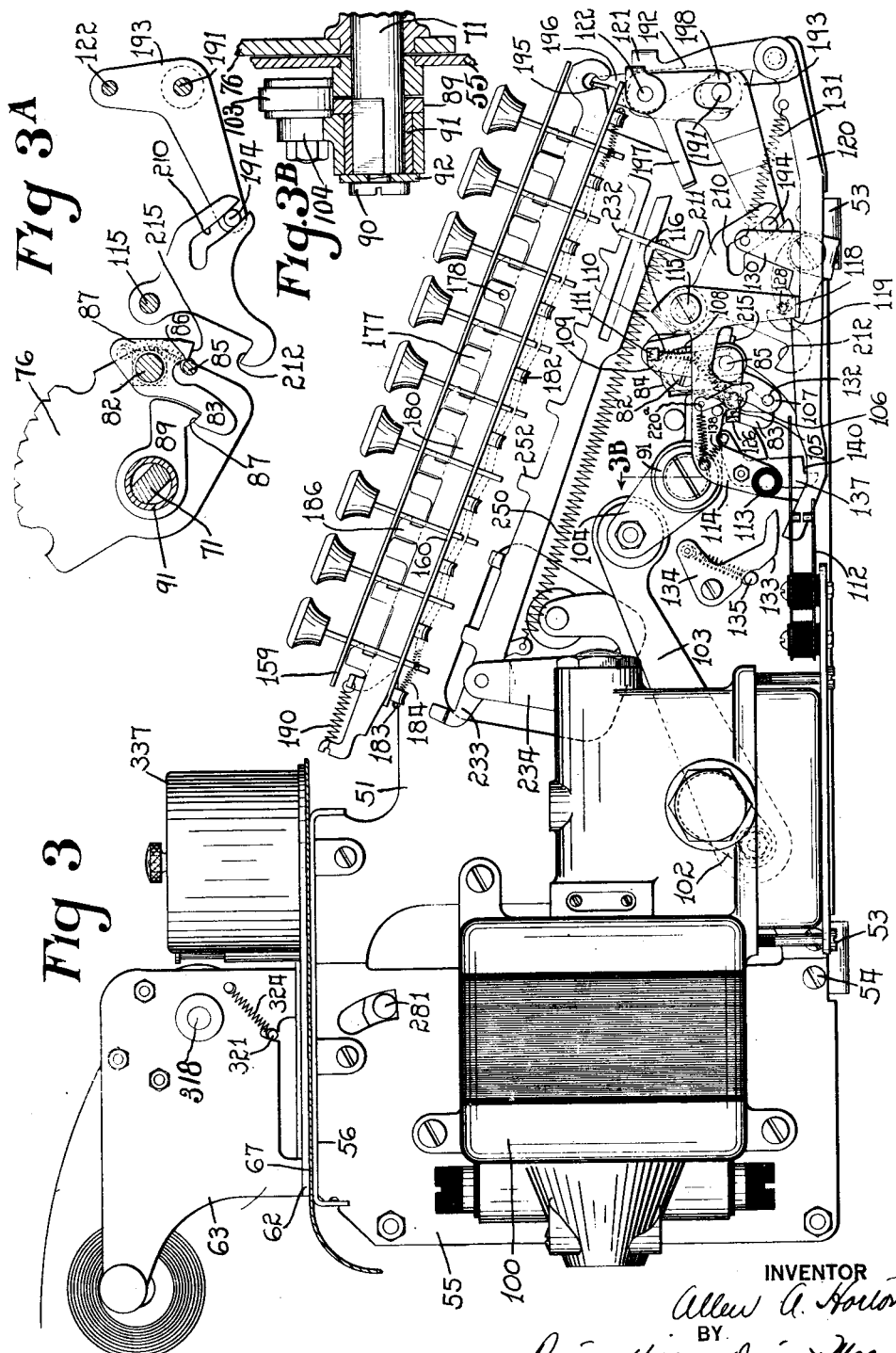

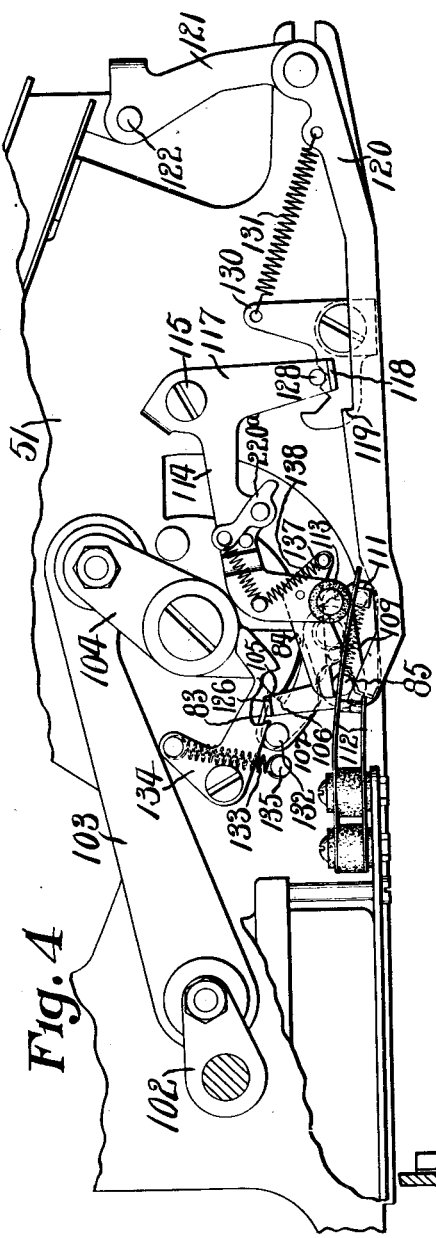
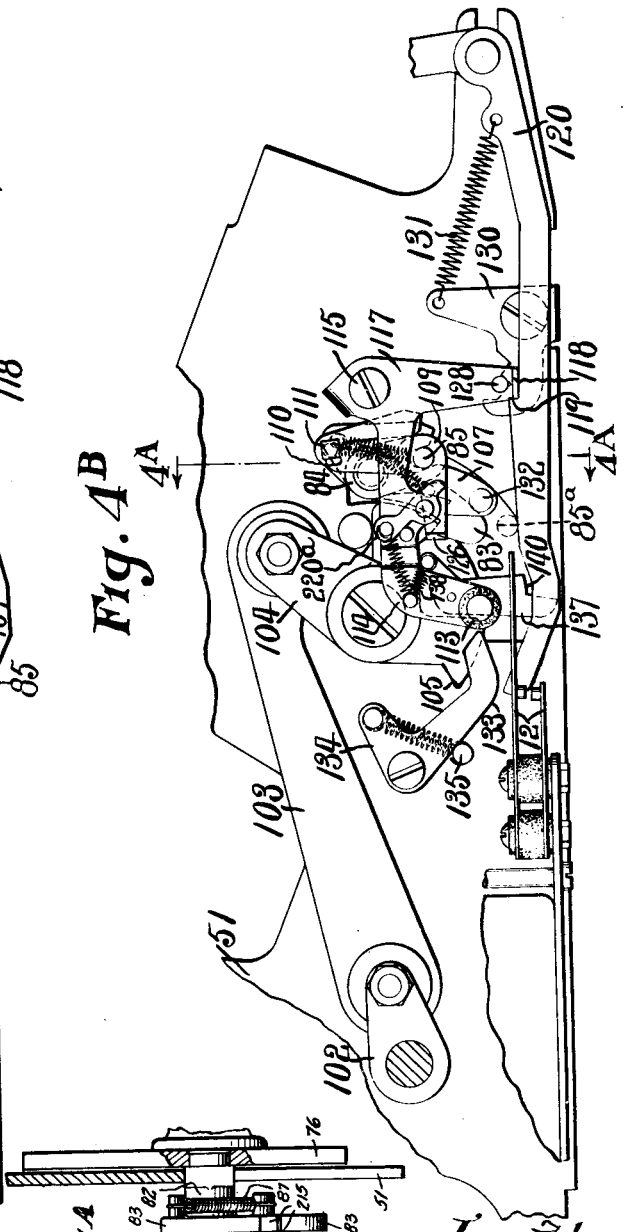

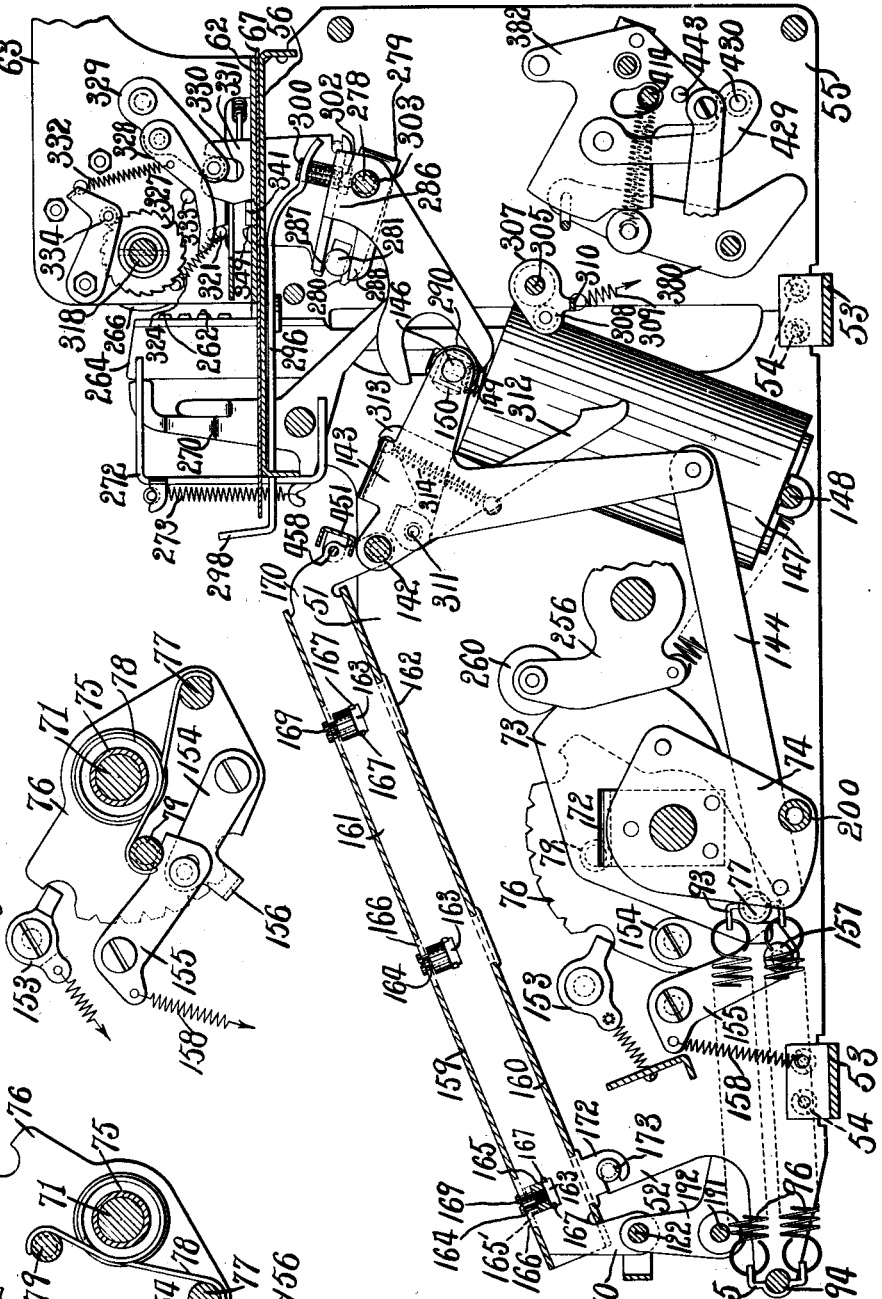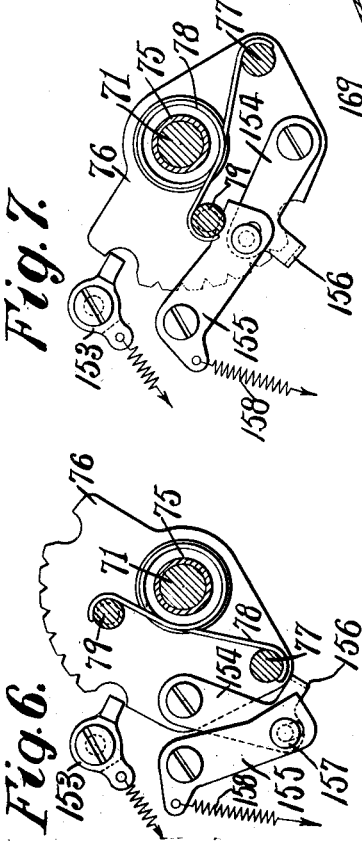

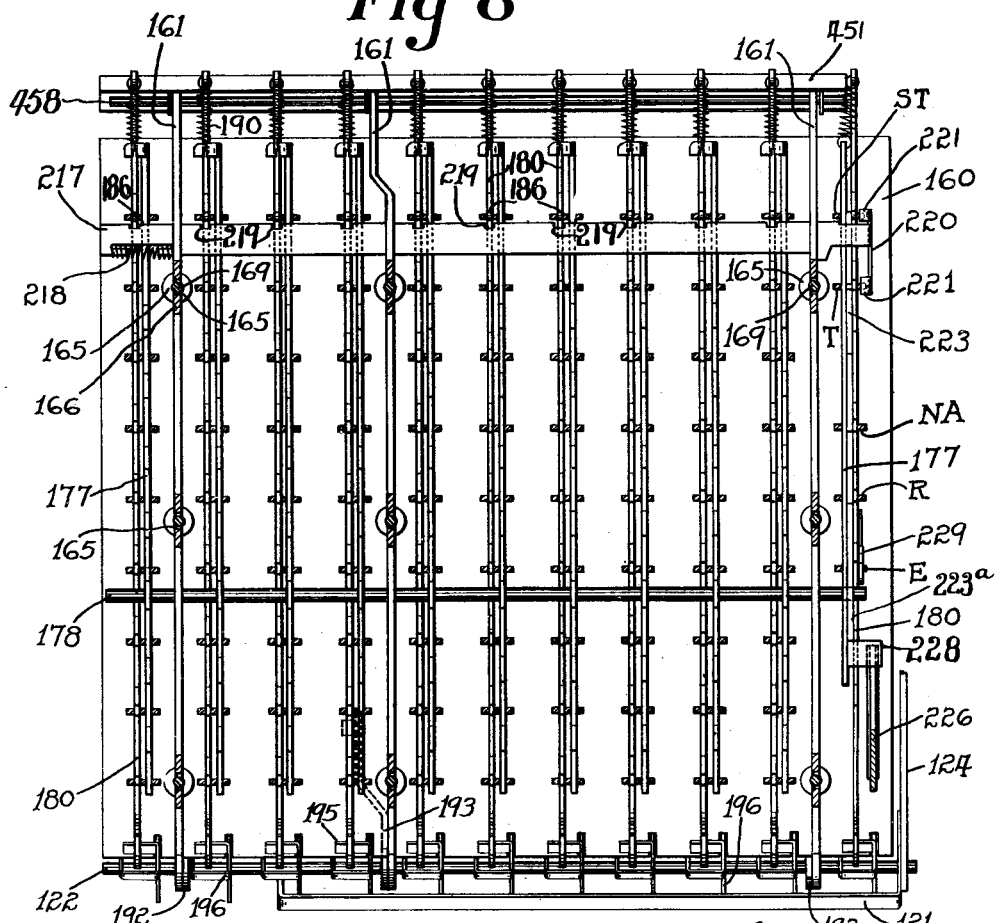
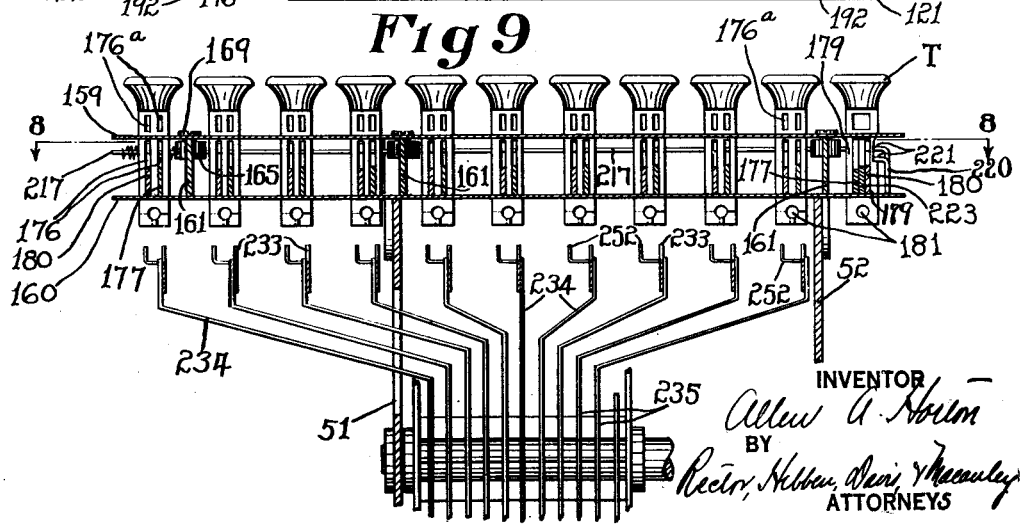

April 12, 1932.  A. A. HORTON  1,853,050
CALCULATING MACHINE
Filed Jan. 29, 1926  20 Sheets-Sheet 7
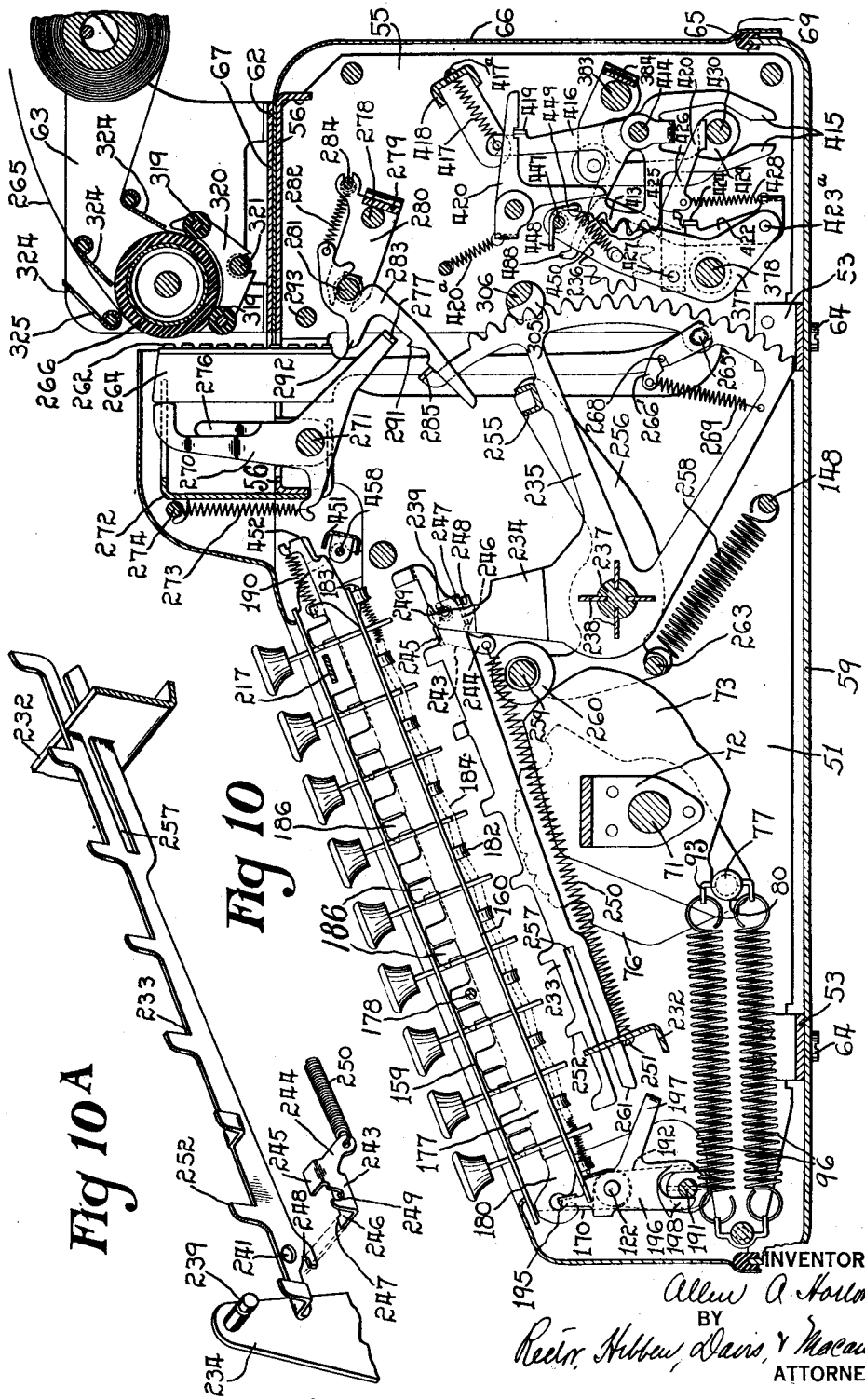

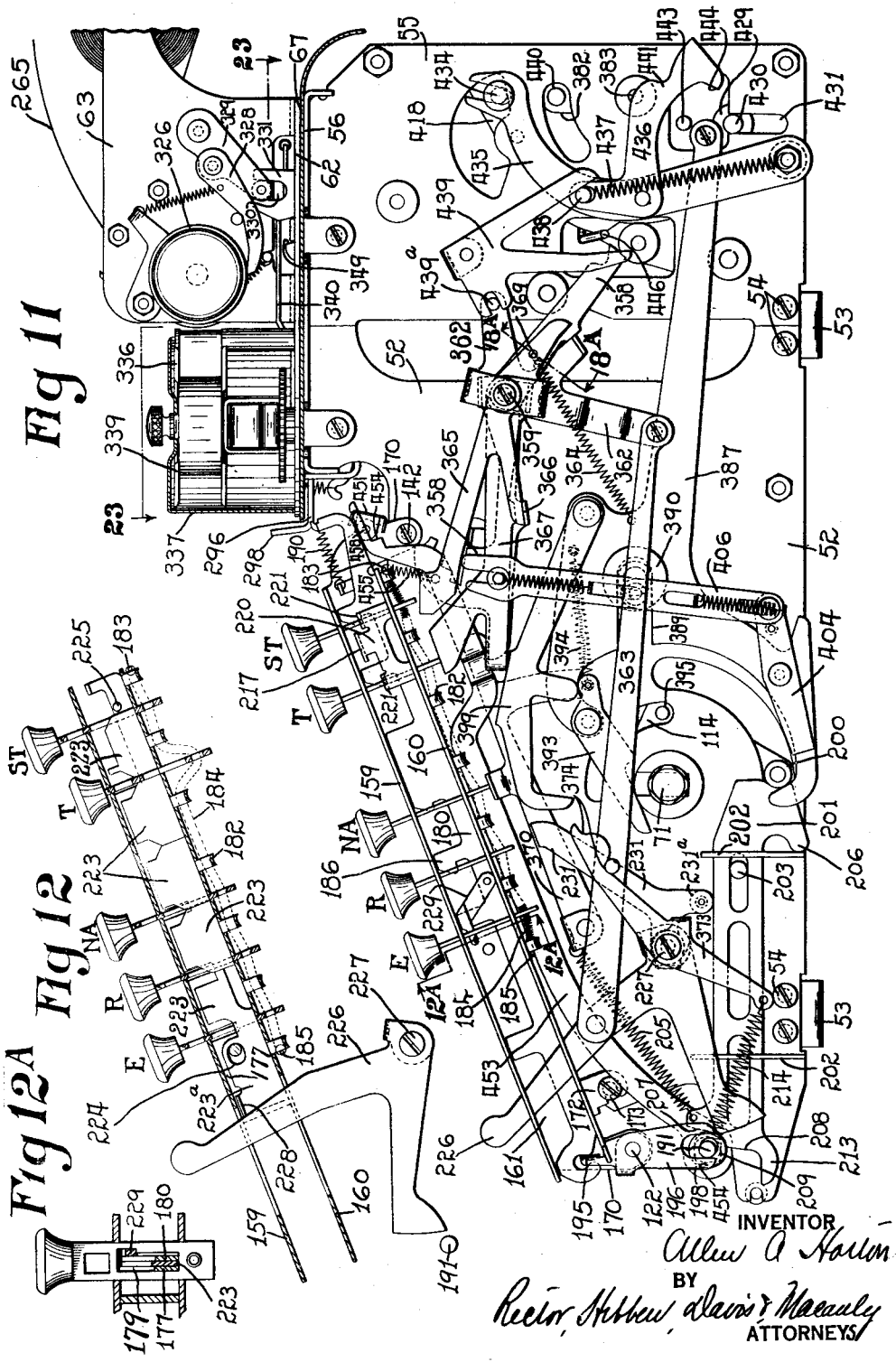

April 12, 1932.   A. A. HORTON   1,853,050
CALCULATING MACHINE
Filed Jan. 29, 1926   20 Sheets-Sheet 10
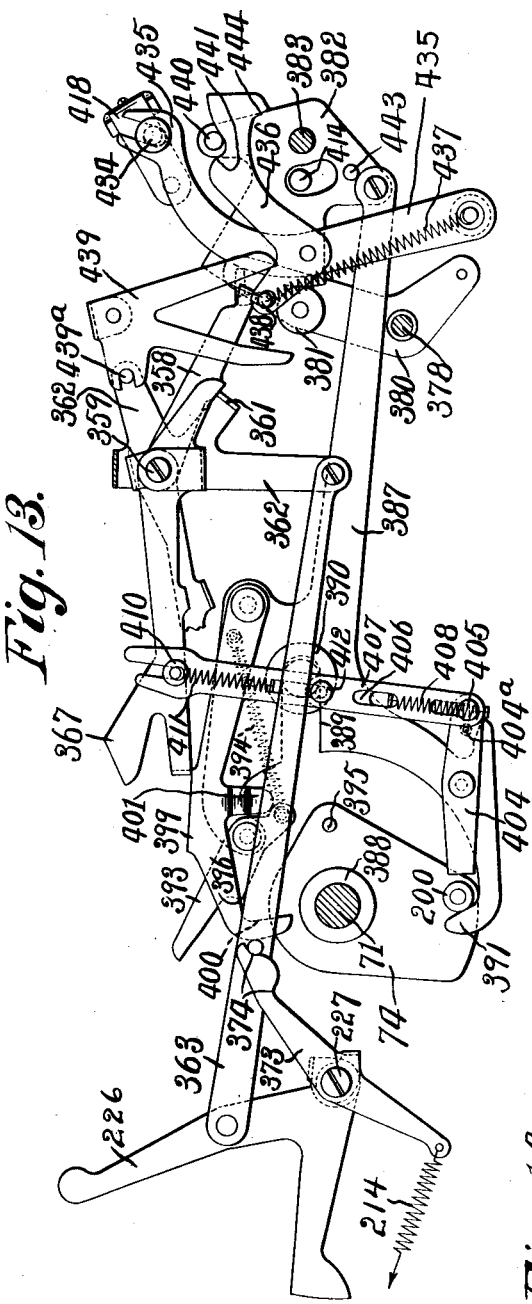
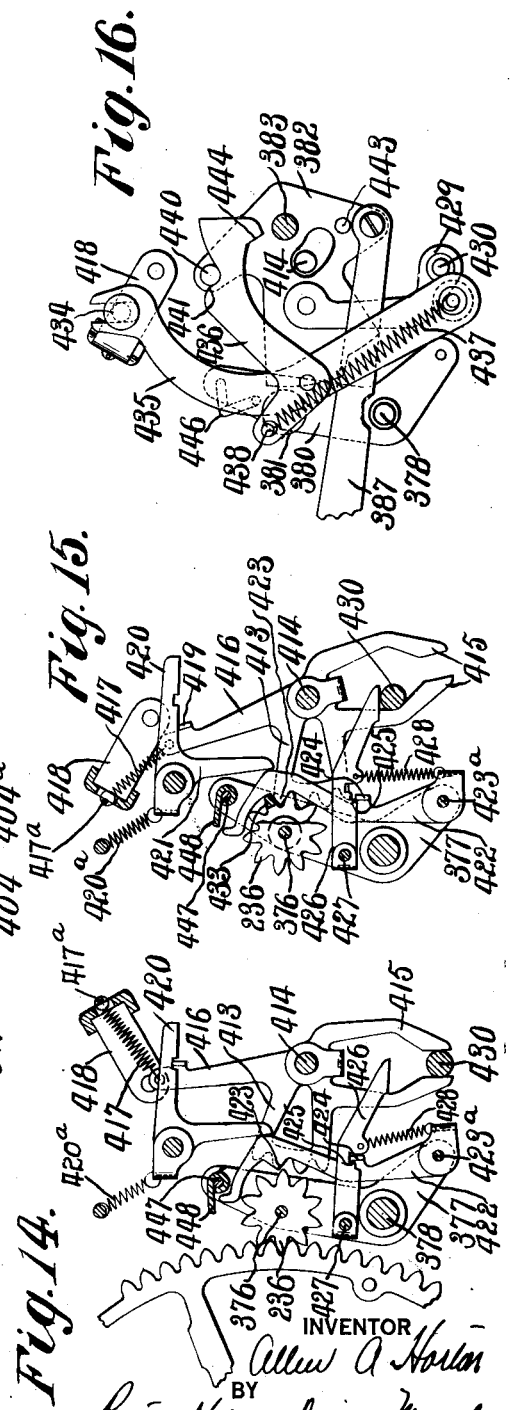

April 12, 1932.   A. A. HORTON   1,853,050
CALCULATING MACHINE
Filed Jan. 29, 1926    20 Sheets-Sheet 11
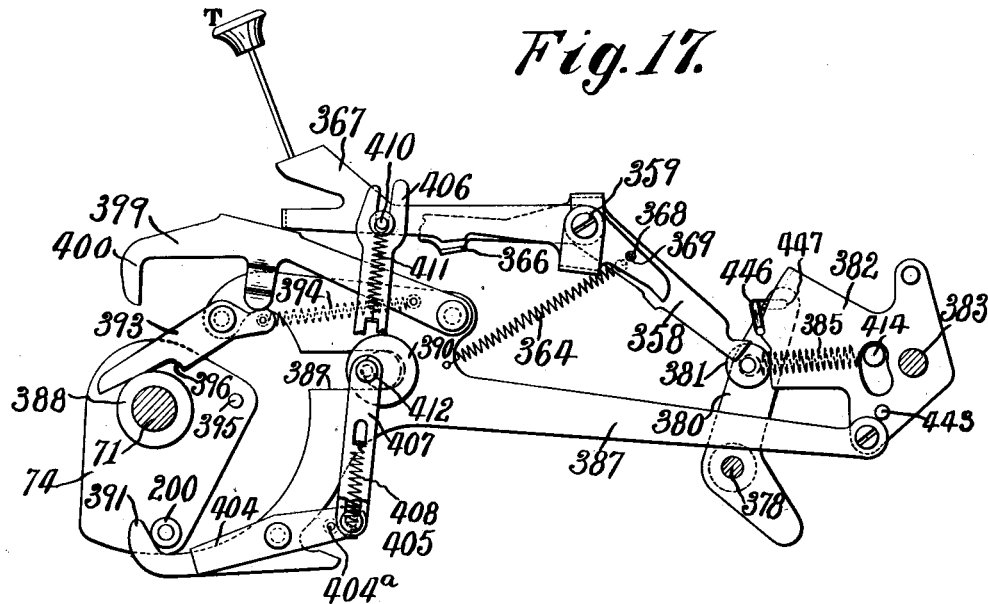
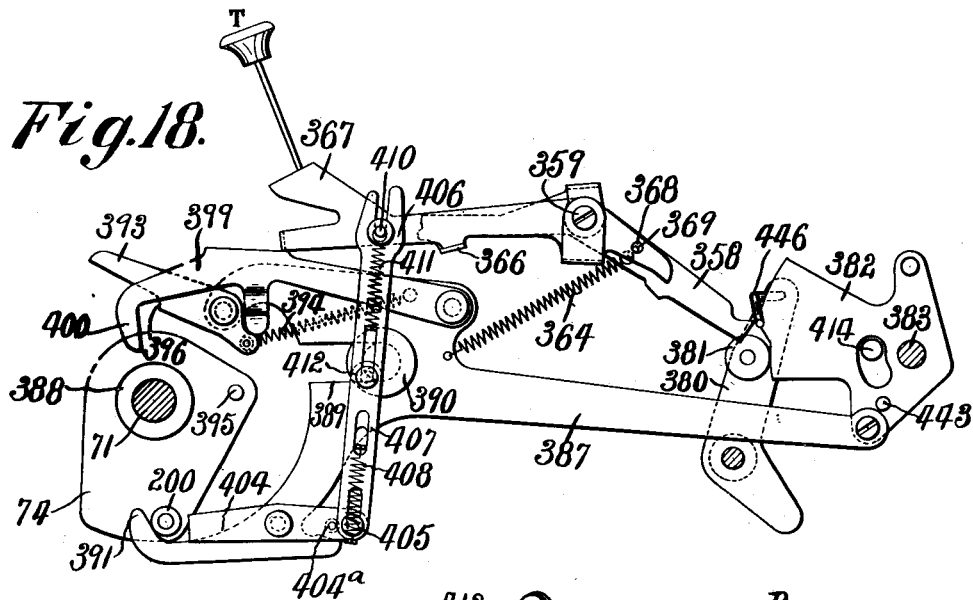
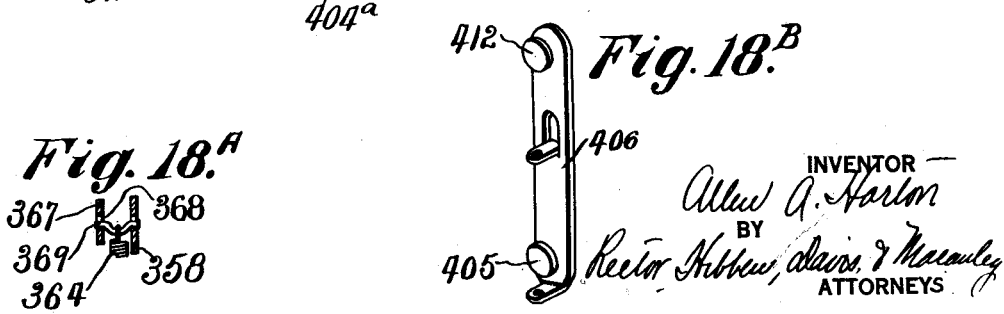

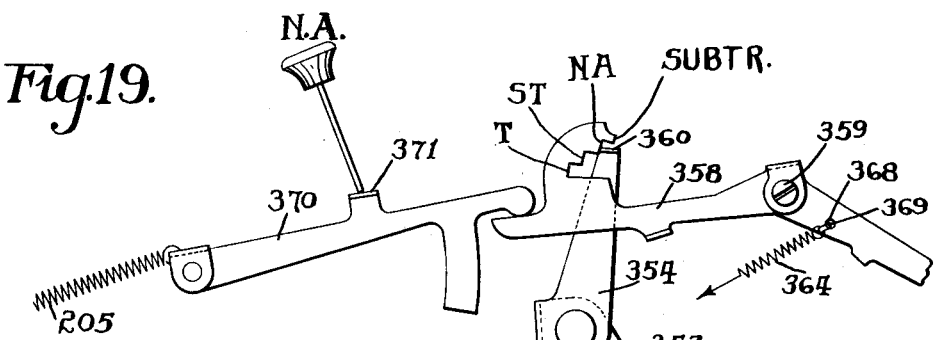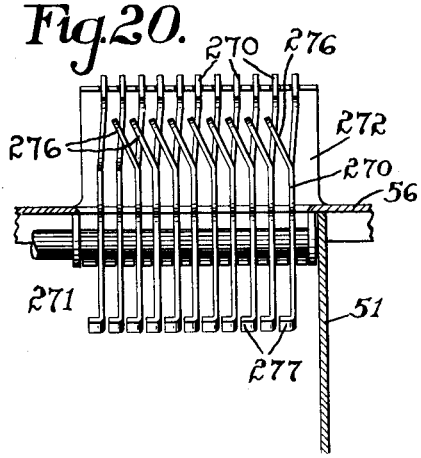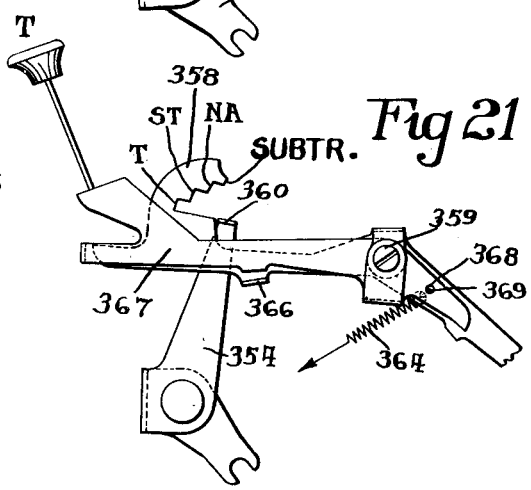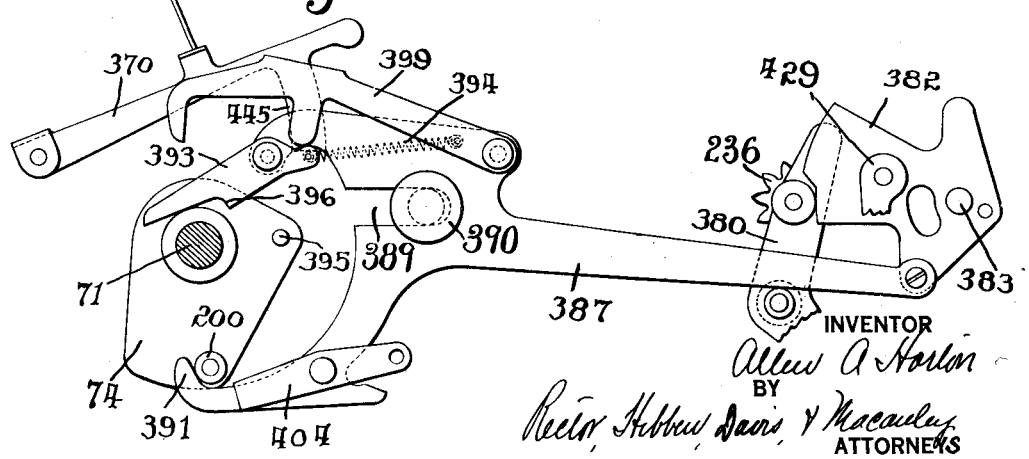

April 12, 1932.     A. A. HORTON     1,853,050
CALCULATING MACHINE
Filed Jan. 29, 1926     20 Sheets-Sheet 13
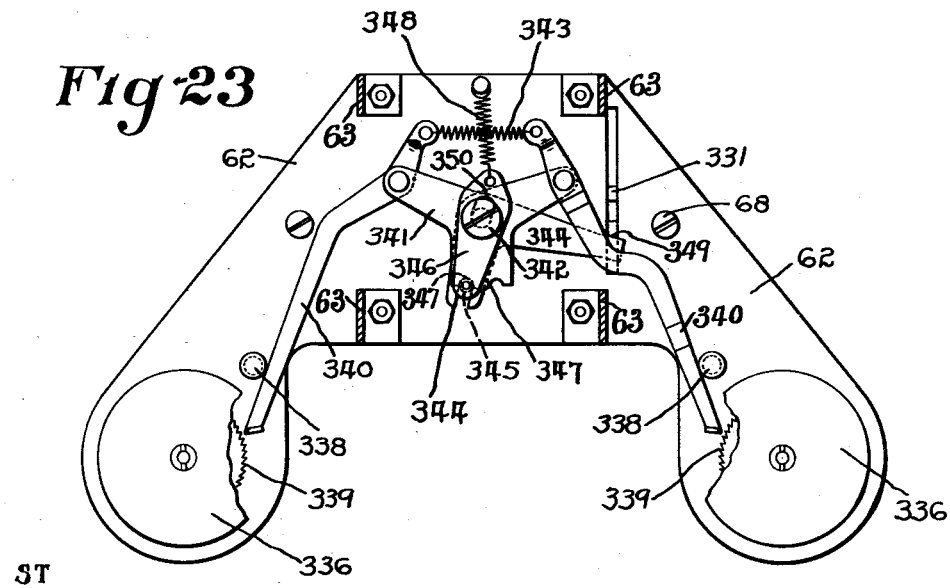
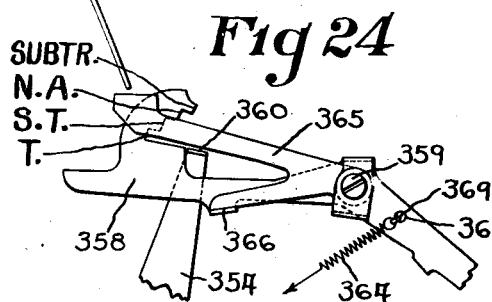
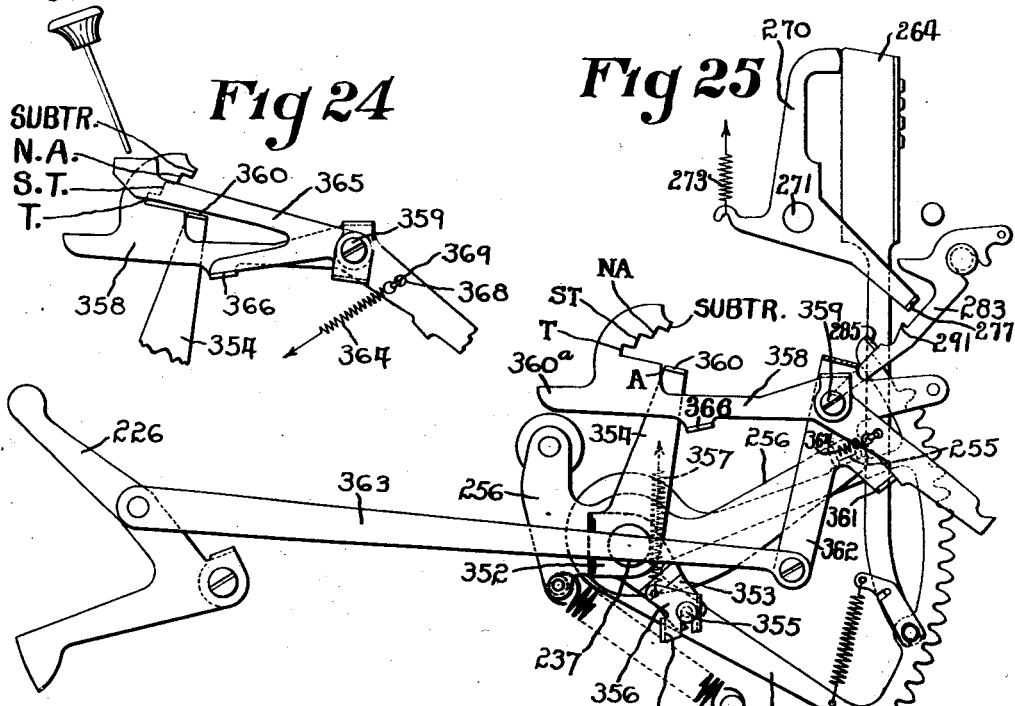

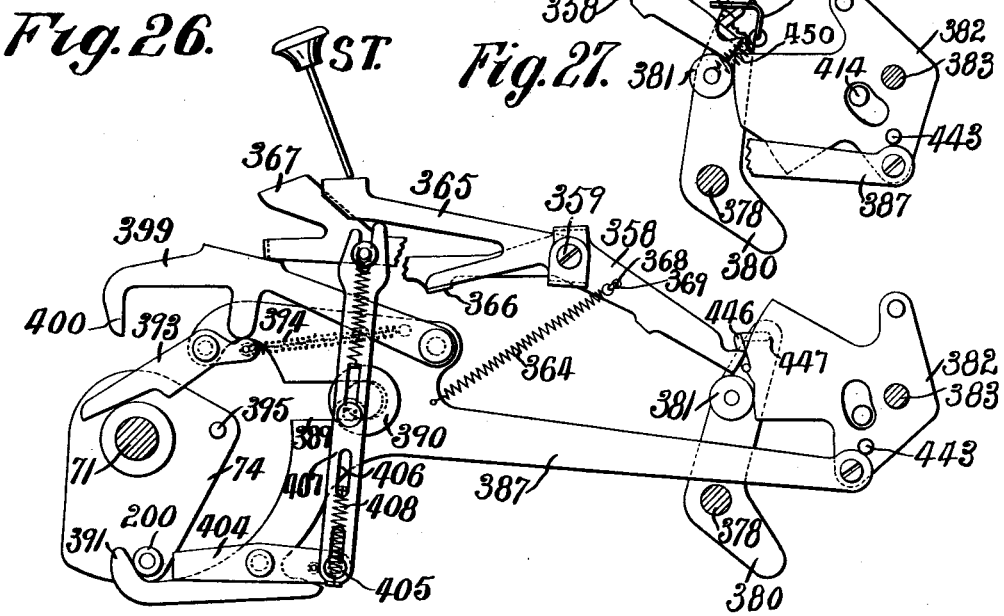
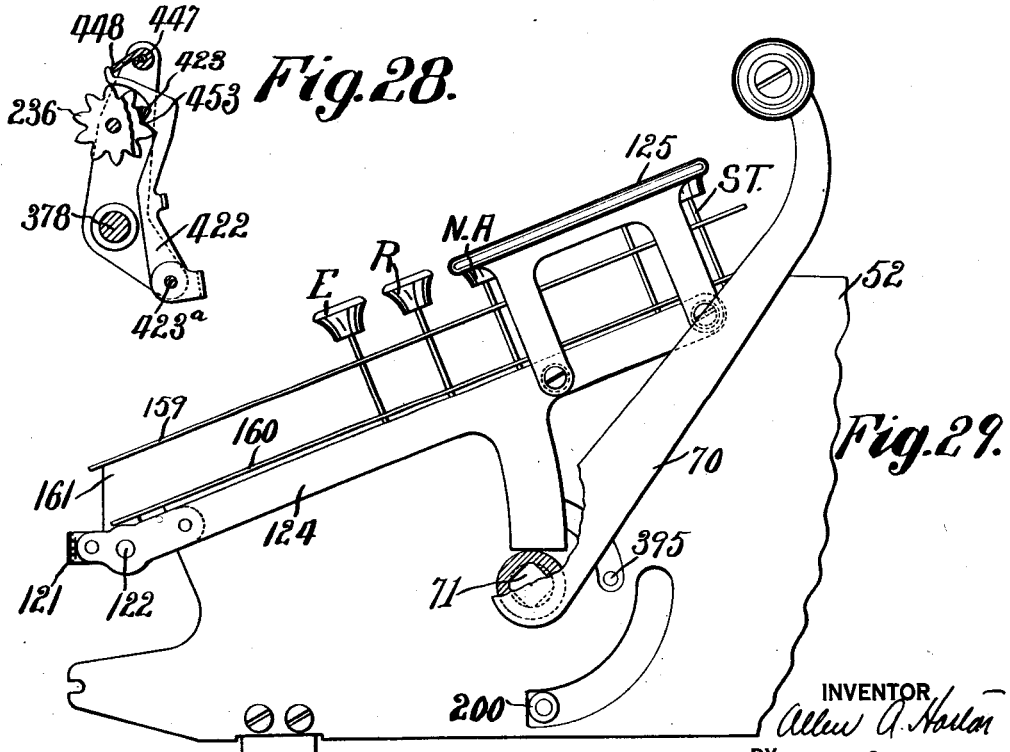

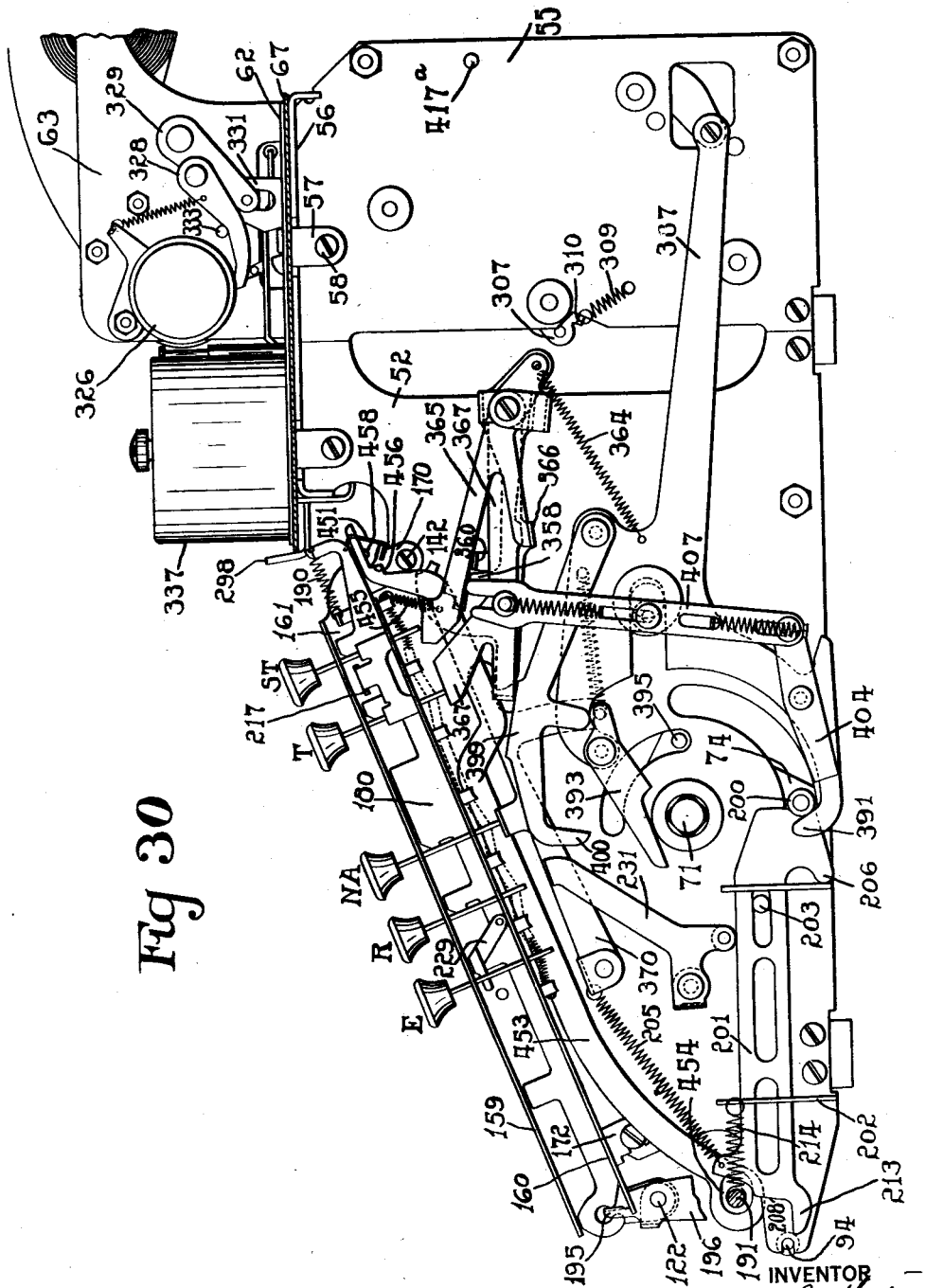

April 12, 1932.　　　A. A. HORTON　　　1,853,050
CALCULATING MACHINE
Filed Jan. 29, 1926　　20 Sheets-Sheet 16
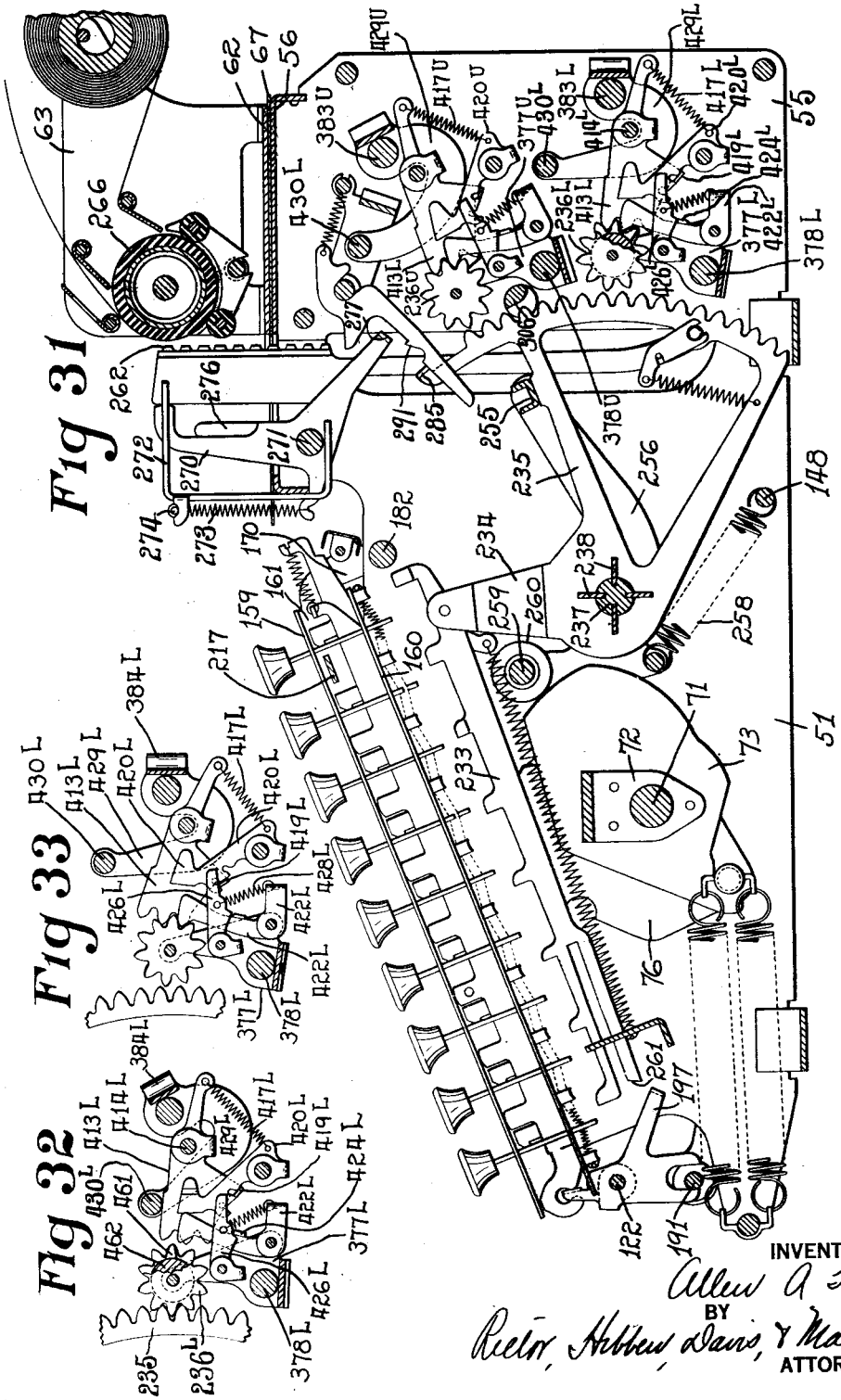

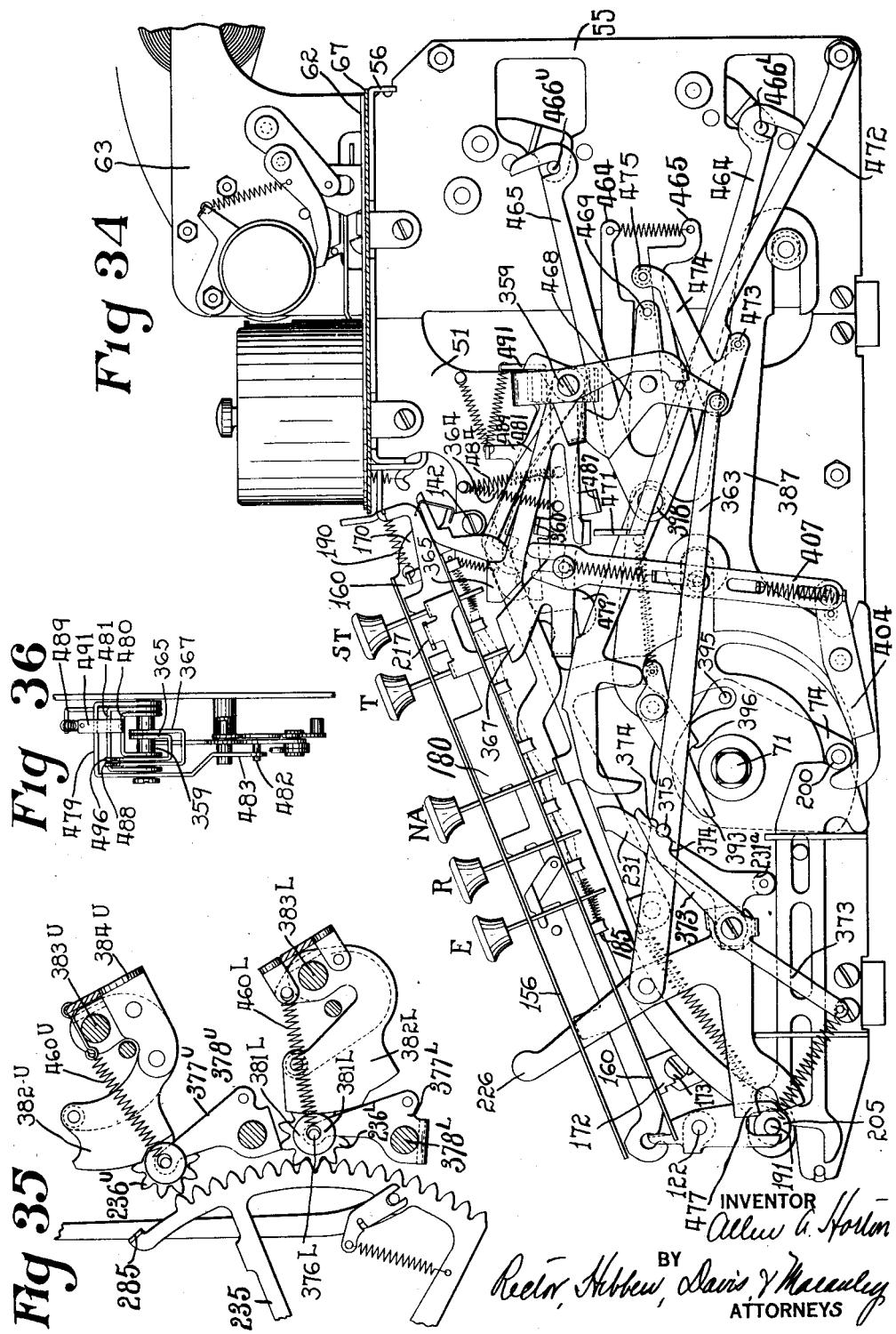

April 12, 1932. A. A. HORTON 1,853,050
CALCULATING MACHINE
Filed Jan. 29, 1926 20 Sheets-Sheet 18
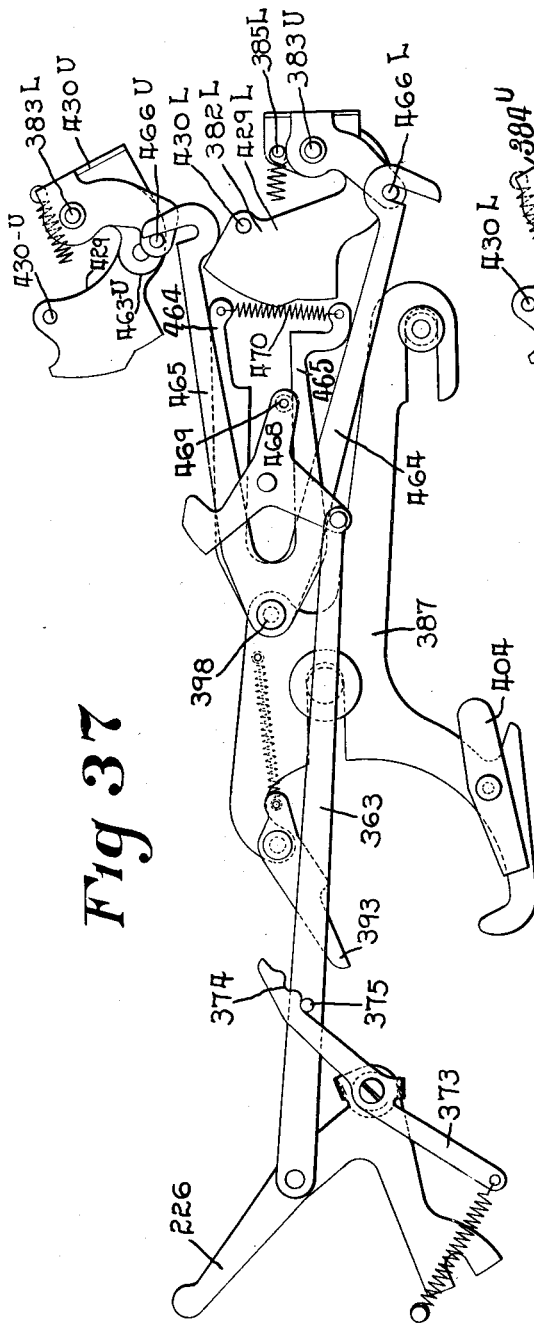
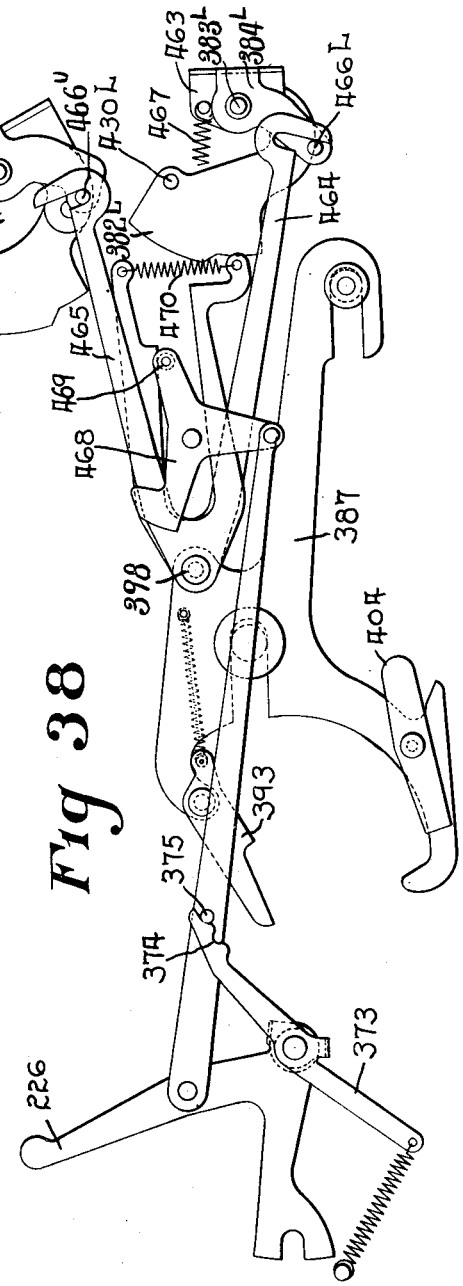

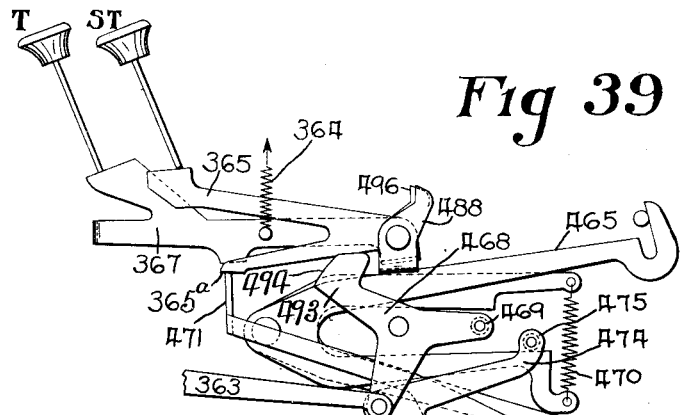
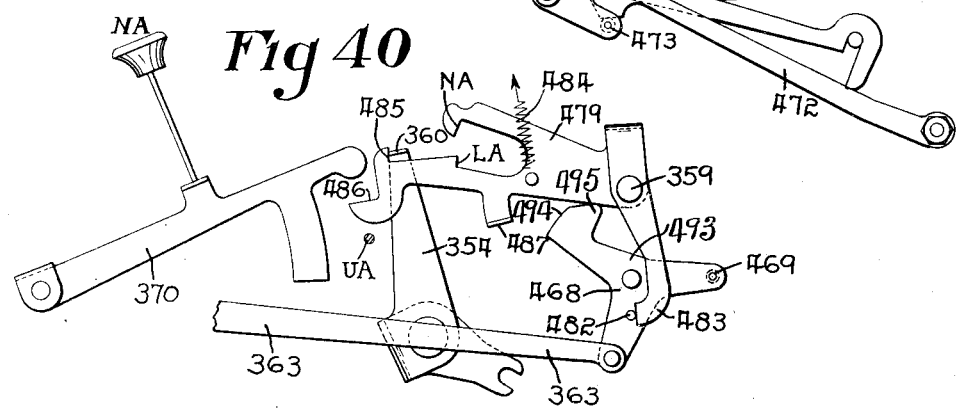
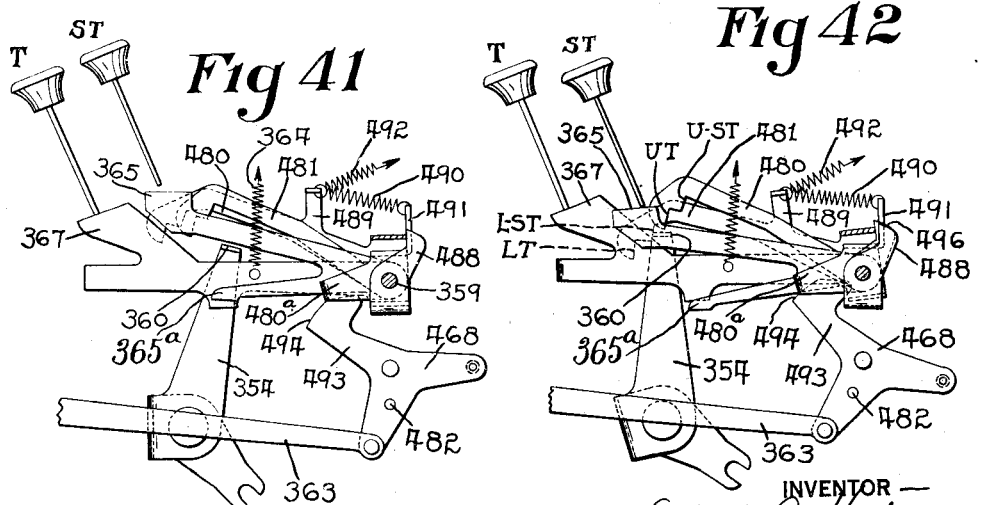

April 12, 1932.  A. A. HORTON  1,853,050

CALCULATING MACHINE

Filed Jan. 29, 1926  20 Sheets-Sheet 20

Patented Apr. 12, 1932

1,853,050

UNITED STATES PATENT OFFICE

ALLEN A. HORTON, OF PLYMOUTH, MICHIGAN, ASSIGNOR TO BURROUGHS ADDING MACHINE COMPANY, A CORPORATION OF MICHIGAN

CALCULATING MACHINE

Application filed January 29, 1926. Serial No. 84,616.

The invention relates to a calculating machine which will accumulate successive items, print the items and the total and sub-total thereof, subtract when desired, and perform certain other functions hereinafter described.

The general object of the invention is to provide a novel and improved machine of this class, particularly one that is light, simple and compact, so that it may be easily handled.

Calculating machines heretofore marketed and capable of performing the many functions accomplished by my machine, have been relatively large, heavy and complicated. They have usually been too bulky and heavy to be moved about easily and consequently have been supported on special stands that can be wheeled from place to place. When they have been electrically driven, the motor was mounted outside the usual frame work of the machine and often supported by the stand independently of the machine. Each of these machines constituted an intricate organization of all of the various mechanisms in one inseparable unit, that is, each machine was assembled as a whole for performing only certain functions and no more and it was impossible to convert a machine primarily intended to perform certain functions into a machine adapted to perform other functions without taking the whole machine apart and rebuilding it, which, in reality, meant the building of a very different machine.

An object of the present invention is to achieve better results in a machine of this class with a greatly reduced number of parts, each of which performs a maximum number of functions and all of which are coordinated so that, when assembled, they form a light, compact portable machine that may be enclosed in a small casing and be set on any convenient piece of office furniture, such as a desk.

Another object is to provide a machine which is constructed so that the electric driving motor and its connections can be included with the machine within the casing.

A further object is to provide a machine in which the side plates of the frame are not spaced different distances apart for machines having different numbers of banks or keys.

An additional and important object is to provide a machine that can be easily converted from a machine performing one set of functions to a machine performing another set of functions. For example, an adding machine may be changed to a machine that will add and subtract, or to a machine with a plurality of totalizers and vice versa.

Another important object is to provide an improved transfer or carry mechanism for the totalizers, particularly one that is remote from the actuating segments of the machine and one that will operate for subtraction as well as for addition. Addition is performed by rotating the totalizer wheels in one direction and subtraction by rotating them in a reverse direction. A machine for performing subtraction by reversing the direction of the totalizer wheels is shown in Vincent Patent No. 1,028,161, but, in that machine, the actuators for the totalizer wheels are given an additional step of movement to complete the carrying and borrowing and an idle or blank operation of the machine is necessary in order to print the correct total or sub-total from the totalizer.

The present invention provides a greatly improved and simplified transfer mechanism which includes transfer segments and a single controlling means which is operated during both adding and subtracting operations to effect the carrying and borrowing movement of the totalizer wheels. Idle or blank operations of the machine are unnecessary. More specifically, a latch mechanism is provided which normally restrains the transfer segments against movement. These segments are released under the action of springs or similar actuating means to move the totalizer wheels and complete the transfer. The actuating means for the latch mechanism is constructed so that it may be conditioned to move the transfer segments in one direction to complete carrying movements of the totalizer wheels during adding operations and in the opposite direction to complete movement of the totalizer wheels during subtracting operations. In other words, one simple transfer mechanism may be used for adding and, when the machine is adjusted for subtraction, the same transfer mechanism is automatically conditioned for subtraction. Certain other mechanisms are provided to operate in conjunction with the transfer mechanism, one of which is a means for causing the totalizing wheels to be arrested in zero position during total and sub-total printing operations, all of which will be described later in more detail.

Other objects of the invention are, the provision of improved means for holding the keys in depressed position and restoring them to raised condition; the provision of devices for automatically disconnecting the driving connections between the operating handle or motor and the operating mechanism proper when the machine is not properly conditioned for operation so that a complete stroke of the handle or motor is permitted without effecting operation of the machine; the construction of the connections between the differential stop bars arrested by the keys and the actuating members to prevent the shock of the sudden stopping of the stop bars from being transmitted to the actuating members and the type bars; and to provide simple and effective means for supporting the casing so that noise set up in the machine is not transmitted to the casing.

Figure 11A:
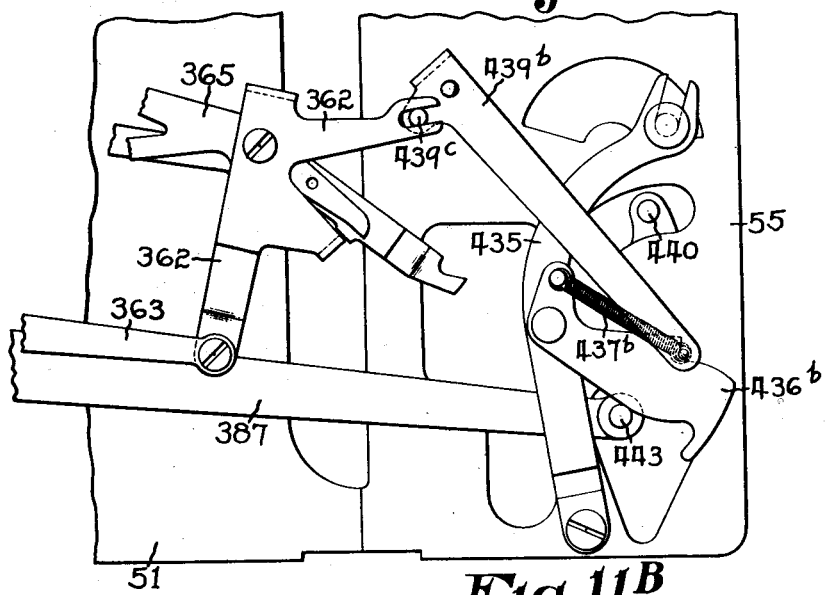
Figure 11B:
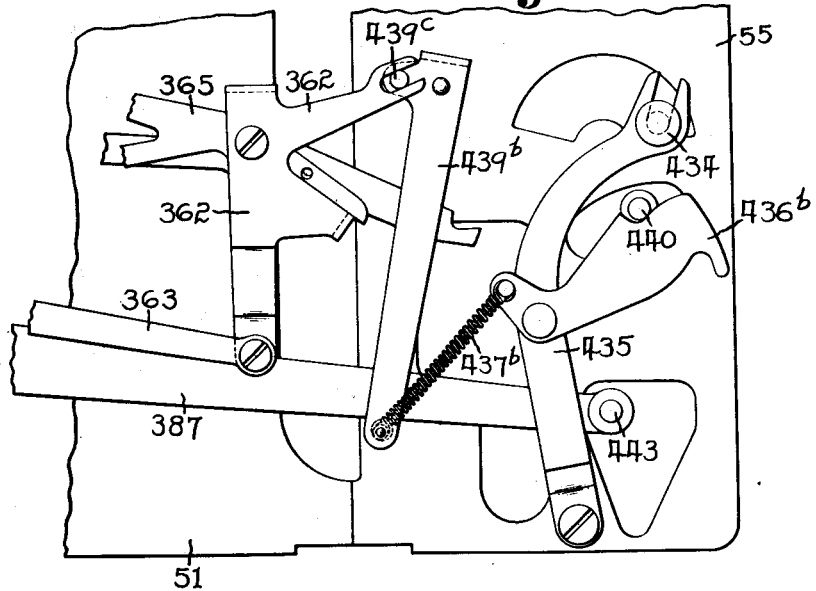

With the above and other objects in view, the invention consists in certain novel features of construction and combination of parts, the essentials of which are recited in the appended claims, and a preferred embodiment of which is fully illustrated in the accompanying drawings in which;

Fig. 1 is a top plan view of the machine embodying my invention, with the casing removed; Fig. 2 is a top plan skeletonized view showing the machine frame, the operating mechanism, the latch mechanism for the type hammers and the differential actuating segments, the vertical arms of the latter being shown in section; Fig. 3 is a left hand side elevation of the machine with the casing removed; Fig. 3A is a detail fragmentary side view showing the driving pawl connections and the lever for disabling the same upon operation of the handle when the machine is not properly conditioned for effective operation; Fig. 3B is a detail section taken on the line 3B—3B of Fig. 3; Fig. 4 is an enlarged side view of the driving connections shown in Fig. 3, and shows the parts in the positions which they assume at the end of the forward stroke of the operating mechanism when electrically operated; Fig. 4A is a sectional rear view of the pawls and latch carried by the full stroke sector on the line 4A—4A of Fig. 4B; Fig. 4B is a view similar to Fig. 4 with the parts shown in a different position. Fig. 5 is a transverse section taken immediately within the right hand side frame, the view being a skeletonized one to show more clearly the operating mechanism and the printing mechanism; Figs. 6 and 7 are detail right hand side views illustrating the full stroke devices for compelling a complete operation of the operating mechanism. Fig. 6 showing the normal condition of the parts and Fig. 7 showing the positions assumed at the end of the forward stroke of the operating handle; Fig. 8 is a horizontal section taken through the keyboard being taken immediately under the top plate of the keyboard as on the line 8—8 of Fig. 9; Fig. 9 is a vertical cross section taken through the keyboard and the stop bars, with the actuating segments broken away; Fig. 10 is a longitudinal vertical section taken through the machine the section being taken immediately to the right of and looking toward the units bank of amount keys, and through the printing mechanism as on the line 10—10 of Fig. 1; Fig. 10A is a detail perspective view illustrating the connection between the stop bars and actuating segments, the parts being shown in separated relation; Fig. 11 is a right hand side elevation of the machine with the casing removed; Fig. 11A is a partial side elevation of a modified form of control for the transfer mechanism; Fig. 11B is a view similar to Fig. 11A showing the parts in a different position; Fig. 12 is a vertical section taken through the bank of control keys, as on the line 12—12 of Fig. 1; Fig. 12A is a detail cross section taken immediately in front of the "error" key, as on the line 12A—12A of Fig. 11; Fig. 13 is a right hand side elevation of the mechanism for moving of the totalizer into and out of engagement with the actuating segments and of the mechanism for conditioning the machine for addition or subtraction; Fig. 14 is a detail section taken through the totalizing mechanism showing the totalizer in engagement with the actuating segments during an adding operation; Fig. 15 is a similar view but shows the totalizer out of engagement with the actuating segment and the parts of the transfer mechanism in the positions which they assume after effecting a borrowing operation during a subtraction operation; Fig. 16 is a detail skeletonized view showing in right hand side elevation part of the totalizer engaging mechanism and the spring frame for the transfer segments in the positions which they assume at the end of the forward stroke of the operating mechanism during a subtracting operation, the right hand frame and the totalizer wheels being omitted; Figs. 17 and 18 are detail side elevations of the totalizer engaging mechanism and the connections for controlling the same by the total key, which is shown in normal undepressed position in Fig. 17 and in depressed position in Fig. 18; Fig. 18A is a detail section taken through certain control levers as on the line 18A—18A of Fig. 11; Fig. 18B is a detail view of a slide forming one part of certain controlling means; Fig. 19 is a detail view showing the stepped stop plate controlled by the control keys for positioning the character printing type bar together with the non-add key which is shown in depressed position; Fig. 20 is a rear elevation of the type hammer section; Fig. 21 is a detail side view showing the total key and connections for operating the stepped control plate for the character printing type bar; Fig. 22 is a detail right hand side view of the totalizer engaging mechanism showing the non-add key and the connections operated thereby for controlling such mechanism; Fig. 23 is a top plan view of the ribbon feeding mechanism, the view being a horizontal section taken substantially on the line 23—23 of Fig. 11; Fig. 24 is a detail side view of the stepped control plate for the character printing type bar and shows the sub-total key in undepressed position; Fig. 25 is a skeletonized view illustrating in right hand side elevation the character type bar and the mechanism for operating and controlling the same; Fig. 26 is a detail right hand side view of the totalizer engaging mechanism and shows the sub-total key depressed; Fig. 27 is a fragmentary side view showing the totalizer engaging cam and the totalizer frame in moved condition; Fig. 28 is a fragmentary section taken through the totalizer and showing the zero stop pawl in locked condition when a total or sub-total is to be printed; Fig. 29 is a right hand side elevation of the forward part of the machine and shows the operating handle and the motor release touch bar; and Fig. 30 is a side elevation of a machine embodying a modified form of the invention and not adapted to perform subtraction.

Fig. 31 is a side elevation similar to Fig. 30 but showing the machine with a duplex totalizer unit; Fig. 32 is a side elevation of one of the duplex totalizers of Fig. 31 showing it in engagement with its actuating segment; Fig. 33 is a side elevation of the totalizer of Fig. 32 showing it out of engagement with its actuating segment; Fig. 34 is a side elevation showing the controlling means for a duplex machine; Fig. 35 is a side elevation of the duplex totalizer showing the mechanism for moving the totalizers into and out of engagement with the actuating racks; Fig. 36 is a rear elevation of certain of the control elements of the duplex machine; Fig. 37 is a detail side elevation of the duplex controlling elements showing them in the position they occupy when the lower totalizer is being used; Fig. 38 is a detail side elevation of the duplex controlling elements showing them in the position they occupy when the upper totalizer is being used; Fig. 39 is a detail side view of the control elements operated by the total and sub-total keys; Fig. 40 is a detail side view of certain of the control elements, particularly those operated by the non-add key; Figs. 41, 42, 43 and 44 are detail side views of the control elements including particularly the elements for controlling the character printing in the duplex machine; Fig. 45 is a top plan view of a portion of the duplex totalizer unit.

The machine is built in several units or sections which may be individually assembled and then readily brought together to make a complete machine. These units will be described generally after which each, as well as some of the individual mechanisms, will be described in detail.

The largest unit is the main section which supports the operating mechanism including the differential stops, the actuator segments, and the printing mechanism.

A keyboard section or unit, which is self-contained and which may be quickly attached to and detached from the main unit, carries the keys and various locking and interlocking devices.

The totalizer unit includes the totalizers, the transfer mechanism and certain other associated parts all mounted on an individual frame section which may be quickly attached to and detached from the main section.

A sub-unit which supports the hammers of the printing mechanism serves to connect the main unit with the totalizer unit as will be later described.

The paper feeding and the ribbon mechanism unit is also independent. It may be mounted on top of the other units in a manner hereinafter described.

The main section is the same for all types of machines and the keyboard section may be the same, although, if different types are desired, it is a simple matter to change keyboard sections because these sections are independent units that can be attached and detached very easily. The totalizer units vary with the type of machine that is required. These units may be constructed for adding only, for adding and subtracting, and for totalizing on a plurality of sets of totalizers. Each of these different totalizing sections is constructed so that it cooperates with the main section without requiring that any complicated parts be connected together. With the exception of a single connection for the main driving pitman, the totalizer section is simply fitted against the main section and bolted in place. Certain control elements are added or changed when different totalizer units are used, but all these controls are connected to the outside of the main unit where they are easily accessible. The ribbon feeding mechanism remains the same and it is located on top of the machine on the outside of the casing.

This feature of constructing the machine so that it may be assembled in units or sections is an important advantage which not only facilitates manufacture, assembly, and repair of the machine but it also enables one machine to be easily converted into another. If a user has a machine which is suitable for adding only, he need not purchase an entirely new machine if he desires to also provide for subtraction. He can substitute a new totalizer unit for the one originally on his machine. If he desires a duplex totalizer he can substitute the totalizer unit having the duplex totalizer on it.

Frame and casing

The frame of the main unit comprises two vertical parallel plates 51 and 52 (Figs. 2, 3, 5 and 10 and 11), suitably spaced apart and held together by a plurality of rods and shafts some of which serve other purposes as will appear later. The lower edges of the plates 51 and 52 are also connected by cross pieces 53 which have their ends turned upwardly and secured to the side plates 51 and 52 by screws 54. These cross pieces are positioned slightly below the edges of the side plates so that the machine rests on them and they are provided with suitable openings to receive screws for fastening the machine to the pan of an enclosing casing as shown in Fig. 10.

The frame for the totalizer unit or section comprises two vertical plates 55 spaced apart and held together by a number of rods and shafts as illustrated. These plates are spaced apart the same distance as the plates of the main section and they are of the same height as the height of the rear ends of the plates of the main section so that, when the totalizer section is assembled against the main section, the plates of the totalizer section form, in effect, extensions of the plates of the main section.

These two sections are connected together by a horizontal plate 56 which supports certain parts of the printing mechanism as will be later described. This plate has downwardly depending lugs (Figs. 3 and 11) for fastening it to the two sections previously mentioned. The rear lugs are connected by screws to the plate 55 of the totalizer section while the forward lugs are secured by screws to the plates 51 and 52 of the main section. The front and back edges of plate 56 are also bent downwardly to fit over the plates of the two sections as illustrated in Fig. 3. The side plates of each section are also connected at their bottom edges to a common cross piece 53 by the screws 54 as shown in Fig. 3.

The paper or ribbon section or unit is carried on a base plate 62 having two vertical frame plates 63. It is connected to the top plate 56 by screws 68 (Fig. 1), which pass through openings in the casing of the machine and are screwed into threaded openings in the plate 56. The casing has been omitted in Fig. 1 for the sake of clearness and the paper and ribbon section is shown mounted directly on the plate 56, although the casing is, in fact, between the two as illustrated in Fig. 10.

The casing of the machine includes a base portion or oil pan 59 (Fig. 10) in which the machine rests and to which it is secured by screws 64 threaded into openings in the cross bars 53 of the frame. The cover 66 is shaped to fit over the main section or unit and the totalizer section or unit so as to enclose all the parts except those necessary for operation. Suitable openings are provided for the keyboard, the type bars, etc., as best illustrated in Fig. 10. The rear portion 67 of the cover is flat and it rests on the top of plate 56 as illustrated in Figs. 5 and 10. The paper and ribbon unit fits on top of the casing at its rear portion as hereinbefore described.

The lower edge of the casing is flared outwardly to provide a shoulder 69 (Fig. 10) which, when the casing is on the machine, rests firmly on a rubber strip 65 having a groove fitting over the edge of the vertical flange extending around the pan 59. The rubber strip supports the casing and prevents any play or vibration between the casing and the base and the transmission of noise from the machine proper to the casing which would otherwise amplify the noise.

Operating mechanism

A main drive or operating shaft 71 is journaled in the side plates 51 and 52 of the frame (Figs. 2, 5, 10 and 29) and a point to be noted is that this shaft is the only shaft that rotates in the plates. All the other cross shafts are fixed. This simplifies manufacture and assembly and improves the wearing qualities of the machine. The right hand projecting end of shaft 71 is squared, as shown in Fig. 29, to receive an operating handle 70 having a square opening shaped to fit over the squared end of the shaft. Mounted loosely on the shaft 71 is a yoke 72 (Figs. 2, 5 and 10) to the left hand end of which is secured a restoring cam 73 and to the right hand end of which is fastened a driving plate 74 that operates certain portions of the machine as will be later described. The yoke 72, the cam 73 and the plate 74 constitute a driving unit mounted loosely on the driving shaft 71 which unit constitutes a part of the operating mechanism driven by the drive shaft 71.

A resilient connection is provided between the driving means and this unit. Mounted loosely on the shaft 71 to the left of cam 73 is a sleeve 75 (Figs. 2, 6 and 7) carrying a full stroke sector 76 to which the drive shaft is connected and which may be driven by a motor, as will be explained later. The sector 76 carries a long stud 77 to which the end of a coil spring 78 is connected. This spring is coiled about the sleeve 75 and its other end bears against a stud 79 on the restoring cam 73. When the operating handle is pulled forward the sector 76 is rotated counter clockwise and this motion is transmitted through the spring 78 to the cam 73 which is a part of the driving unit heretofore mentioned. The spring 78 is normally under tension and this tends to move the cam 73 in a counter clockwise direction, but such movement is prevented by the engagement of a shoulder 80 (Fig. 10) on the cam 73 with the end of the stud 77 on sector 76. The cam 73 thus moves promptly whenever the sector 76 is rotated, it being understood that the stud 77 tends to move away from the shoulder 80 as the sector 76 is rotated counter clockwise.

The resilient driving connection serves to protect the mechanism and to give it time to operate if the drive shaft is moved too rapidly. For example, if some part of the mechanism should become jammed or locked, the continued movement of the drive shaft will not force the mechanism and break it but will simply increase the tension of the spring 78 and allow the shaft to move relative to the driving unit and mechanism. The rapidity of movement of the mechanism is regulated by a dash pot. If the drive shaft is moved too rapidly, the mechanism nevertheless operates uniformly and the spring 78 allows a movement of the drive shaft relative to the mechanism. The increased tension on spring 78 causes the mechanism to follow the drive shaft against the retarding action of the dash pot.

The drive shaft is connected to the full stroke sector by a safety or disconnectible connection which is best illustrated in Figs. 3, 3A and 4. The full stroke sector carries a stud 82 which projects through a slot in the side frame 51. This stud or pin carries a pawl 83 having a hooked end or nose 87 for engaging the end of an arm 89 fixed to the end of the drive shaft 71. The stud 82 has fixed to it an arm or plate 84 (Figs. 3, 4, and 4A) carrying a pin 85 that projects from both sides of the plate. The inwardly extending end of the pin serves as a limiting stop for the pawl 83 whose shoulder 86 is held against the pin by a spring 87 one end of which is connected to pin 85 and the other end to the pawl 83. The pawl is thus normally urged in a direction to cause its nose to engage under the arm 89 on the drive shaft. The arm 89 has an opening which is shaped to fit the flattened end of the drive shaft 71 as shown in Fig. 3A and it is held against axial movement on the shaft by a sleeve 91, a washer 92 and a head screw 90. Mechanism which will be later described is provided for moving the pawl 83 out of engagement with the arm 89 to disconnect the sector 76 from the drive shaft when the machine is not properly conditioned for operation.

Springs 96 for returning the operating mechanism are connected to the stud 77 on the sector 76 by metal stirrups 93 positioned on the stud on opposite sides of the cam 73 (Figs. 2 and 5). A plurality of coiled springs 96 are connected to these stirrups and to a similar stirrup 95 carried by a cross rod 94 mounted in slots in the ends of the side frames 51 and 52. This mounting of the springs permits them to easily adjust themselves and the plurality of springs secures a more uniform and a smoother action for the return stroke of the machine than if a single powerful spring were employed. It will also be noted that an equal number of springs is located on each side of the cam 73. During the return movement, the stud 77 contacts the shoulder 80 on the cam 73 and the springs 96 thus act directly on the cam. The center line of the springs coincides with the center line of the cam 73 so that a straight line action is secured without any tendency to twist or turn the parts.

From the above description of the operating mechanism as far as explained, it will be clear that, when the handle is pulled forward, the shaft 71 and the arm 89 are rocked counter clockwise, as viewed from the right hand side of the machine, thereby rocking the full stroke sector 76 counter clockwise and through the heavy coil spring 78, rocking the driving unit counter clockwise. When the handle is released at the end of its forward stroke, the springs 96 return the parts to their normal position during which movement the nose 87 of the pawl 83 remains in engagement with the arm 89 and the pin 77 on sector 76 remains in engagement with the shoulder 80 on the cam 73.

*Electric drive*

The machine is arranged to be electrically driven as well as to be manually operated and, for this purpose, a motor 100 is provided which is secured to the frame members 51 and 55 by means of screws projecting through ears on the motor support. It will be observed, by referring to Figs. 1, 2 and 3, that the motor and its driving connections constitute a compact unit which is attached to the outside of the machine frame and which is partially located under the keyboard. The compact construction of the machine which permits the mechanism other than the keyboard to be contained within a narrow frame allows room for the motor at the side of the machine and under the keyboard so that the casing need not have any widened portion or projections to accommodate the motor. The whole machine with the electric drive is contained within a small casing of uniform width.

The motor rotates a crank 102 connected to a pitman 103, pivoted at its forward end to a lever or arm 104 journaled on the sleeve 91, as illustrated in Fig. 3B. The forward end of the lever 104 is shaped like the arm 89 on the drive shaft and its shoulder 105 (Figs. 3, 4A and 4B), is adapted to engage a nose 106 on a pawl 107, similar to the pawl 83 and also journaled on the stud 82 on sector 76. A spring 108 corresponding to the spring 87 is connected at its upper end to a pin 111 on the pawl 107 and at its lower end to a pin projecting laterally from the horizontal arm of a latch 109 pivoted on the stud 85. This spring 108 tends to rock the pawl 107 rearwardly to carry its nose 106 into the path of movement of the shoulder 105. This movement of the pawl is normally prevented by the latch 109 engaging under the outer squared end of the pin 111.

The switch for closing the circuit through the electric motor comprises two contact strips 112, the upper contact being adapted to be moved into engagement with the lower contact by an insulated stud 113 on a switch lever 114 which is journaled on a fixed stud 115 by a yoke shaped bearing on its end. The downwardly extending arm 117 of the lever 114 is provided with a lug 118 engaged by a shoulder 119 on a bar 120. As shown in Figs. 3, 8, 11A and 29, a yoke 121 is journaled on the cross rod 122 carried by the keyboard as will be later described. The forward end of the bar 120 is pivoted to a downwardly extending arm integral with the left side of the yoke 121 and, as shown in Fig. 29, an arm 124, carrying a touch or motor starting bar 125, is rigidly secured to the right hand end of the yoke 121. The arm 124 has a downwardly extending projection which, when the handle 70 is on the shaft 71, engages the collar on the handle, thus preventing depression of the touch bar and operation of the machine by the electric motor when the handle is in place. When the touch bar 125 is depressed, to operate the machine electrically, the yoke 121 is rocked counter clockwise about the shaft 122 as shown in Fig. 3 and the bar 120 is drawn forwardly and, through the engagement of its shoulder 119 with the lug 118, the lever 114 is rocked to carry the stud 113 into engagement with and move the upper contact strip 112 to close the electric switch. The motor then oscillates the lever 104 through the crank 102 and pitman 103.

The motor drive is normally disconnected from the operating mechanism of the machine but, as the motor switch is closed, the pawl 107 carried by the sector 76 is connected to the arm 104 moved by the motor. This connection is effected by the switch lever 114 which projects over a lug 126 on the latch 109 (Figs. 3 and 4) so that, when the lever 114 is rocked downwardly to close the switch, it engages the lug 126 and moves the latch 109 counter clockwise to carry its shoulder 110 out of engagement with the pin 111 whereupon the spring 108 rocks the pawl 107 clockwise. If, at the time the latch 109 is tripped, the lever 104 is in the position shown in Fig. 3, the nose 106 on the pawl 107 is carried under the shoulder 105 on the lever 104 and the motor is connected to the machine. However, the lever 104 may have been brought to rest at some other position at the end of a preceding operation because the inertia and friction of the moving parts is depended upon to bring the parts to rest after the switch is opened. If the lever 104 is in some other position than that shown in Fig. 3, then, when the pawl 107 is released, its nose 106, does not immediately engage the shoulder 105. The switch has been closed, however, and the motor moves lever 104, such movement being relatively rapid. When the lever 104 is rocked counter clockwise (as viewed in Fig. 3) by the motor, it passes the pawl 107 which is thereupon moved clockwise to cause its nose 106 to project into the path of shoulder 105 and, as lever 104 moves clockwise, the pawl 107 is picked up and the full stroke sector 76 and the driving unit are operated in the same manner as when the handle 70 is used to manually operate the machine. During this operation the arm 89 and the drive shaft 71 are not oscillated, the lever 104 being loose on the sleeve 91 on the end of the shaft 71. Inasmuch as the drive shaft 71 is the only shaft that rotates in the frame plates 51 and 52 and since it does not rotate when the machine is electrically driven, it follows that no shafts are rotated in the frame plates when the machine is electrically driven.

The switch lever 114 is normally held in its open position shown in Fig. 3 by the engagement of a stud 128 on its downwardly extending arm 117 in the rear of the second one of two notches formed in the rearwardly extending arm of a bell crank latch lever 130 journaled on a stud on the machine frame. A spring 131 connected at one end to the arm 120 and at its opposite end to the vertical extending arm of the latch lever 130 normally urges the latch lever to latched position and arm 120 upwardly. When the lever 114 is rocked to close the electric switch it is temporarily held in its rocked position by engagement of the stud 128 in the front notch of the latch lever 130.

The operating mechanism of the machine is disconnected from the motor drive at the end of the forward stroke of the machine at which time a stud 132 (Figs. 3 and 4) on the lower end of the pawl 107 engages under the cam edge 133 of a bell crank lever 134 pivoted on the side frame 51 and normally held against its limit stop 135 by a spring. When the stud 132 engages the cam edge 133, the lever 134 is raised until its forward end engages the boss or hub of the lever 104 and, as the lever 134 can move no further, the pawl 107 is cammed outwardly to carry its nose 106 out of engagement with the shoulder 105, whereupon the restoring springs 96 restore the operating mechanism to normal position the same as when the machine is manually operated. When the pawl 107 is thus rocked outwardly, the latch 109 snaps to normal position moving its shoulder 110 under the pin 111 and thus latching the pawl 107 in normal condition out of the path of the arm 104. The parts then occupy the position shown in Fig. 4B. It will be noted that if the motor is moved farther than desired by the momentum or due to other causes, it will not effect the operating mechanism as the arm 104 with its shoulder 105 is free of the other parts.

The motor switch is opened by the return movement of the machine corresponding to the backward movement of the handle. For this purpose a pawl 137 (Figs. 3, 4, and 4B) is pivoted on the switch lever 114 and a spring 138 normally holds a limit stud on the pawl 137 in engagement with the lower edge of the lever 114. Near the end of the forward stroke of the machine, the pin 85 engages the forward edge of the pawl above its shoulder 140 and rocks the pawl 137 until the pin moves out of engagement with this forward edge whereupon the spring 138 rocks the pawl 137 counter clockwise to carry its shoulder 140 over the pin 85. During the return stroke of the operating mechanism the pin 85, through its engagement with the shoulder 140, raises the pawl 137 and thus rocks the switch lever 114 to normal position whereupon the switch 112 is opened. The pin 85 moves out of engagement with the shoulder 140 as the lever 114 moves to normal position.

The electric drive is normally set into operation by a momentary movement of the touch bar and, if the touch bar 125 is released as soon as the motor switch is closed, the spring 131 (Fig. 3) draws the arm 120 rearwardly and restores the touch bar 125 through the yoke 121. The shoulder 119 is thus moved rearward again so that, when the switch is opened, the arm 117 of the switch lever 114 can move back to the position shown in Fig. 3. If the operator should hold the touch bar down for some time during the forward stroke of the machine, the pin 85 engages the upper edge of the arm 120 and rocks it downward as illustrated in Fig. 4 against the action of its spring 131 to carry the shoulder 119 out of engagement with the lug 118. This frees the lug 118 on the arm 117 of the switch lever from the shoulder 119 and the return movement of the operating mechanism can return the switch lever 114 to open position even though the arm 120 is to the right of the position shown in Figs. 3 and 4. The continued holding down of the touch bar will not set the motor into operation again because, after the return of the parts as above described, the lug 118 on the switch arm 117 contacts the upper edge of the arm 120 to the left of the shoulder 119 and the switch arm cannot be moved to close the switch until pressure on the touch bar has been released to permit the arm 120 to be moved back far enough for the shoulder 119 to engage behind the lug 118. It will thus be clear that the machine cannot be operated twice by holding the touch bar down longer than necessary.

Dash pot

Journaled on a cross rod 142 (Figs. 2 and 5) supported in the frames 51 and 52 which rod also serves a number of other purposes hereinafter described, is a yoke shaped member 143 having a downwardly extending arm connected by a link 144 to the driving plate 74. The sides of the yoke shaped member 143 have rearwardly extending arms carrying a rod 148. The dash pot may be of any approved construction and the upper end of its piston 149 projects through the rod 146 and a U-shaped member 150 on the rod, being secured thereto by a nut. The dash pot operates in the usual way to aid in effecting a smoother operation of the machine.

Full stroke devices

Referring to Figs. 5, 6 and 7 it will be seen that the full stroke sector 76 is provided with notches on its upper curved surface and that a full stroke pawl 153 cooperates with this portion of the sector in order to compel a full stroke of the sector 76 and, accordingly, of the handle 70 or the motor in a manner that will be clear to those familiar with the art.

It is necessary to have the operating mechanism as well as the sector 76 make a full stroke. As heretofore explained, the connection between the full stroke sector and the operating mechanism is a resilient one which permits movement of the sector relative to the operating mechanism under certain conditions. If the full stroke sector should be jerked forward so violently by the operating handle or the motor that the sector is moved relative to the operating mechanism which is retarded by the dash pot, it is conceivable that the sector 76 might make a full stroke and start on its return stroke before the operating mechanism had come forward a full stroke. In order to prevent this, the full stroke sector is provided with a toggle lock that holds it at the end of its full stroke until the operating mechanism reaches the end of its full stroke and unlocks the toggle.

This toggle lock comprises the link 154 (Figs. 5, 6 and 7), pivoted on the full stroke sector 76 and to a link 155, pivoted on the side frame 52. A pin 157 connects the two links together said pin being pivoted in link 154 and projecting through a slot in the link 155. A spring 158 is connected to an extension of the arm 155 to normally urge the toggle toward locked position as shown in Fig. 7. It is held in unlocked position by the engagement of the lug 156 on the arm 154 with the edge of the sector 76 as illustrated in Fig. 6. Upon the forward stroke of the machine, the sector 76 moves counter clockwise from the position of Fig. 6 to that of Fig. 7. The edge of sector 76 is shaped so as to release the lug 156, and the spring 158, as well as the movement of the sector, tends to extend the toggle toward locked position. If the sector 76 is not ahead of the operating mechanism including the restoring cam 73 that carries the stud 79, the stud 79 engages the upper edge of the toggle link 155 before the toggle reaches its locked position and thereby prevents it from locking the sector 76. If, however, the sector 76 has been jerked ahead of the operating mechanism, the stud 79 will not be in a position to contact the link 155 and the toggle will be thrown into locked position to prevent the sector 76 from being started on its return movement. It is released, however, by the operating mechanism when it reaches the end of its full stroke at which time the stud 79 forces the toggle over center and unlocks it to permit a return movement of the sector 76. This insures a full stroke of the operating mechanism as well as of the sector 76 and the operating handle or motor drive.

Keyboard

The keyboard is self contained, being assembled as a unit so that it may be readily attached to and detached from the machine independently of the other mechanisms.

The keyboard frame comprises a top plate 159 and a bottom plate 160 (Figs. 5, 8 and 9) spaced apart by and secured to three vertical plates 161. As shown in Fig. 5, the lower edges of the plates have projections 162 extending through slots in the lower plate 160, the corners of the projections being swedged out to form projections bearing against the lower face of the plate 160. Each vertical plate 161 is provided with rectangular openings 163 below its edge and narrow slots 164 extending from the openings to the upper edge of the plate which, at this point, is provided with projections 166 that extend into slots in the plate 159. Mounted in the openings 163 are round nuts 165 having grooves 165' across their upper faces into which the upper edges of the openings 163 are adapted to be seated. In assembling the above described parts, the nuts 165 are slipped into the openings 163 and then raised so that the upper edges of the openings engage in the grooves 165' and then the sides of the openings immediately below the nuts are struck out by any suitable tool to form projections 167 which hold the nuts in such position. The plate 159 is then placed on the plates 161 with the projections 166 fitted into slots in the plate 159 and screws 169 are screwed into the nuts 165, the heads of the screws then projecting laterally over the plate 159 as shown in Fig. 1.

As illustrated in Figs. 5 and 11, the forward and rear ends of the plates 161 are provided with depending projections 170. The rear projections extend downward just outside of the sides of the machine frame and are provided with openings to receive holding screws which are threaded into the end of the shaft 142 on the machine frame. The two right hand plates 161 are provided with downwardly extending hooks 172 which are adapted to engage over headed studs 173 on the frame plates 51 and 52. To remove the keyboard it is only necessary to withdraw the screws in shaft 142, shift the keyboard slightly rearward, and then raise it off of the machine as a unit.

As shown in Fig. 1, there is a plurality of banks of amount keys and a bank of control keys comprising the sub-total key "S. T.", the total key "T", the non-add key "N. A.", the repeat key "R" and the error key "E". The amount and control keys are suitably mounted to slide in slots formed in the keyboard plates 159 and 160. The stem of each amount key has two long parallel vertical slots 176 (Fig. 9) and two short slots 176a. Plates 177 (best shown in Fig. 10), one for each bank, extend through the right hand slots 176 of the amount keys and these plates are held firmly in position by means of a rod 178 which projects through these plates and the fixed plates 161 of the keyboard frame. The plates 177 have projections contacting the lower face of the plate 159. The stems of the control keys, as shown in Fig. 9, have enlarged slots 179 and a plate, corresponding to the plates 177, projects through these slots 179. Locking plates 180, one for each bank of amount keys, projects through the left hand slots 176 in the key stems and a somewhat similar locking plate 180 (Fig. 11) projects through the slots in the control keys.

As shown in Figs. 9 and 12, the lower ends of the key stems of the amount and control keys are provided with holes 181 and as shown in Figs. 10, 11 and 12 an extensible coil spring 184 projects through the holes of the keys for each bank and also through pressed out eyes 182 formed in the lower plate 160 and between the keys. A small rod 183 projects through the rearmost loops of all of the springs 184 while a shorter rod projects through the foremost loops of the springs for the bank of amount keys and a pin 185 projects through the foremost loop of the spring for the control keys. The springs 184 tend to hold the keys in normal undepressed condition in which condition the lower ends of the left hand slots 176 in the amount keys and the lower ends of the slots 179 in the control keys firmly engage the lower edges of the plates 177. It will be noted that the vertical projections 186 on the locking plates 180 do not contact with the upper keyboard plate 159 so that the keys do not bind against these plates which are thus more easily reciprocated. When a key is depressed the spring 184 for the particular bank is extended as illustrated in Fig. 12, and upon release of the key, as will be presently described, the spring restores the key to normal undepressed condition.

The projections 186 (Figs. 3 and 10) of the locking plates 180 are provided with noses forming shoulders and having inclined upper edges. When a key is depressed, the upper end of its left hand slot 176 engages the inclined edge of one of these noses and slides the plate 180 rearwardly in opposition to the tension of its spring 190, which is connected at one end to the fixed plate 177 and at its other end to the plate 180. At the end of the depression of the key, the spring 190 draws the plate 180 forwardly to carry the nose on the projection 186 over the lower edge of the left hand slot 176a, thus latching the key in depressed condition but the plate 180 is not quite as far forward in its latching position as when in normal position for a purpose hereinafter described. Each of the control keys, with the exception of the error key, is latched in depressed position by an appropriate latching plate 180 in the same way as the amount keys are latched in depressed condition. It will be clear that, if a second key is depressed in the same bank, the first depressed key is released and the second key is latched in depressed position, the keyboard being a flexible one.

An important advantage of the control key construction is that the control keys are quite similar to the amount keys; they are carried by the keyboard section together with their locking and interlocking plates, and these parts are on the outside of the keyboard spacing plate where they are easily accessible.

*Key release and disabling mechanism for machine when it is not properly conditioned for operation*

It is desirable to prevent operation of the machine when it has not been properly conditioned for operation as, for example, when an amount key is only partially depressed or when an amount key and the sub-total or total key have been depressed, in order to prevent a misoperation of or damage to the machine.

Heretofore it has been customary to lock the operating handle against actuation under such circumstances but the interlocking mechanism used has been quite complicated and, in some instances, an attempt to operate the handle would result in injury or damage to the parts. To prevent misoperation or injury of the machine under the conditions mentioned, and also other conditions which will be referred to later, I have made provision for permitting full operation or stroke of the handle or of the electric motor, as the case may be, without effectively operating the operating cam 73 and plate 74 and, to this end, have provided means for disabling the pawl 83, if the machine is manually operated, or the pawl 107, if the machine is electrically operated, near the beginning of the forward movement of the full stroke sector 76 to thereby automatically disconnect the operating mechanism from the driving means as the machine starts to operate when it has not been properly conditioned for operation. The means for disabling the pawls will now be described.

A tripping or safety control rod 191 is carried by two arms 192 (Figs. 2 and 10) journaled on the cross rod 122 supported by the downwardly extending forward ends of the plates 161 of the keyboard. This rod is normally urged rearwardly by a spring 214 shown in Fig. 2. A lever 193, (Figures 2 and 3), the rearward extending arm of which is provided with a pin 194, is also journaled on cross rod 122 and the control rod 191. As shown in Figs. 3, 8, 10 and 11, the forward ends of the latch plates 180 are hook-shaped and they engage laterally extending lugs 195 (Fig. 3) formed on the upper ends of zero stop members 196 pivoted on the rod 122. These members, one for each bank of keys, have yoked portions to facilitate their mounting on the rod 122. As best shown in Fig. 10, the members 196 for the amount key banks are provided with zero stop arms 197 which, as will be explained more fully later, arrest the differential mechanisms for the appropriate banks in zero positions when keys in the corresponding banks are not depressed. The lower ends of the members 196 are forked to form two depending projections 198. The front projection 198 normally engages the rod 191 owing to the fact that the members are normally urged counter clockwise by the latching plates 180 that are pulled forward by the springs 190. As one of the amount keys, or one of the control keys other than the error key, is fully depressed, rearward movement of the latch plate 180 rocks the corresponding lever 196 clockwise and, when the latch plate slides slightly forward to latch the operated key in depressed condition, the member 196 swings back toward normal position. If the key is held in partially depressed position the plate 180 is prevented from moving to latched position because of the engagement of the forward end or the incline of the nose on the appropriate locking projection 186 with the portion of the key stem between the slots 176 and 176ª, and the corresponding member 196 is held in its moved position with a result to be presently explained.

As shown in Fig. 11, the plate 74 of the driving unit carries a roller stud 200 which is normally in engagement with the rear end of a slide 201 mounted to slide in slots in the laterally extending arms of two yoke pieces 202 (Fig. 2 and 11) fastened to the side frame 52. A stud 203 on the side frame 52 projects through a slot in the slide 201. The forward end of the slide 201 is connected to a spring 205 which normally tends to move the slide rearwardly and at the same time to rock it clockwise about the pin 203. This rocking movement is normally prevented by the engagement of a projection 206 on the slide with the rear lateral portion of the yoke piece 202. The forward end of the slide 201 is of irregular shape and the upper edge portion 207, which is stepped rearwardly of the vertical lower edge portion 208, normally engages a roller 209 on the rod 191.

Upon operation of the machine, either manually or electrically, the plate 74 is first rotated counter clockwise as viewed in Fig. 11 and the stud 200 is carried rearwardly near the beginning of the operation. The spring 205 is thus permitted to draw the slide 201 rearwardly and, at the same time, rock it about the pin 203, the rearward movement of the slide being limited by engagement of the pin 203 with the forward end of the slot through which it projects and the rocking movement being limited by the engagement of a projection 213 on the forward end of the slide with the under side of the roller 209. As the slide 201 moves rearwardly, a spring 214, (Fig. 11) connected at its forward end to the rod 191, swings this rod rearwardly about the cross rod 122 as an axis.

Referring now to Figs. 3, 3A, and 4, the pin 194 projecting from the lever 193 engages in a cam slot 210 formed in one arm of a lever 211 which is journaled on the stud 115. This lever also has a downwardly projecting arm provided with a nose 212 which normally projects into the path of the shoulders 215 on pawls 83 and 107 which connect the sector 76 to the drive shaft 71 and the motor operated arm 114 respectively. Unless the nose 212 is moved when the machine starts to operate, the driving mechanism will be disconnected from the operating mechanism as will now be explained.

When the machine is operated under normal conditions, the rearward movement of rod 191 at the beginning of the forward stroke rocks the lever 193 about the rod 122 and raises the stud 194 in the slot 210 of the lever 211. During the first part of movement the stud moves through the arcuate portion of the slot 210 and does not move the lever 211, but as the stud continues to move, it strikes the top of the slot and moves the lever 210 in a counter clockwise direction to carry the nose 212 out of the path of the shoulders 215 on the pawls 83 and 107. Thus, during a normal operation, either manually or electrically, the nose 212 of lever 211 is automatically moved away from a position in which it would disconnect the mechanism from the drive shaft or the motor.

During this operation the differential mechanism for any bank of keys in which no key has been depressed is prevented from moving. When the rod 191 moves rearwardly, the springs 190 (Fig. 10) connected to the latching plates 180 move the plates forwardly for the banks of keys in which no keys have been depressed, thus rocking the corresponding zero stop members 196 and moving the zero stop arms 197 for the amount banks into position to prevent movement out of zero position of the differential mechanisms for those banks. The latching plates 180 for the banks of keys in which a key has been depressed are also moved forwardly, such action being possible due to the fact that the latching plates are not quite in contact with the key stems of depressed keys as previously explained, but the depressed keys prevent their plates from moving forward sufficiently to permit their members 196 to move far enough to move the zero stop arms 197 in front of the differential mechanism.

Also during this operation, the amount keys are locked against operation. The plates 180 for the banks (including the control bank) in which no keys have been depressed are carried forwardly past their latching positions to move the outer ends of their projections 186 under the upper edges of the slots 176 in the undepressed keys thus locking the keys in undepressed condition during the operation of the machine while taking a total or sub-total. Likewise, the plates 180 for the banks of keys in which a key has been depressed are moved slightly forward from their latching positions, the movement being sufficient to carry the outer ends of the projections 186 into position to lock the undepressed keys in those banks against operation.

After the machine has been operated as above described, the parts are returned to normal postion as follows: Towards the end of the operation of the machine, the stud 200 (Fig. 11) moves the slide 201 forwardly and, near the end of this movement of the slide, it is rocked downwardly due to the engagement of its projection 206 with the rear arm of the yoke piece 202. This forward movement of the slide 201 through engagement of its edge 208 with the roller 209 swings the rod 191 forwardly past its normal position thus rocking the levers 196 and moving the plates 180 rearwardly past normal postion to release the undepressed keys and then, as the edge 208 slides off of the roller 209, the spring 214 swings the rod 191 rearwardly to normal position to permit the springs 190 to restore the plates 180 and the members 196 to normal position.

If an amount key or one of the control keys other than the error key, is only slightly depressed, the corresponding plate 180 is prevented from moving forwardly its full extent and the corresponding member 196 is held in moved condition with its rear projection 198 almost in engagement with the rod 191. Now, near the beginning of the forward stroke of the handle, (assuming for the moment that the machine is manually operated) when the slide 201 moves rearwardly, the rod 191 almost immediately engages the rear projection 198 of the partially operated member 196 and its movement is limited, thus preventing movement of the stud 194 into that portion of the slot 210 of the lever 211, which would cause it to raise lever 211 and thus this lever is not moved out of normal position so that the shoulders 215 on the pawls 83 and 107 engage the nose 212 on the lever 211 thus rocking the pawls forwardly to disconnect them from the arm 89 and the arm 104 respectively. The handle or the motor are thus permitted to move without further operating the mechanism of the machine which is returned to normal position by the springs 96, and this return movement restores the misoperated keys to normal position so that the machine is in condition to be again operated. The keys are restored owing to the fact that the movement of the mechanism before it is disconnected is sufficient to permit the slide 201 to swing upwardly to position its shoulder 208 behind the roller 209 on rod 191 so that, as the machine is returned to normal position by the springs 96, the rod 191 is swung past its normal postion to unlatch the keys.

It is also desirable to prevent operation of the machine when an amount key and the total or sub-total key is depressed and means are provided for preventing the control rod 191 from moving rearward under such conditions to thereby disconnect the operating mechanism from its driving means. The disconnection of the machine under these conditions is described in detail under the section on "Total and sub-total printing."

It will be recalled that the switch for the electric drive is opened by a return movement of the machine. If the machine is disconnected from the electric drive at the beginning of its movement, there may not be sufficient return movement to open the switch by means of the devices heretofore described. Accordingly, special provision has been made to insure that the switch will be opened. If the mechanism has been automatically disconnected from the motor drive due to a misoperation, the movement of the pin 85 is not sufficient to carry it under the shoulder 140 of the pawl 137 and hence the motor switch 112 cannot be broken through this pawl 137 as in a normal operation of the machine. Therefore I have provided an additional wipe pawl 220a for accomplishing this function during an operation of the motor in which the pawl 107 is tripped by the lever 211. The pawl 220a is pivoted on the lever 114 and its spring normally retains it in engagement with a limiting pin on the lever 114 as shown in Figs. 3 and 4. As the pin 85 swings downwardly, it engages the downwardly projecting finger on the pawl 220a and thus rocks this pawl in opposition to its spring. The pin 85 is moved to the dotted line position (numbered 85a in Fig. 4B) before the pawl 107 is disengaged from the lever 104 but this disengagement occurs before the full stroke pawl becomes operative to prevent a return of the disengaged operating mechanism. When the operating mechanism is automatically disconnected the pin 85 moves back toward normal position with the operating mechanism while the lever 104 continues its movement. As the pin 85 moves to its position 85a, it engages the cam surface 120a of the arm 120 and thereby moves said arm to carry its shoulder 119 out of engagement with the lug 118 on the switch lever 114 the same as during a normal operation of the machine so that the lever 114 may be rocked back to open position. Then upon return movement of the pin 85, it engages behind the downwardly extending finger on the wipe pawl 220a and thus rocks the switch lever 114 to normal position to open the switch 112. As the lever 114 moves to normal position, this finger on the pawl 220a is carried out of engagement with the pin 85.

The various parts are proportioned so that the automatic disconnection takes place before the full stroke pawl becomes operative to prevent the return of the operating mechanism to normal. It might be thought, at first glance, that the switch member 117 could not be rocked back to normal by stud 85 contacting pawl 220a because the shoulder 119 would be holding lug 118 of switch member 117. However, the motor touch bar is ordinarily released immediately after depression and, when released, it moves back to normal which moves arm 120 to the left in Fig. 2 and frees the switch member 117. If the touch bar were not released quick enough or even if it were held down, no damage would result. The stud 85 would strike the pass-by pawl 220a and be blocked which would block the return of the operating mechanism of the machine under the influence of its springs. This blocking would not be noticeable if caused by lack of quickness on the part of the operator in releasing the motor bar as the motor bar would be released in a fraction of a second and the parts would be moved to normal. If the motor bar should be held down, the return of the stud 85 and the operating mechanism of the machine would be blocked by the pass-by pawl 220a and the switch would remain closed but the motor could do nothing but pick up the machine and immediately release it again owing to the operation of the automatic disconnecting mechanism. As soon as the operator releases the motor bar the parts will move to normal.

The control rod 191 and its associated parts thus serve as a safety control unit or device for disconnecting the mechanism from its driving means when the machine has not been properly conditioned for operation and for otherwise securing coordinated action of the different parts of the mechanism as has been and will be further explained.

*Control key and subtraction lever interlocks*

As shown in Figs. 8 and 12, mounted to slide between the fixed plate 177 and the latch plate 180 for the control keys are a number of plates 223 and a plate 223a for preventing total depression of more than one control key (other than the error key) at the same time. The plate 223a has a slot 224 the rear end of which normally engages a stud projecting laterally from the fixed plate 177. A limiting stud 225, also on the fixed plate 177, projects behind the rear plate 223. When one of the control keys (other than the error key) is depressed, the part of the key stem above the slot 179 passes between the two adjacent plates 223 or in front of the foremost plate 223 or back of the rearmost plate, as the case may be, thus locking the plates against movement and preventing depression of another control key (other than the error key) as will be well understood.

As will be explained more fully later, the machine illustrated in Figs. 1 to 29 is constructed to both add and subtract. A manually operable lever 226 is employed to condition the machine for addition or subtraction and means are provided for preventing operation of this lever during operation of the machine. Means is also provided for preventing effective operation of the machine when this lever 226 is in subtracting position and the total or sub-total key is depressed.

These means will now be described. The lever 226 is pivoted on a stud 227 projecting laterally from the side frame 52 and the upwardly extending arm of the lever, which is adapted to be grasped by the operator, projects through slots in the keyboard plates 159 and 160. When the lever 226 is in adding position, as shown in Fig. 11, and the machine is operated, the right hand end of the rod 191 is carried rearwardly over the forward extending arm of the lever 226 and, when the lever is in subtracting position, that is, in its rearward position, the end of the rod 191 is carried under the rearwardly extending arm of the lever 226 thus locking the lever against movement during operation of the machine.

The plate 223a (Fig. 12) is provided with a lateral projection 228 extending behind the vertical arm of the lever 226. When the lever is moved to subtracting position, it engages the projection 228 thereby moving the plate 223a and plates 223 rearwardly. If one of the control keys (other than the error key) is in depressed condition, the plate 223a is prevented from moving rearwardly, as illustrated in Fig. 12, and the lug 228 prevents the lever 226 from being moved rearwardly its full extent to subtraction position. The forward end of the horizontal arm of the lever 226 then stands behind the end of the control rod 191 so that, upon operation of the handle, the rod is prevented from swinging rearwardly its full extent and the operating mechanism automatically is disconnected from the driving means as herein before explained. Also, if the total, sub-total, or non-add key is depressed, it forces the control lever 226 forward to a position such that it causes the operating mechanism to be disconnected.

It will thus be noted that the control lever 226 cannot be moved from one position to the other while the machine is being operated, and that the operating mechanism of the machine is disconnected from the driving means if the control lever is carelessly positioned, if it is moved to subtraction position while a control key is depressed, or if a control key is depressed while the lever 226 is in subtraction position.

*Error key*

An error key is employed to release any depressed amount key or control key when the wrong amount is set up on the keyboard or the incorrect control key is depressed. To this end, the latch plate 180 for the control keys has pivoted thereon an arm 229 (Fig. 11) the upper forward end of which projects into a notch (Fig. 12A) formed in the error key stem. When the error key is depressed, it moves the latch plate 180 for the control keys rearwardly to an extent considerably further than when the plate is moved rearwardly on depression of one of the other control keys, with the result that the corresponding member 196 is rocked clockwise sufficiently to force the rod 191 forwardly and, upon this movement of the rod, it engages the forward projections 198 on the members 196 for the banks of amount keys, thus moving all of the plates 180 for those banks rearwardly to release all of the depressed keys. When the error key is released, the spring 214 swings the rod 191 back to normal position and the springs 190 move their latch plates 180 forwardly to normal position.

Repeat key

When the repeat key (Fig. 11) is depressed, for the usual well known purpose of preventing release of the depressed amount keys at the end of an operation of the machine so that the machine may be operated again to enter the same amount, the lower end of its stem engages the upper end of a lever 231 pivoted to the stud 227. This lever 231 carries a roller 231a resting on the upper edge of the slide 201. It will be evident that, with the repeat key depressed, the lever 231 is held against movement so that, when the slide 203 is drawn rearwardly, the roller 231a prevents its rocking movement with the result that the slide reciprocates idly when it is moved forward during the return movement of the machine as its forward edge 208 is not carried up back of the roller 209. Thus the rod 191 is not moved forward and the depressed amount keys are not released so that the operation of the machine may be repeated to enter the same item standing on the keyboard. This may be repeated as many times as desired by leaving the repeat key in depressed condition, this key being finally released by manual operation of the error key.

Differential mechanism

A comb plate 232 (Figs. 3, 10A, and 10) is supported in the side frames 51 and 52 and is provided with upper and lower slots in which the forward ends of stop bars 233 slide, said forward ends being divided as illustrated, with the upper arm of the bar sliding in the upper slot and the lower arm sliding in a lower slot directly beneath it. The stop bars are thus guided and prevented from being displaced both laterally and vertically. There is one of these stop bars 233 for each bank of amount keys and their rear ends are supported by vertical arms 234 integral with actuating segments 235 for operating the totalizer pinions 236 as will be described later. The segments 235 are pivoted on a cross rod 237 and are held against lateral movement on the rod by four comb plates 238 seated in grooves in the rod 237.

As shown in Figs. 2 and 9, the segments 235 are arranged in close proximity between the side frames 51 and 52 and the arm 234 for the fifth bank extends vertically from and is in the same plane as its segment while the arms on either side of the center segment have inclined outwardly and upwardly extending portions which are progressively longer from the center outwardly so that while the right hand segment 235 is approximately midway between the side frames 51 and 52, yet the upper end of its arm 234 is near the side frame 52 and the upper ends of the arms 234 for the four left hand segments are to the left or on the outside of the frame 51, the inclined portions of the arms extending through an opening in the side frame 51. It will be noted by observing Fig. 1 that the four left hand key banks are to the left of the side frame 51 and this part of the keyboard extends over part of the electric motor and the driving connections described above. The left hand portion of the base plate 62 (Fig. 1) carrying the inking ribbon and paper strip also projects over part of the electric motor.

This arrangement of parts is an important feature of my invention as it affords a very compact and simple assembly with the keyboard of full and convenient width, the printing and totalizing mechanism between the side frames, the motor and driving connections under the keyboard and the paper and ribbon unit, thus conserving space and affording ready accessibility to the parts for the purpose of inspection, adjustment and repair. As shown in Fig. 1, 9 and 11, the bank of control keys is to the right of the right hand side frame 52 and, as will be described later, the mechanisms controlled by these control keys are mounted on the outside of the side frame 52 and hence are very accessible.

A cushioning connection has been provided between the stop bars 233 and the arms 234 of the actuators. This connection prevents the shock of the sudden stopping of the bars 233 from being transmitted to the actuators and through them to the type bars to cause the latter to jump or vibrate. This connection not only improves the operation of the machine but lengthens its life by taking the jar out of its operation.

Projecting from the upper end of each arm 234 (Figs. 10 and 10A) is a pin 239 provided with a groove. This pin projects through a slot 241 in its associated stop bar 233. The stop bar accordingly has a limited movement relative to the pin and therefore relative to the actuator segment and its type bar. A connecting piece 243 is provided having an arm 244 and a lateral projection 245 which engages against the side of the bar 233. It also has a lower projection 246 the edge of which engages the under side of the bar 233 and is provided with a shoulder 247 engaging a notch 248 formed by a projection on the bar 233, which notch is wide enough to permit the shoulder to rock in the notch as will appear presently. The connecting piece 243 also has a recess 249 the edges of which project into the groove in the stud 239. Springs 250 are connected at one end to the arms 244 to normally urge the connecting pieces in a counter clockwise direction as viewed in Fig.

10A. The opposite ends of these springs are held in position by a rod 251 which engages the forward face of the comb plate 232. The springs move the stop bars forwardly when the actuator segments are released by the raising of the restoring bail 256.

When a stop bar 233 is abruptly arrested, its segment carrying the stud 239 may move forward a slight distance relative to it, thereby carrying the stud 239 forward in the slot 241, but the stud can move only by rotating the connecting piece 243 in a clockwise direction (Fig. 10A) against the tension of spring 250. The spring 250 thus takes the shock and gives a cushioning effect which prevents the sudden stopping of the bar 233 from causing the segments 235 and their type bars from vibrating or jumping. In addition to cushioning the shock, the connecting piece and spring serve to counter balance the weight of the forward end of the bar 233 through the medium of the projection 246 whose shoulder 247 is normally urged against the edge of the notch 248 below the pivot of the stop bar on pin 239. This tends to lift the front end of the bar and counterbalance its weight. The forward end of the bar is thus prevented from vibrating and the life of the parts is lengthened by lessening the friction due to the weight of the bar sliding on the comb plate 232.

It will be noted that the springs 250 thus serve three purposes: they move the stop bars when the machine is operated; they counterbalance a portion of the weight of the stop bars; and they act to prevent the shock of the stopping of the bars from being transmitted through the actuator racks to the type bars.

The stop bars 233 are provided with stops 252 one for each key, except the "9" key, so that, when the stop bars 233 are drawn forwardly by their springs 250 during the forward stroke of the handle, the appropriate stops contact with the depressed keys to arrest the stop bars, and hence their segments 235, in positions corresponding to the values of the keys depressed, as is well understood in the art. As shown in Figs. 10 and 10A, the lower ends of the key stems are alternately cut away at one corner or the other and the stops 252 for the "6" and "8" keys are offset laterally so that the stops will only engage the stems of the appropriate keys. Normally the actuating segments 235 and the stop bars 233 are held in the position illustrated in Fig. 10 by the engagement of a cross bar 255 of a restoring bail 256 with the segments 235. During the forward stroke of the operating handle, the bail 256 is rocked counter clockwise, as will be presently described, whereupon the springs 250 slide the stop bars 233 forward in banks where keys have been depressed, and rock the actuator segments 235 until they are arrested by the depressed keys. On the return stroke of the handle, the bail 256 is rocked clockwise thereby restoring the segments and stop bars 233 to normal position. If the "9" keys are depressed, the stop bars 233 are moved forwardly nine steps and are arrested in their "9" positions by engagement of the rear ends of slots 257 formed therein with the comb plate 232.

The side arms of the bail 256 (Figs. 2 and 10) are in the form of bell crank levers pivoted on the cross rod 237 and the forward upper ends of the levers carry a cross rod 259 having a roller 260 adapted to ride on the edge of the cam plate 73. These side arms of the bail are also connected by a cross rod 263 and a spring 258 is tensioned between this cross rod and the rod 148. Upon the forward stroke of the handle, the cam 73 permits the spring 258 to rock the bail 256 counter clockwise whereupon the released sets of stop bars 233 and actuating segments 235 move forwardly to different extents and upon the return stroke of the handle, the cam plate 73 restores the bail 256 in opposition to the spring 258 thus restoring these parts to normal position.

In case no key is depressed in a bank and the machine is operated, the member 196 for such bank is rocked counter clockwise, as viewed in Fig. 10, in the manner heretofore described to carry the rear end of the zero stop arm 197 in front of the forward end 261 of the lower arm of the stop bar 233, thus preventing movement of the stop bar and corresponding actuating segment out of normal zero position. Near the end of the operation of the machine the rod 191 returns the members 196 to normal position and lowers the stop arms 197 from in front of the stop bars 233 which have been restrained from movement thereby.

*Printing type bars and hammers*

Pivotally mounted on each segment 235 is a type bar 264 (Figs. 1 and 10) provided with fixed printing type 262 for printing on a record strip 265 fed about a platen 266 as will be described later. The lower end of each bar is provided with a pin 265' projecting through a hole in the corresponding segment 235 and the pin is held in place in the opening by an arm 266' the lower end of which is forked to engage in a groove in the pin. The arm 266' is also provided with a notch engaging over a pin 268 on the type bar and a spring 269 holds the arm 266' in the assembled position shown in Fig. 10. It will be obvious that this simple form of connection permits an expeditious assembly of the parts and at the same time, the spring 269 retains the type bar forwardly in its normal position and restores it to such position when it is moved rearwardly by hammers 270 to print on the strip.

When the actuator segments 235 are moved differentially under the control of the amount keys, the type bars 264 are raised to bring the corresponding type to the printing line and then the hammers 270 (Figs. 10 and 20) are tripped to drive the type against the platen for the purpose of making a printing impression.

The hammers 270 are pivoted on a rod 271 supported by depending ears struck downwardly from the plate 56. Riveted or otherwise secured to the forward depending flange of the plate 56 is a U-shaped plate 272, the rearwardly extending flanges of which form a comb plate in the slots of which parts of the hammers 270 project to space them apart and guide them in their oscillating movements. The upper ends of the type bars 264 also project into the slots in the upper comb to prevent lateral displacement of the upper ends of the type bars. The vertical arms of the hammers are provided with noses normally engaging the forward upper edges of the type bars. The hammers are also provided with forwardly extending hooks to which the lower ends of springs 273 are fastened, the upper ends of the springs being connected to a rod 274 carried by arms projecting forwardly from the comb plate 272. The hammers 270 are provided with downwardly and rearwardly extending arms provided with projections 277. The plate 56 with the hammers and associated springs form a sub-unit which serves to hold the main unit and the totalizer unit together.

The tripping mechanism for the hammers includes a yoke-shaped member 279 fixed to a rock shaft 278 that is journaled in the side plates 55 of the totalizer unit. This member has forwardly extending arms 280 which carry at their forward ends a cross rod 281. Trip pawls 283, one for each hammer 270, are provided with notches fitting over the rod 281 and the rear ends of the pawls 283 are connected to the forward ends of springs 282 which are connected at their rear ends to a small rod 284 seated in notches formed in extensions on the arms 280 of the yoke 279. The pawls 283 normally engage lugs 285 projecting laterally from the upper ends of the actuators 235. The rock shaft 278 is operated by a yoke-shaped member 286 (Figs. 2 and 5) pivoted to it to the right of yoke 279 and having a horizontal projection 287 which extends over the right hand end of the rod 281. The member 286 also has a projection 288 extending under the right hand end of the rod 281. The right hand side of the member 286 is provided with an arm, the forward end of which is forked to straddle a roller 290 on the rod 146 which is carried by the yoke-member 143 operated by the plate 74 through the link 144 as described above.

When an actuating segment 235 moves out of normal position, the spring 282 for the corresponding latch 283 rocks the latter about the shaft 281 to carry a shoulder 291 (Fig. 10) on the latch in front of the projection 277 on the appropriate hammer 270. After the type bars have been differentially positioned, by the actuators, the roller 290 engages the upper projection on the forked arm 289 and rocks the member 286, and hence the arms 280, clockwise as viewed in Figures 5 and 10. During this movement, the trip pawls 283 are elevated and the shoulders 291 on those which have been released by the actuators to engage the projections 277 on the corresponding hammers and thereby cock the hammers 270 for the differentially positioned type bars. Near the end of this clockwise movement of the arms 280, projections 292 on the pawls 283 engage a cross rod 293 thereby camming the pawls 283 counter-clockwise about the rod 281 with the result that the shoulders 291 are carried out of engagement with the projections 277, whereupon the springs 273 snap the cocked hammers rearwardly. The type bars are held in engagement with the noses of their respective hammers by the springs 269 and when the hammers are cocked the type bars follow them. As the hammers are fired, the type bars are carried with them, the hammers being stopped by the engagement of the projections on their lower ends with the plates 56 and 272 but the type bars are thrown rearwardly against the paper strip with a percussive blow to print the amount set up in the machine. After the impression is made the type bars are drawn back against the hammers by the springs 269.

After a printing impression has been made, and as the roller 290 moves downwardly, the springs 282, being under tension, rock the arms 280 counter-clockwise, as viewed in Fig. 10, to normal position, this movement being limited by the engagement of the left-hand end of the rod 281 with the forward end of an arcuate slot formed in the left-hand side plate 55, as shown in Fig. 3.

In order to print the "0's" appearing in the amounts printed, each hammer 270, except that of the lowest order, is provided with a laterally inclined projection 276 (Figs. 10 and 20) extending behind the hammer of next lower order. Accordingly, any hammer that is cocked, cocks all those to the right of it that have not been cocked and "0's" are printed by all type bars to the right that have not been positioned to print other characters.

*Elimination of printing*

In some instances it is desirable to enter an item in the totalizer without printing the item on the paper strip, and, in such cases, the yoke-shaped member 286 (Figs. 2 and 5) is shifted towards the right on the shaft 278 to carry its lower projection 288 from under the rod 281 so that, when the member 286 is operated, the pawls 283 are not raised and hence the hammers are not cocked and the type bars do not strike the paper. In order to shift the yoke-shaped member 286, I provide an operating lever 296 (Fig. 5) which is centrally pivoted to the under side of the plate 56. The forward end of the lever 296 is provided with a finger piece 298 and the rear end is provided with a slot (Fig. 2) into which projects a hollow stud 300 carried on the yoke-shaped member 286. From this description it will be clear that, when the finger-piece 298 is moved toward the left to its "non-print" position, the yoke-shaped member 286 is slid towards the right to carry its projection 288 from under the end of the rod 281 carrying the trip pawls so that the hammers are not operated and no printing is done during the operation of the machine. The projection 287 remains in engagement with the upper side of the end of the rod 281 when the member 286 is thus shifted. When the finger-piece 298 is moved towards the right the yoke-shaped member 286 is slid toward the left so that the hammers will be operated and the item printed. As will be later explained, the platen and the ribbon mechanism are disconnected at the same time so that, when no printing is done the paper is not fed through the machine and the ink ribbon is not moved.

Positioned within the hollow stud 300 (Fig. 5) is a spring pressed ball 302 retained in engagement with one or the other of two grooves 303, (Fig. 2) formed in the shaft 278 in order to yieldingly hold the member 286 in either of its set positions.

*Aligning device for actuating segments*

While the printing impression is being taken, the actuating segments 235 and type bars 264 are aligned in their set positions by an aligning bar 305 (Fig. 10) which is in the form of a rock shaft journaled at its ends in the side plates 55 and cut away longitudinally to form an aligning edge 306. Fixed on the shaft 305 (Fig. 5) is an arm 307 carrying a roller 308. A spring 309 normally serves to hold the shaft 305 in the position shown in Fig. 10 with a lug 310 (Fig. 30) on the arm 307 in engagement with the forward edge of the right hand plate 55. Pivoted on a rod 311 (Fig. 5) carried by the yoke-shaped member 143 which operates the dash pot is a lever 312 having a shoulder 313 which is held in engagement with the rear edge of the cross bar of the member 143 by a spring 314. When the member 143 is raised by the plate 74 through the link 144, the spring 314 causes the lever 312 to move with it and, near the end of this movement, the end of the lever 312 engages the roller 308, thus rocking the shaft 305 to carry its aligning edge between the teeth on the actuating segments. After the printing impression has been made, and during the return stroke of the handle, the lever 312 is lowered by the member 143 and the spring 309 rocks the shaft 305 out of aligning position. This rotating aligning shaft with its center near the teeth of the segment prevents the aligning device and the sector from locking and thus insures that the segments will always be released.

*Platen mechanism*

Mounted on the plate 62 (Figs. 1 and 5) are the two parallel vertical plates 63 in which is journaled a shaft 318 carrying the platen 266. Engaging the platen are two feed rollers 319 (Fig. 10) carried in a cradle 320 supported on a rod 321, the side levers of the cradle having notches engaging over the cross rod 321. As shown in Figs. 3 and 5, the ends of the cross rod 321 are reduced in diameter and engage in inclined recesses formed in the plates 63, and springs 324 connected to the ends of the rod 321 tend to raise the cradle 320 and press the feed rollers 319 against the platen.

The paper roll is carried by a cross rod as shown in Fig. 10 and the paper strip is guided by three guide plates 324 beneath the front one of which the last amount printed may be viewed. As shown in Fig. 1, the upper edge of the forward guide plate 324 is provided with a saw-tooth knife edge to facilitate severing the printed portion of the strip when desired. The platen carries a knurled knob 326 by which it may be manually rotated to feed the strip. As shown in Fig. 5, the shaft 318 carries a ratchet wheel 327 adapted to be engaged by an operating pawl 328 to rotate the platen and thus automatically line space the strip. The platen has a sleeve which projects through the side plate 63 and the ratchet is mounted in this sleeve with one pin connecting the ratchet and platen together and to the shaft 318. This not only reduces the number of parts required for the mounting but it also enables the inside end of the platen to be positioned close to the side plate 63 so that the plate acts as a guide for the paper. The pawl 328 is carried on a pivoted arm 329 the lower end of which carries a roller engaging in a recess 330 formed in the upper end of an arm 331 which is integral with the right hand arm 280 of the yoke-shaped member 279 and projects through registering slots in the plates 56 and 62 and the interposed portion 67 of the machine casing. A spring 332 tends to raise the pawl 318 into engagement with the ratchet 327 but this is normally prevented by engagement of the pawl with a fixed stud 333. When the shaft 278 is rocked counterclockwise, as above described in connection with the operation of the type hammers, the plate 331 is moved rearwardly thereby swinging the arm 329 rearwardly. This swings the pivot of pawl 328 downward and, owing to the fact that the spring 332 keeps the pawl urged upwardly, the forward end of the pawl is brought into engagement with the ratchet wheel so that, as the plate 331 returns forward, the ratchet wheel and platen are rotated to feed the strip one linespace. The upper end of the spring 332 is connected to a pivoted arm carrying a roller 334 which engages the teeth of the ratchet wheel and thus aligns the platen.

It will be recalled that when the lever 296 is moved to the "non-print" position the yoke-shaped member 286 is shifted towards the right so that the rod 281 is not elevated and hence the hammers are not operated. As the plate 331 is not operated with the lever 296 in this position, the platen is not rotated and the strip is not line-spaced.

Ribbon mechanism

Mounted on studs on the plate 62 (Figs. 11 and 23) are two ribbon spools 336 which are housed in casings 337. The ribbon is fed from one spool to the other around guide posts 338, as shown in Fig. 1. The ribbon spools are positioned on and suitably connected to ratchet wheels 339. The mechanism (Fig. 23) for feeding the ribbon is of the automatic reversible type being adapted to feed the ribbon in either direction. This mechanism comprises an operating pawl 340 for each ratchet wheel 339. Each pawl is pivoted on an arm of a three-armed lever 341 pivoted on a stud 342. The rear ends of the pawls are connected by a spring 343 which holds the pawls in engagement with the posts 338. A bell crank lever 344 is also pivoted on the stud 342 and its forwardly extending end is recessed to receive a pin 345 projecting downwardly from the forward end of an arm 346 which has a slot 350 through which the stud 342 projects. The pin 345 is retained by a spring 348 in either of two notches 347 formed in the forwardly extending arm of the lever 341. The laterally extending arm of the lever 344 projects into a notch 349 (Fig. 5) formed in the upper edge of the operating plate or lever 331.

With the parts in the condition shown in Fig. 23, upon rearward and forward movement of the plate 331, the lever 344 is rocked first counter-clockwise and then clockwise, as viewed in this figure, and, through the stud 345, rocks the lever 341 to reciprocate the pawls 340. Upon forward movement of the left hand pawl, the left hand ribbon spool is rotated by the engagement of this pawl with its ratchet wheel 339 to feed the ribbon upon the left hand spool. During this operation the right hand pawl 340 does not contact with its ratchet. When the ribbon on the right hand spool is exhausted, the left hand spool and ratchet 339 are locked through the ribbon against further rotation and, upon counter-clockwise movement of the lever 344, the left hand pawl first engages its ratchet and, as the movement of this pawl and the lever 341 is arrested thereby, the lever 344 continues its movement and the stud 345 moves out of engagement with the left hand notch 347 and into engagement with the right hand notch 347 so that, upon subsequent operations of the machine, the right hand spool will be rotated by its pawl 340 and the left hand pawl 346 will be disabled, the feed then being in the reverse direction and upon the right hand spool. When the stud 345 moves from one notch 347 to the other, it rides up the side of one notch and drops into the other, movement of the arm 346 to accommodate this action being permitted by its slot 350.

It will be clear that, when the lever 296 is in its non-print position, the ribbon feed will not be operated as the actuating plate 331 remains stationary as above described.

Character printing

I provide a type bar for printing characters indicating "sub-total", "total", "non-add", and "subtract", this type bar being shown in Fig. 25, where it will be noted that the hammer and trip pawl therefor are the same as for the amount type bars except that the hammer is not provided with a projection 276. The lower end of the character type bar is connected to a segment 351 which is similar to the actuating segments 235 controlled by the amount keys, except that it does not have an arm 234 connected to a stop bar. Journaled on the rod 237 and to the right of the bail 256 is a yoke-shaped member 352 having a downwardly and rearwardly extending arm 353 and an upwardly extending arm 354. The outer end of the arm 353 is connected to a pin 355 on the segment 351 by means of a cushioning device including a connecting piece 356 which is quite similar in construction and identical in function to the above described connecting pieces 243 between the stop bars 233 and arms 234 of the actuating segments 235. This connecting piece 356 has a notch fitting over a groove in the stud 355 and a lug 356ª engaging the edge of the arm 353 while a spring 357 is connected to the connecting piece which thus permits rebound of the yoke-shaped member 352 without transmitting such movement to the segment 351.

The position to which the segment 351 and the character type bar carried by it are moved upon operation of the machine, is controlled by the position of a lever 358 which, in turn, is differentially positioned by the "total", "sub-total", and "non-add" keys and by the subtraction lever 226. This lever 358 is mounted on a stud 359 projecting from the side frame 52, the lever having a central yoked portion by which it is pivoted on the stud.

When the machine is conditioned for addition, the lever 358 is held in the position shown in Fig. 25. As the machine is operated the cross bar 255 of the restoring bail 256 is raised and the spring 257 tends to rock the segment 351 counter-clockwise, but this movement of the segment is prevented by the engagement of a lug 360 on the upper end of the arm 354 with a shoulder A on the lever 358 and thus the character printing bar is not moved out of normal position and it does not print a character during the operation of the machine.

If a subtraction operation is performed, it is desirable to have a suitable character printed on the paper record to indicate it. When the parts are in normal position, the rearwardly extending arm of the lever 358 rests on a lug 361 projecting from a lever 362 which has a yoked portion by which the lever is pivoted on the stud 359. The downwardly extending arm of the lever 362 is connected by a link 363 to the subtraction lever 226. As shown in Figs. 24 and 25, a spring 364 is connected to the rear arm of the lever 358 and tends to rock it clockwise. It will be obvious that, when the subtraction lever 226 is moved rearwardly to subtracting position, the lever 358 is rocked counter-clockwise and its subtraction stop or step "Subtr." is brought in front of the lug 360 but spaced slightly therefrom so that, upon operation of the machine, the segment 351 and character type bar are moved one step to raise the character type representing "subtraction" to the printing line.

When a sub-total is taken a suitable character is also printed on the record strip. Journaled on the stud 359 by a yoke piece is a V-shaped lever 365 (Fig. 24), the end of the upper arm of which is located under the "S. T." key while the lower arm rests on a laterally projecting lug 366 on the lever 358. When the "S. T." key is depressed, the lever 358 is rocked counter-clockwise through the lever 365 and the sub-total stop "S. T." on the lever 358 is positioned in front of the lug 360 so that, during operation of the machine, the character type bar is moved three steps to present the type representing "subtotal" to the printing line.

When a total is taken, a suitable character is likewise printed. As shown in Fig. 21, a lever 367 is also pivoted by an integral yoke piece on the stud 359 and the forward upper end of the lever is positioned under the "T" key while the rearwardly projecting arm of the lever is provided with a round hole 368 through which a small pin 369 projects. The opposite end of the pin 369 projects into a corresponding hole in the lever 358 and, as best shown in Fig. 18A, the center of the pin is bowed to prevent its lateral displacement. The end loop of the spring 364 is seated in this bowed portion of the pin 369 and thus the single spring serves to restore both levers 358 and 367 to, and retain them in, normal position and permits operation of the lever 358 independently of the lever 367. When the total key "T" is depressed, the stepped lever 358 is rocked counter-clockwise through engagement of the lever 367 with the lug 366 on the lever 358 to position the total stop "T" in front of the lug 360 so that the character type bar is moved four steps to print the character representing a total.

A character indication is also printed for the non-add key. Journaled at its forward end to a stud projecting from the side frame 52 is an arm 370 (Figs. 11 and 19) the rear end of which projects over a forwardly extending finger on the forward end of the lever 358. The rear end of the spring lever 205 connected to the slide 201 is connected to the yoke by which the arm 370 is pivoted and the spring normally tends to rock the arm 370 counter-clockwise, but this movement is prevented by the engagement of a laterally extending lug 371 on the arm 370 with the lower end of the non-add key. When the non-add key is depressed, the control lever 358 is rocked through the lever 370 to bring the non-add stop "N. A." in front of the lug 360 so that the character indicating that the amount printed was not entered on the totalizer will be printed.

The subtracting lever 226 (Figs. 11 and 13) is aligned in its adding and substracting positions by a lever 373 which is pivoted on the stud 227. The upper end of the lever is provided with two aligning notches 374 one or the other of which is firmly held in engagement with a stud upon the link 363 by the spring 214 the rear end of which is connected to the lower end of the lever 373.

Totalizer and addition

The totalizer (Figs. 10, 14 and 15) comprises a plurality of pinions 236 suitably spaced apart on a cross rod 376 carried in the movable side arms 377 of the totalizer frame. The side arms 377 are fastened on a rock shaft 378 on which is also fixed an arm 380 (Figs. 13, 17, 18, 26 and 27) which carries a roller 381 engaging the forward cam edge of a cam plate 382 fastened on a rock shaft 383. The cam plate 382 is rigidly secured to the right hand arm of a yoke-shaped member 384 (Figs. 2 and 10) the cross-piece of which contacts with and is pinned to the shaft 383. As shown in Fig. 17, a spring 385 is connected at one end to the arm 380 and at its opposite end to a cross rod 414 to urge the roller 381 into engagement with the cam face and hold the pinions out of mesh with the teeth on the actuating segments 235. The rear end of a pitman 387 is pivoted to the cam 382 and the pitman has a slot 389 through which projects a grooved stud 390 on the frame 52 to guide the pitman in its reciprocating movements. The forward end of the pitman is forked and its lower arm is provided with a nose 391 normally engaging the forward side of the roller stud 200 on the operating plate 74, it being understood that this and various other studs and rods project through suitable openings in the side frame plates 51 and 52 to accommodate movements of the same. To the upper arm of the pitman 387 a wipe pawl 393 is pivoted and, normally, that is, when the machine is conditioned for addition, the pawl rests on a boss 388 shown in Figs. 2, 13, 17, 18, 22 and 26. This boss is on the side plate 52 which has been omitted in said figures (except Fig. 2) for the sake of clarity.

Upon operation of the machine, the plate 74 is first rocked counter-clockwise as viewed in Fig. 17 and, during this movement, the actuating segments 235 are differentially positioned. Near the end of this movement during an adding operation, a stud 395 on the plate 74 engages the pawl 393 and rocks it clockwise in opposition to its spring 394. Near the beginning of the return movement of the plate 74, the stud 395 engages a shoulder 396 on the pawl 393 and thereby moves the pawl and pitman 387 rearwardly, thus rocking the cam plate 382 counter-clockwise so that it moves the totalizer into mesh with the teeth on the actuating segments through its cooperation with the roller 381 on the arm 380. Upon continued return movement of the plate 74, the pawl 393 engages the boss 388 on the frame and the pin 395 moves out of engagement with the shoulder 396. The actuating segments are then returned to zero by the restoring bail 256 to actuate the totalizer and, near the end of the return movement of the plate 74, the roller stud 200 engages the nose 391 thereby drawing the pitman 387 forward to normal position and also rocking the cam 382 upward to permit the spring 385 to rock the totalizer out of mesh with the actuating segments.

*Subtraction*

When the machine is conditioned for performing subtraction, the parts assume the positions shown in Fig. 13 with the subtraction lever 226 in its rear or "subtraction" position. During operation of the machine, the totalizer is moved into mesh with the teeth of the actuating segments near the beginning of the forward stroke of the handle and out of mesh near the end of this forward stroke so that the totalizer pinions are turned rearwardly or reversely to extents proportional to the values of the depressed keys, the machine being adapted to perform direct subtraction. The means for controlling the time of engagement and disengagement of the totalizer during a subtracting operation will now be described, reference being had more particularly to Fig. 13.

Pivoted at its rear end and on the pitman 387 is an arm 399 having a nose 400 on its forward end and an intermediate depending projection 401 normally resting on the rear end of the pawl 393. The forward end of the lever 367 has a lateral lug normally in engagement with the upper edge of the arm 399. The rearwardly projecting arm of the lever 367 projects over the lug 361 on the lever 362 which is connected to the subtraction lever 226 by the link 363. When the subtraction lever is moved from the adding position, shown in Fig. 11, to the subtracting position, shown in Fig. 13, it will be obvious that the pawl 393 is rocked to the position shown in this latter figure through the above described connections and, at the same time, the nose 400 on the arm 399 is lowered into the path of movement of the stud 395 on the plate 74. Centrally pivoted on the lower arm of the pitman 387 is a pawl 404 carrying a stud 405 at its rear end to which is pivoted the lower end of a link 406. The lower end of a slide 407 (Fig. 17) which lies flat against the link 406 (Fig. 18B), has a slot through which the stud 405 projects and a spring 408 is connected at its lower end to a projection on the slide 407 and at its upper end to a projection on the link 406. This latter projection extends through a slot in the slide 407. The upper end of the link 406 carries a headed stud 412 projecting through another slot in the slide 407. The upper end of the slide 407 is forked to straddle a headed pin 410 on the lever 367 and a spring 411 is connected at its opposite ends to the stud 410 and a projection on the slide 407.

From the above description it will be evident that, when the subtraction lever 226 is moved to the subtracting position, shown in Fig. 13, the downward movement of the lever 367, as above described, lowers the slide 407 and thus moves the forward end of the pawl 404 in front of the roller stud 200. This movement of the pawl 404 is limited by the engagement of a stud 404a thereon with a projection on the pitman 387. Upon operation of the machine, and near the beginning of the forward stroke of the handle, the roller stud 200 immediately engages the forward end of the pawl 404 thus shifting the pitman 387 rearwardly to move the totalizer pinions into mesh with the teeth on the actuating segments and, after this engagement is effected, the stud roller 200 is moved further and out of engagement with the pawl. After the totalizer is engaged with the actuating segments, the latter are moved differentially from normal position to rotate the totalizer pinions reversely to subtract the amount set up on the keyboard. Near the end of the forward stroke of the handle, and after the totalizer pinions have been actuated, the stud 395 engages the nose 400 on the arm 399 thus drawing the pitman 387 forwardly to carry the totalizer pinions out of mesh with the teeth on the actuating segments. Upon return movement of the plate 74 to normal position, the stud 200 engages the upper edge of the pawl 404 and rocks it in opposition to its spring 408 so that the stud 200 wipes past the pawl without affecting the position of the slide 407. If the subtraction lever 226 is now shifted to adding position, the lever 367 is raised and the spring 411 raises the slide 407 thus permitting movement of the pawls 393 and 404 to the positions shown in Fig. 11.

Transfer mechanism

When the totalizer pinions 236 are out of mesh with the teeth on the actuating segments 235, they mesh with teeth on transfer segments 413 (Figs. 10, 14 and 15) pivoted on a cross rod 414 by yoke-portions which serve to space the transfer segments apart. Integral with each segment is a pair of downwardly extending arms 415 and also a vertical arm 416 whose upper end is connected to a spring 417. The upper ends of the springs 417, there being one spring for each transfer segment, are connected to the cross bar of a bail 418, the side arms of which are pivoted to the side frames 55. A rod 417a projects through the uppermost coils of the springs 417 to secure them to the bail 418. The arms 416 are provided with lateral lugs 419 normally engaging in notches in the rearwardly extending arms of latches 420 pivoted on a fixed cross rod and urged to latching position by springs 420a. The lower ends of the downwardly extending arms of the latches 420 project behind the upper ends of trip pawls 422 each of which has a tooth 423 and each of which is pivoted at its lower end on a cross rod 423a carried by the moveable side arms 377 of the totalizer frame. The teeth on the pawls 422 are shaped so that the pawls are moved rearwardly by transfer projections 433 on the totalizer wheels when the wheels move from "9" to "0" in adding and from "0" to "9" in subtracting. The pawls 422 also have lugs 424 normally engaging, as shown in Fig. 10, the lower shoulders 425 on latches 426 pivoted at their forward ends to a cross rod 427 also carried by the moveable totalizer frame. The latches 426 are connected by springs 428 to the lower yoke-shaped ends of the trip pawls 422. Pivoted on the forward end of the left hand arm of the yoke-shaped member 384 and to the cam plate 382 are arms 429, (Figs. 10 and 16) the lower ends of which support a restoring rod 430 which has its ends projecting into vertical slots 431 in the plates 55 (Fig. 11) to guide the rod 430 in its vertical movements when the cam 382 and member 384 are oscillated by the pitman 387 as above described. Normally the rod 430 is in the elevated position illustrated in Fig. 10 and, in such position, the rear ends of the latches 426 are supported on the rod and the lugs 424 on the trip pawls 422 engage the lower shoulders 425 on the latches 426.

When the machine is conditioned for addition, the bail 418 is in the rear position shown in Fig. 10 so that the springs 417 normally tend to rock the transfer segments 413 clockwise as viewed in this figure. After the subtraction lever 226 has moved to subtracting position to condition the machine for subtraction and during the forward stroke of the handle the bail 418 is swung forwardly, as will be presently described, to the position shown in Fig. 15 so that the springs 417 then tend to rock the transfer segments 413 counter clockwise as viewed in this figure.

With the machine conditioned for performing addition the operation of the transfer mechanism is as follows: When the totalizer pinions are carried into mesh with the teeth on the actuating segments 235 at the beginning of the return stroke of the machine, the pawls 422 and the latches 426 are moved forwardly with the totalizer frame, as they are carried thereon, and projections 423 on the pawls 422 remain in the path of movement of projections 433 (Fig. 15) projecting from the hubs of the totalizer pinions so that, when a pinion passes from its "9" to its "0" position, its transfer projection or tooth rocks its pawl 422 rearwardly. The pawl is then latched in this position by the engagement of the upper shoulder 425 on the latch 426 with the lug 424, as shown in Fig. 14. The pawl 422 is not rocked rearwardly by the totalizer pinion to an extent sufficient to engage and trip the companion latch 420 but, as the totalizer is rocked out of mesh with the actuating segments at the end of the movement of the machine, the pawl 422, which has been moved rearwardly, engages the depending arm of its latch 420 for the transfer segment 413 of next higher order and thus the latch 420 is rocked to disengage its notch from the lug 419 on the transfer segment. At the same time that the totalizer is rocked out of mesh with the actuating segments and into mesh with the teeth on the transfer segments 413, the restoring rod 430 is raised to the position shown in Fig. 10 where it will not interfere with movement of any segment that has been released but will limit the movement to one step. Near the end of the upward movement of the rod 430 it raises the latches 426 to permit the springs 428 to restore the pawls 422 to normal position.

It will be clear that those totalizer wheels which have not been moved to or beyond their "0" positions by their actuating segments do not trip their pawls 422 and, when the totalizer is moved out of mesh with the actuating segments, these pawls do not release the latches 420 for the transfer segments of next higher orders. If, however, a totalizer pinion stands at "9" when it is disengaged from its actuating segment and one is carried to it from the totalizer of next lower order so that it is moved to its "0" position, it then moves its pawl 422 rearwardly and thus moves the corresponding latch 420 to release the transfer segment 413 of next higher order so that this transfer segment is also immediately rocked to effect a transfer to its totalizer pinion. Thus successive tripping of the transfer segments takes place when continued carrying is required after the totalizer wheels have been moved into mesh with the teeth of the transfer segments and during the same operation of the machine. Upon the next operation of the machine and when the totalizer is carried out of mesh with the transfer segments, the restoring rod 430 is moved downwardly to the position shown in Fig. 14 in order to move the transfer segments to normal position in which position they are again latched by their latches 420.

The operation of the transfer mechanism during a subtracting operation is substantially the same as that described above except that the released transfer segments 413 are then rocked counter clockwise to the position shown in Fig. 15. In subtracting operations, the totalizer wheels are rotated clockwise (as viewed in Fig. 15) by the actuating segments and the pawls 422 are moved rearwardly by the transfer projections 433 on the pinions as the pinions move from "0" to "9". Then, when the totalizer is disengaged from the actuators, the pawls 422 which have been latched in their rear positions trip the latches 420 and release the transfer segments 413 of next higher order. The segments are thereupon rocked counter clockwise as shown in Fig. 15. Continued borrowing, as for example, when a wheel is moved from "0" to "9" by a borrowing operation and the wheel or wheels of next higher order or orders also stands at "0", is automatically accomplished as is continued carrying in adding operations, the transfer segments of higher orders in such case being successively released after the totalizer wheels are reengaged with them. When the rod 430 is carried downwardly during the next operation of the machine, it restores all of the operated transfer segments to normal condition by its engagement with the forward arms 415. The one rod 430 thus acts to recock the transfer segments after both their addition and subtraction operations.

The means for controlling the movement of the bail 418 when the subtraction lever 226 is moved to condition the machine for addition or subtraction will now be described. The right hand side arm of the bail 418 (Figs. 11 and 13) carries a stud 434 which projects into a slot in the upper end of an arm 435 pivoted at its lower end on a machine stud. Pivoted on the arm 435 is a pawl 436 in the form of a bell crank and a spring 437 is connected to the forward end of the pawl and to the pivot stud for the arm 435. When the machine is conditioned for addition, as shown in Fig. 11, the stud 434 engages the rear end of a slot in the frame 55 and the pawl 436 is held in the position shown in this figure by the engagement of a stud 438 on the pawl 436 with the rear arm of a member 439 pivoted on the end of a cross rod on the frame. The member 439 is provided with a forwardly extending arm which has a recess into which projects a stud 439ª on the rearwardly extending arm of the lever 362 which is connected to the subtraction lever 226 by the link 363.

If the subtraction lever is moved from the adding position shown in Fig. 11 to the subtracting position shown in Fig. 13, the member 439 is rocked clockwise by the lever 362 and the rear end of the pawl 436 is partially raised by the rear arm of the member 439 and, as the spring 437 passes forwardly over the pivot of the pawl, the spring 437 moves the pawl further to the position shown in Fig. 13, in which position it is arrested by its engagement with a projecting stud 440 on the cam plate 382. Now, upon operation of the machine, and near the beginning of the forward movement of the operating handle, the stud 440 engages a shoulder 441 (Fig. 13) on the pawl thereby rocking the arm 435 forwardly to swing the bail 418 from the position of Fig. 13 to the subtracting position of Fig. 15 in which the parts are shown in the position they assume at the end of the forward stroke of the handle. Upon subsequent operations of the machine, and while the subtraction lever remains in subtracting position, the stud 440 idly rides on the concentric upper edge of the pawl 436 beyond the shoulder 441.

Now, if the substraction lever 226 is moved from its subtracting position to its adding position, the forward downwardly extending arm of the member 439 engages the stud 438 and rocks the pawl 436 clockwise, as viewed in Fig. 11. The spring 437 serves to complete the movement of the pawl as the spring moves rearwardly past the pivot of the pawl, the movement of the latter being arrested by a stud 443 on the cam 382, which stud is then immediately in front of a shoulder 444 on the pawl, the arm 435 being at that time in its forward position. During the next operation of the machine and, at the beginning of the down stroke of the cam 382, on the return stroke of the handle, the stud 443 engages the shoulder 444 and thus the arm 435 and transfer bail 418 are carried rearwardly to the positions shown in Fig. 11. During this movement the stud 438 strikes the rear arm of the member 439 so that the pawl 436 is rocked slightly counter clockwise while the arm 435 completes its movement, the arm 435 and bail 418 being compelled to continue their movement by the springs 417 which are connected to the transfer segments. Upon subsequent operations of the machine with the subtraction lever in adding position, the stud 443 idly oscillates without engaging the pawl 436.

A modified form of control is shown in Figs. 11A and 11B. Instead of using the two-arm lever 439 a single arm lever 439B is employed. This lever carries a stud 439c engaging in a slot in the rear arm of the lever 362. Its lower end is connected to one end of a spring 437B whose other end is connected to a stud on the pawl 436B. When the arm 439B is in the position shown in Fig. 11A the spring 437B is in position to hold the pawl 436B in the adding position. As the lever 439B is moved clockwise the spring 437B is swung past the pivot of the pawl 436B and when it passes this pivot it flips the pawl up to the subtraction position shown in Fig. 11B. When the lever 439B is moved from the position of Fig. 11B to that of Fig. 11A, the reverse action takes place. The pawl 436B cooperates with the studs 440 and 443 as previously described except that, in the construction illustrated in Figs. 11A and 11B, the stud 443 is now a projection of the screw head connecting the pitman 387 to the cam plate 382 instead of a stud projecting from the cam plate 382. This modification provides a positive action of the parts and permits the pawl 436B to be spring operated throughout its entire movement.

Non-add

The machine may be placed in non-add condition by depression of the non-add key N. A. heretofore mentioned.

When the lever 226 is in adding condition and the non-add key "N. A." is depressed, a downwardly extending projection 445 (Fig. 22) on the arm 370 engages a pin on the rear end of the wipe pawl 393 rocking it clockwise so that, when the cam plate 74 is rocked during operation of the machine its stud 395 does not contact with the shoulder 396 on the pawl 393 and hence the pitman 387 is not reciprocated and the totalizer is not rocked into mesh with the actuating segments. At the end of the operation of the machine the non-add key is released by the movement of the rod 191 (Fig. 11) and associated parts and the spring 394 moves the pawl 393 back to normal position.

Total and sub-total printing

When a total registered on the totalizer is to be taken and printed by the type bars, the totalizer is carried into engagement with the actuating segments so that the totalizer wheels are turned reversely to "0" position during the forward stroke of the operating handle, the type bars being correspondingly positioned to print the total. During the return stroke of the machine the totalizer pinions are out of engagement with the actuating segments so that they remain in "0" position. When a sub-total is to be printed the operation is the same as during a total printing operation except that the totalizer remains in engagement with the actuating segments during their return movement to normal to restore the total on the totalizer.

When the total key is depressed, as shown in Fig. 18, the lever 367 is rocked downwardly and the nose 400 on the arm 399 is moved into the path of movement of the stud 395 and the forward end of the pawl 404 is moved in the path of movement of the roller stud 200, the same as when the subtraction lever 226 is moved to subtracting position so that the totalizer is engaged near the beginning of the forward stroke of the handle and is disengaged near the end of such forward stroke exactly the same as in a subtracting operation.

This downward movement of the lever 367 rocks the control lever 358 for the character type bar, as above described, to the position shown in Fig. 18 and, in this position, the rear end of the lever 358 is in front of a crank 446 which is integral with a shaft 447 (Figs. 15 and 28) journaled in the arm 380 and the side levers 377 of the totalizer frame. Fastened on the shaft 447 and between the levers 377 is a locking plate 448. A depending arm 449 (Figs. 11 and 27) on the shaft 447 is connected to a spring 450 which normally holds the plate 448 in the position shown in Figs. 10 and 15. During adding and subtracting operations the rear end of the lever 358 is not in front of the crank 446 which passes over the rear end of the lever when the totalizer frame is swung forwardly during adding operations and under it when the totalizer frame is swung forwardly in substracting operations. When the totalizer frame is swung forwardly during a total printing operation, and also a sub-total printing operation, the crank 446 engages the rear end of the lever 358 rocking the crank 446 and plate 448 counter clockwise to the position shown in Fig. 28 so that the forward edge of the plate is immediately behind the upper projecting ends of the pawls 422 which are thus locked against rearward movement about the rod 423a on which they are pivoted. The totalizer wheels are rotated during the upstroke of the actuating segments 235 and, when the transfer teeth 433 on the totalizer pinions engage the projections 423 on the pawls 422, the totalizer pinions are arrested in "0" position and the total has been transferred to the type bars which may then print it. When the totalizer frame is moved rearwardly at the end of the forward stroke of the machine in total printing, the spring 450 again raises the plate 448 and crank 446 to normal position.

When the sub-total key "S. T." is depressed (as shown in Fig. 26) it lowers the lever 365, as explained above in connection with the printing of characters, and during this movement of the lever it engages the upper end of the slide 407 thus rocking the pawl 404 to the position shown in Fig. 26. Near the beginning of the forward stroke of the handle, the stud 200 engages the forward end of the pawl 404 and moves pitman 387 rearwardly to cause the totalizer pinions to engage the actuating segments and, near the end of the return stroke of the handle, the roller stud 200 engages the nose 391 on the pitman to disengage the totalizer wheels from the actuating segments. During the return movement of the plate 74 the stud 395 does not engage the shoulder 396 on the pawl 393 as this pawl then is already in its rearmost position. It will also be noted that, when the sub-total key is in depressed condition, the rear end of the lever 358 is in front of the crank 446 so the plate 448 is moved to the locking position shown in Fig. 28 as in total taking operations.

During the taking of a total or a sub-total the zero stops 196—197 (Fig. 10) are prevented from moving into arresting position in front of the stop bars 233. For this purpose there has been provided a cross slide 217 (Figs. 8, 9 and 11) slidably mounted in slots formed in the keyboard plates 161. A spring 218 (Fig. 8) mounted in a recess in the forward edge of the slide and compressed between one end of the recess and the left hand plate 161, normally retains the slide in the position shown in Fig. 8, so that the slots 219 in its rear edge are normally opposite the noses on the projections 186 for the 9 keys on the locking plates 180. The latch plates 180 are thus free to move without interference by the cross slide 217 when it is in its normal position. The right hand end of the slide 217 has an integral depending plate 220 which rests on the plate 160 of the keyboard and which has inwardly extending ears 221 projecting into recesses in the sides of the total and the sub-total key stems respectively. The upper ends of the recesses are inclined as shown in Fig. 9, so that when the "T" or the "S. T." key is depressed, the slide 217 is moved to the right and the notches 219 are moved from in front of the noses on the latch plates 180 so that when these plates move forward the noses strike the edge of the cross bar 217 instead of entering the notches.

When the machine is operated after either the "T" or the "S. T." key has been depressed, the plates 180 move forward as hereinbefore explained and they move until their noses engage the edge of the cross slide 217, which is positioned to permit the plates to move forward sufficiently to lock the undepressed keys against depression. Therefore none of the amount or the control keys can be depressed while the machine is being operated to take a total or sub-total. The cross slide 217 arrests the latch plates 180 in position to prevent the plates from moving forward sufficiently to permit the zero stop arms to be moved in front of the stop bars, but the forward movement is such that the zero stop arms 196 do not prevent the control rod 191 from moving rearwardly. In other words, the latch plates are stopped in such a position that the zero stop arms are prevented from moving in front of the stop bars, but they are not stopped so short that the machine is disconnected.

If either the total or sub-total key is depressed while an amount key is depressed, it is desirable to disconnect the operating mechanism to prevent operation of the machine, otherwise an incorrect result would be obtained, and the following mechanism has been provided.

Mounted at the rear of the keyboard on the projections 170 of the keyboard plates 161 is a rod 458 on which are pivoted the end arms of a bail or frame 451 having a channel shaped cross bar whose upper flange is positioned to the rear of shoulders 452 (Fig. 10) formed on the rear ends of the latch plates 180 for the rows of amount keys, there being no shoulder on the latch plate for the row of control keys. The parts are further illustrated in Fig. 30 which shows a different form of machine than that illustrated in Fig. 10 but the mechanism now being described is the same in both machines and some of the parts will be more readily identified by referring to Fig. 30. Referring to Fig. 30, the forward end of a link or bar 453 is provided with a slot 454 through which the control rod 191 projects and a finger on the rear end of this link projects through a slot in the channel-shaped bail 451. A spring 455 connected at its lower end to the upper end of the link 453 normally holds the link in the position shown in Fig. 30. When either the total key or the sub-total key is depressed, the lower end of its stem engages the upper edge of the link 453 and lowers the rear end of the latter so that its shoulder 456 is in front of the lower flange of the channel bail 451.

During adding and subtracting operations the link 453 is moved rearwardly and forwardly by the control rod 191, but this movement is idle as the shoulder 456 then moves over the lower flange of the bail 451. When either the total or the sub-total key is depressed, however, and the link 453 moves rearwardly, its shoulder 456, during the beginning of the operation of the machine, engages the lower flange of the bail. This rocks the bail counter clockwise and causes its upper flange to move forward for engagement with the shoulders 452 on the latch plates 180. If an amount key has been depressed, the latch plate for that bank of keys is in latched position and against the stem of the depressed key. Accordingly, this plate can move forward only a very small distance and, when the upper flange of the bail strikes the shoulder 452 of this plate further movement of the bail is prevented. This arrests movement of the link 453 which, in turn, arrests the control rod 191 and prevents it from moving rearward. The arresting of the rod 191 causes the operating mechanism to be disconnected from the driving means as has been heretofore explained.

After the operating mechanism has been disconnected, it returns to normal position and the depressed keys are returned to normal inasmuch as the mechanism will have moved far enough before being disconnected to have permitted the shoulder 208 of slide 201 to move behind the rod 191 so that, as the mechanism returns, the latches will be moved far enough to unlock all the keys.

*Machine for addition only, Fig. 30*

When it is desired to have a machine that is capable of addition only, the subtraction feature may be eliminated. Such a machine is illustrated in Fig. 30 where the same reference numerals are used to designate the parts that are the same as those heretofore described. The change may be very easily made by omitting the subtraction control lever 226 and by substituting a different totalizer unit although the latter is not absolutely necessary. When the subtraction lever is removed, the levers 362, 365, 367 and 358 may be removed with it and others substituted such as shown in Fig. 30, said levers being slightly different in construction at their rear ends. A different totalizer section may then be attached, said section being without the devices heretofore described for changing the condition of the transfer mechanism because such change is not necessary. Such a section is illustrated in Fig. 30, the reference numeral 417a indicating a fixed rod to which the transfer springs 417 (Fig. 10) are connected.

*Duplex totalizer*

A machine having a duplex totalizer unit is illustrated in Figs. 31 to 45 inclusive. Two totalizers are shown, the upper one being numbered 236—U and the lower 236—L. These totalizers and their transfer mechanisms are similar in design and operation to those heretofore described and inasmuch as the parts are somewhat similar, I have applied, as far as expedient, the reference numerals heretofore used, but have added the suffixes U and L to indicate the parts for the upper and lower totalizers respectively.

The two totalizers are carried in individual, movable frames 377—U and 377—L fixed to rock shafts 378—U and 378—L respectively, mounted in the totalizer unit side plates 55. The two totalizers are alike and, in order to simplify the description, only the lower one will be described, it being understood that the upper totalizer is the same as the lower.

The totalizer wheels of the lower totalizer move into and out of engagement with transfer segments 413—L pivoted on a shaft 414—L and urged to move in a clockwise direction by springs 417—L connected at one end to the rearwardly extending arms of the transfer segments and at their other ends to the latches 420—L. Each latch 420—L has two shoulders which engage a projection 419—L on the transfer segment. One shoulder holds the transfer segment in its normal restrained position shown in Fig. 32 and the other shoulder limits the movement of the segment to one step or unit when the first shoulder has been raised over the projection 419—L to release the segment.

Trip pawls 422—L are pivoted on a cross rod carried by the movable frame 378—L so that they move with the totalizer in its movements into and out of engagement with the transfer segments. Cooperating with the trip pawls are latches 426—L having shoulders engaging projections 424—L on the pawls, and springs 428—L connected to the rearwardly extending arms on the pawls and to the latches tend to keep the latches in engagement with the pawls and to move the pawls counter clockwise. The trip pawls are moved rearwardly, or set, by transfer teeth 461 on the totalizer wheels positioned so that, when the wheels move from 9 to 0, a tooth 461 engages its respective pawl and moves it rearwardly. The tooth 461 is preferably not a part of one of the teeth of the totalizer wheels but a separate tooth on the boss 462 of its respective totalizer wheel. The totalizer wheels are moved in a counter clockwise direction during an adding operation and it will be observed that the upper face of the tooth 461 is shaped to cam the trip pawl as is passes its nose. The lower face of the tooth 461 is shaped differently for a purpose that will presently appear.

When the totalizer is moved forward into engagement with the actuators and out of engagement with the transfer segments, the trip pawls 422—L are carried with it and they occupy a position relative to the totalizer wheels such as shown in Fig. 33, that is, a position such that they will be engaged by the teeth 461 on the totalizer wheels if the wheels are rotated from 9 to 0. If a wheel is rotated from 9 to 0, its tooth 461 cams its respective pawl 422—L rearward in which position the pawl is latched by engagement of a shoulder on latch 426—L behind the projection 424—L on the pawl. Then, when the totalizer is moved rearwardly into engagement with the transfer segments, the rear side of the pawl 422—L engages the upper end of the latch 420—L and moves it counter clockwise to cause one of its shoulders to move out of the path of the lug 419—L on the transfer segment 413—L thereby permitting the transfer segment to move one step counter clockwise under the action of spring 417—L into engagement with a second shoulder on the latch 420—L to move the totalizer wheel of next higher order one step. At the time that the totalizer is disengaged from the actuating segments, the restoring bail 430—L carried by the arms 429—L (Fig. 45) is raised from the position shown in Fig. 32 to that shown in Fig. 33 to permit the transfer segments which have been released by the trip pawls 422—L to be moved by their springs 417—L. As the transfer segments move, their lugs 419—L engage the latches 426—L and raise them to permit the pawls 422—L to return to normal position.

The transfer segments are returned to normal position during the next operation of the machine and after the totalizer wheels have been disengaged from the transfer segments, such return being effected by the restoring bail 430—L which is lowered from the position of Fig. 33 to that of Fig. 32 during which movement it engages the transfer segments that have been moved and restores them to normal position.

When a total is to be taken, the totalizer is carried into mesh with the actuating segments before the latter begin to move upwardly from their normal position. Any movement of the actuators then rotates the totalizer wheels in a clockwise direction instead of in a counter clockwise direction as during an adding operation and it will be understood that, during the taking of the total, the totalizer wheels that are not in zero position will be rotated clockwise to bring them back to zero. At the time that the totalizer is thus moved into engagement with the actuators, the trip pawls 422—L are in position to engage the teeth 461 as hereinbefore described, but since the totalizer wheels are rotating clockwise, the lower faces of the teeth 461 engage the ends of pawls 422—L, and, instead of camming the pawls rearwardly, the pawls stop the totalizer wheels at "0" position. The actuating segments are thus arrested and the type bars positioned to represent the total taken from the totalizer. It should be noted that the curvature of the lower face of the tooth 461 corresponds to the curvature of the upper end of the pawl 422—L which is an arc struck from the pivot of pawl 422—L so that the entire under surface of the tooth engages the top of the pawl. This provides a good contact, causes the pawl to arrest the totalizer wheel, and permits the pawl to be moved into and out of engagement with the tooth 422 without moving the wheel. No locking device for the pawl is necessary. It acts automatically when the direction of the totalizer wheels is reversed. When a total is printed, the totalizer is carried out of engagement with the actuators before they begin their return movement.

If a sub-total is to be printed, the totalizer remains in mesh with the actuators during the return movement of the latter as will be readily understood.

The totalizer is moved into engagement with the actuator segments by a cam 382—L engaging a roller 381—L on the shaft 376—L on which the totalizer pinions are mounted (Figs. 35 and 45). This cam is integral with one of the arms that carry the cross shaft 430—L which arm is fixed to the yoke 384—L that, in turn, is fixed to the rock shaft 383—L journaled in the plates 55 and rocked by the main pitman 387 of the machine as will be hereinafter described. The movable totalizer frame is urged rearwardly by a spring 460—L to cause the roller 381—L to engage the face of the cam. This spring also serves to move the totalizer out of engagement with the actuator segments when the cam has been moved to permit this action. The shoulder on the lower part of the cam face and the radius on the upper part are shaped so that the cam serves as an aligning means for the totalizer as well as an actuating means. The upper totalizer is moved into and out of engagement the same as the lower.

Either or both of the totalizers may be brought into engagement with the actuators and the controlling mechanism for accomplishing this will now be described. The main pitman 387 has pivoted to it, on the stud 398, two V shaped levers, a lower lever 464 and an upper lever 465, each of which has one long arm and one short arm. The long arms have hooks on their end, the hook on arm 464 extending downwardly and being shaped to engage over a stud 466—L on an arm on the yoke member 384—L to which the cam 382—L is connected, and the hook on arm 465 extending upwardly and being shaped to engage a stud 466—U on an arm on the yoke member 384—U of the upper totalizer. The hooked ends of the arms are shaped to provide recesses for the studs with the outer ends of the hooks extending above the recesses. When one of the studs is engaged in a recess, as shown in the lower part of Fig. 37, the hooked end of the arm carries the stud with it in both directions but, when the hooked end is in the position shown in the lower part of Fig. 38, it may move rearward relative to the stud.

Inasmuch as the V-shaped levers are connected to the main pitman, they will be reciprocated with it during operation of the machine and the upper or lower totalizer or both will be moved into and out of engagement with the actuators, depending upon how the selective control is set which will now be described:—

The two totalizers are selectively controlled through the lever 226 at the front of the machine which is connected by the link 363 to a 3-arm lever 468 having a stud 469 projecting between the shorter arms of the levers 464 and 465.

When the control lever 226 is in the forward position shown in Fig. 37, the stud 469 engages the shorter arm of the lever 465 and positively holds that lever out of active engagement with the stud 466—U on upper totalizer. At the same time it holds the lever 464 in engagement with the lower totalizer through the spring 470 which connects the ends of the shorter arms of the two levers 464 and 465.

When the lever 226 is moved to its rear position shown in Fig. 38, the stud 469 contacts the shorter arm of the lever 464 and positively moves that lever out of engagement with the lower totalizer and simultaneously moves the lever 465 into engagement with the upper totalizer.

When the lever 226 is moved to its intermediate position, as shown in Fig. 34, the stud 469 is moved to the intermediate position shown, in which the recesses in the hooks of both levers engage their respective studs 466—L and 466—U with the result that, if the machine is operated with the lever in this position, both totalizers are moved into engagement with the actuating segments.

*Total printing with duplex totalizer*

When a total or sub-total on the upper totalizer is to be printed, the total or sub-total key is depressed which moves the pawls 393 and 404 (Figs. 34, 37 and 38) to cause the operation of the machine to take the total or sub-total and set the type bars in the manner heretofore described. During this operation the control lever 226 is in its rear position and only the upper totalizer is effective and accordingly the total printed is from the upper totalizer.

When a total or sub-total on the lower totalizer is to be printed, the total or sub-total key is depressed, and the machine is operated as heretofore described. During this operation, the control lever is in its forward position and only the lower totalizer is effective so that the total printed is from the lower totalizer.

If a total is to be taken when the control lever is in its intermediate position with both of the totalizers active, provision is made for printing from the lower totalizer only by disabling the lever 465 controlling the upper totalizer. When the total or sub-total key is depressed, the lever 367 or the lever 365, as the case may be, is brought into engagement with an upwardly extending lateral projection 471 on a lever 472 pivoted to a stud on the frame plate 55. This lever has a downwardly extending projection near its center contacting a stud 473 on the short arm of a bell crank lever 474 pivoted on the 3-armed lever 468 and having a stud 475 projecting over the shorter arm of the lever 465. When the control lever 226 is in its central position, the parts are in the position shown in Fig. 75 and depression of either the total or the sub-total key rocks the lever 472 counter clockwise which, in turn, rocks the bell crank lever 474 clockwise and moves the lever 465 out of engagement with the stud 466—U on the upper totalizer. Accordingly, when the total or the sub-total key is depressed with the control lever 226 in central position, the connection to the upper totalizer is disabled and operation of the machine will cause it to print only from the lower totalizer. When the control lever 226 is moved to either of its other two positions, it carries the bell crank 474 with it and moves said crank out of the path of movement of the stud 473 so that depression of neither the total nor the subtotal key will change the controls of the totalizers.

The control lever 226 is aligned in its intermediate position (Fig. 34) by the engagement of the stud 375 on the link 363 with the middle notch 374 on the lever 373.

If the control lever 226 is not in any one of its three positions heretofore mentioned, the operating mechanism is automatically disconnected from the drive shaft or the motor, as the case may be. The lever has a forwardly extending arm positioned behind the end of the rod 191 which disconnects the mechanism, when it cannot move rearwardly as has already been explained. When the control lever is in its intermediate position, a notch in its forwardly extending arm is in front of the rod 191 so that the rod can move rearward. When the control lever is in its rearward position, the rod 191 can move rearwardly under the end of the forwardly projecting arm, and when the control lever is in its forward position, the rod 191 can move rearwardly over the forwardly projecting arm. If the control lever is not in any one of these three positions, the rod 191 engages the end of the forwardly extending arm and movement of the rod is prevented which disconnects the operating mechanism as already described.

*Character printing with duplex totalizers*

The character type bar for the duplex totalizers and the actuating segment for carrying it, are the same as the corresponding parts shown in Fig. 25, but instead of using the stepped control plate 358 of Fig. 25, three stepped plates 479, 480 and 481 are used. The plate 479 is controlled by the lever 226 and the plates 480 and 481 are controlled by the total and sub-total keys in a manner which will now be explained.

The three arm lever 468 which is controlled by the lever 226 through link 363, carries a stud 482 (Fig. 40) engaging an arm 483 which depends from the yoke of plate 479 having various shoulders to be interposed in the path of the lug 360 on the arm 354 which carries the character type bar. When the control lever 226 is moved forwardly, the stud 482 moves the plate 479 counter clockwise by engagement of stud 482 with the arm 483 and, when the control lever is moved rearwardly, a spring 484 moves the plate clockwise. The arm 354 with its lug 360 normally occupies the position shown in Fig. 34 but, when the character printing segment 351 (Fig. 25) is released along with the other actuating segments of the machine by the raising of the cross bar 255, it, together with the character type bar, move counter clockwise until arrested by engagement of the lug 360 with one of the shoulders on the plate 479 whereupon the segment and type bar are stopped in a position to print an appropriate character.

When the control lever 226 is in its forward position, which is the position for using the lower totalizer only, and the machine is operated to enter an item, the shoulder L—A on the plate 479 is immediately in front of the lug 360 so that the character type bar is not moved from normal position and no character is printed.

When the control lever 226 is moved to its intermediate position, which renders both totalizers active, the plate 479 is moved to a position such that the lug 360 strikes the shoulder 485 which permits the character type bar to move to a position to print a character indicating that an item has been added on both totalizers.

When the control lever 226 is in its rearmost position for using the upper totalizer only, both of the shoulders L—A and 485 are out of the path of movement of the lug 360 and the arm 354 is arrested by its engagement with a fixed stud U—A (Fig. 40) which positions the type bar to print a character indicating that the item has been added on the upper totalizer only.

When the non-add key is depressed, the rearward end of the arm 370 (Fig. 40) engages a shoulder 486 on the forward end of the plate 479 and carries a shoulder N—A into the path of movement of the lug 360 so that, upon operation of the machine, the character type bar is positioned to print a character indicating that the item has not been added on either totalizer.

The control of the character printing above described takes place while items are being entered and accumulated in either or both of the totalizers on the machine. When a total or sub-total of these items is taken, it is desirable to have a character printed to indicate whether the total or sub-total has been taken and on what totalizer. For this purpose, two additional stepped plates or arms are provided which are under the control of the total and sub-total keys respectively.

When a total is taken on the lower totalizer, the control lever 226 is either in its forward or central position and the plate 479 occupies corresponding positions as heretofore described. As the total key is depressed, it rocks the lever 367 counter clockwise and the lower edge of this lever engages a lug 487 (Fig. 40) to move the plate 479 to a position such that it will not interfere with the lug 360 on the arm 354. This takes the character printing type bar out of the control of the lever 226 and its plate 479 and places it under the control of the plates operated by the total and sub-total keys. The lever 367 has a yoked end pivoted on the stud 359, as shown in Fig. 36, and one of the arms of the yoke has an extension 488 which engages behind the yoke of the stepped arm 481 also pivoted to the stud 359. This arm has a projection 489 (Fig. 41) connected by a spring 490 to a projection 491 extending upwardly from the yoke of the stepped arm 480. A spring 492 urges the arm 481 in a clockwise direction and through the engagements of its yoke with the projection 491 on arm 480, it serves to hold both arms in the raised position shown in Fig. 41. When the lever 367 is moved counter clockwise, it moves the arm 481 counter clockwise through the engagement of the projection 488 with the yoke of arm 481 and the arm 480 will likewise be moved counter clockwise through the spring 490 unless movement of the last lever is arrested, in which case, the spring 490 yields to permit relative movement of the arms. The arm 480 is arrested by the arm 493 of the three-armed lever 468 controlled by the control lever 226. The end of the arm 493 engages under the edge of an extension 480a of the yoke of arm 480, the edge of said arm 493 having an arc like cam surface 494 and a nose portion 495. When the cam surface 494 is under the edge of the arm 480a, the arm 480 cannot move counter clockwise, but when the nose 495 is under the arm 480a, the arm 480 has a limited movement.

Figure 43:
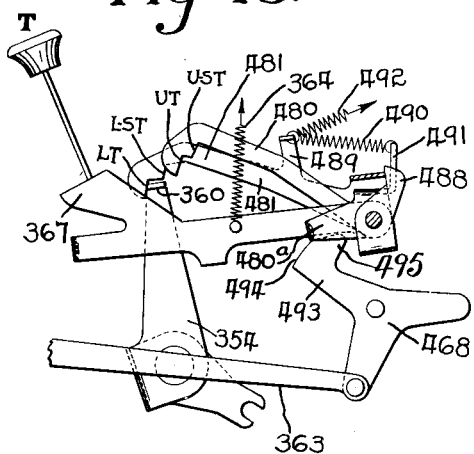

When the total key is depressed, the lever 367 moves arm 481 counter clockwise to the position shown in Fig. 43, where the shoulder L—T is in position to engage lug 360 so that the character type bar is positioned to indicate that the total printed was taken from the lower totalizer. During this operation the control lever 226 is in either its forward or intermediate position and the cam surface 494 on the end of the arm 493 is in position shown in Fig. 43 where it will engage the arm 480a and arrest movement of the arm 480.

Figure 44:
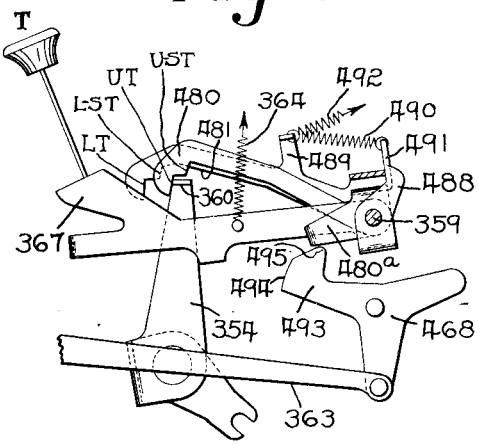
Figure 45:
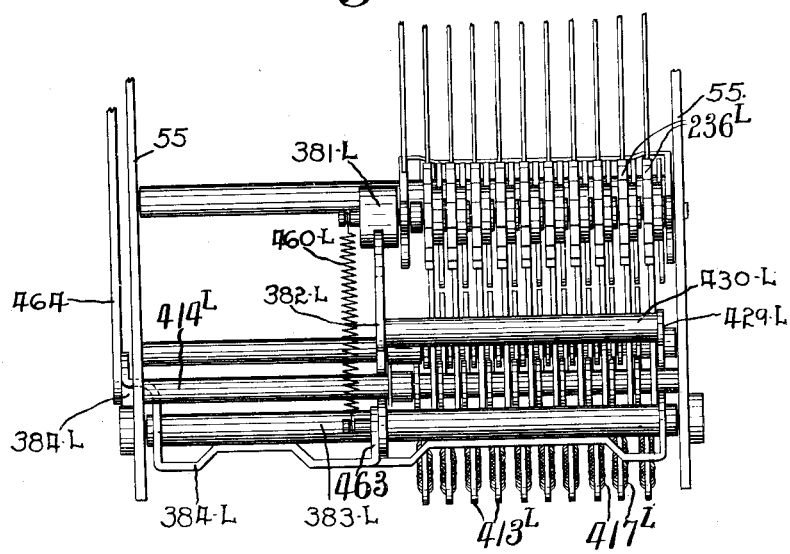

If a total is taken from the upper totalizer, the control lever 226 is in its rear position, at which time the nose 495 of the arm 493 is in the position shown in Fig. 44, which permits movement of the arm 480. Accordingly, when the total key is depressed, both of the arms 481 and 480 are rocked downwardly but, since the shoulder U—T on the arm 480 is ahead of the shoulders on arm 481, the lug 360 is arrested by shoulder U—T so that the character type bar is positioned to print a character representing the total printed that was taken from the upper totalized. It will be observed that the counter clockwise movement of arm 480 is limited by engagement of the extension 491 on its yoke with the yoke on arm 481 which is positioned by the total key.

When a sub-total is to be taken, the sub-total key S—T (Figs. 41 and 42) is depressed which rocks the lever 365 in a counter clockwise direction. This lever has a forwardly projecting arm 365a which engages the lug 486 on the plate 479 so that, when the sub-total key is depressed, the plate 479 is moved to an inoperative position the same as when the total key is depressed. The lever 365 has a yoke shaped end pivoted to the stud 359 and one of the arms of this yoke has an extension 496 (Fig. 36) which engages the yoke on the arm 481.

When a sub-total is taken from the lower totalizer the control lever 226 is in either its forward or central position and the cam surface 494 on the arm 493 of lever 468 prevents movement of the arm 480 as heretofore described. The depression of the sub-total key moves the arm 481 in a counter clockwise direction slightly farther than when it is depressed by the total key and to the position shown in Fig. 42 where the shoulder L S T is in the path of movement of the lug 360 so that the character type bar is positioned to print a character indicating that the sub-total printed was taken from the lower totalizer.

When a sub-total is taken from the upper totalizer, control lever 226 is in its rear position and the nose 495 of the arm 493 is in the position as illustrated in Fig. 44, so that movement of the arm 480 is not arrested. Accordingly, when the sub-total key is depressed, the arm 480 is moved counter clockwise along with the arm 481 to position the shoulder U—S—T in the path of movement of the lug 360 so that the character type bar is positioned to print a character indicating that sub-total was taken from the upper totalizer. The parts are proportioned so that when the sub-total key is depressed the arm 481 is moved counter clockwise further than when total key is depressed, which likewise permits the arm 480 to move further counter clockwise so that the shoulder U—S—T becomes active rather than the shoulder U—T.

The duplex totalizer section may also be used in combination with the main operating section to make a single totalizer adding machine. In order to do this one of the totalizers is disabled, preferably the upper one. The control levers 464 and 465 are discarded and the pitman 387 is connected directly to the stud 466—L of the lower totalizer, a pitman of the shape shown in Fig. 11 being used in such event. In practice it is found more convenient to assemble some of the totalizer sections as duplex sections and others as single totalizer sections which are the duplex sections with the upper totalizer omitted. When a duplex machine is wanted a duplex section is used and when a straight single counter machine is desired, a duplex section with only the lower totalizer in it is used.

It is to be understood that the structure shown is for purposes of illustration only and that variations may be made in it without departing from the spirit and scope of the invention as defined by the appended claims.

This application discloses numerous features not claimed herein, the same having been made the subject matter of divisional applications as follows:

Sectionalized construction, application Ser. No. 191,338, filed May 14, 1927.

Keyboard, application Serial No. 127,511, filed August 6, 1926.

Transfer mechanism, application Serial No. 127,509, filed August 6, 1926.

Duplex register features, application filed March 2, 1931.

Casing features, application filed March 2, 1931.

Other divisional applications have already issued as patents, to wit: No. 1,690,488, Nov. 6, 1928, Cushioning mechanism; No. 1,730,147, Oct. 1, 1929, Printing mechanism; No. 1,732,231, Oct. 22, 1929, Error key mechanism; No. 1,781,179, Nov. 11, 1930, Transfer mechanism; No. 1,781,689, Nov. 18, 1930, Driving mechanism.

I claim:

1. A calculating machine having an operating mechanism, driving means connected to said operating mechanism, means for conditioning the machine to perform certain operations, and means acting to automatically disconnect said operating mechanism from said driving means as the machine starts to operate when it has been misoperated in being conditioned for operation.

2. A calculating machine having an operating mechanism, driving means, connections between said driving means and said operating mechanism including an arm engaging a pivoted pawl, and means automatically tripping said pawl to disengage it from said arm to disconnect said operating mechanism from said driving means as the machine starts to operate when it has not been properly conditioned for operation.

3. A calculating machine having an operating mechanism including depressible keys, driving means for said operating mechanism, connections between said driving means and said operating mechanism, and means automatically disconnecting said connections as the machine starts to operate when one of the keys has been only partially depressed.

4. A calculating machine having an operating mechanism including amount keys and control keys, driving means for said operating mechanism, connections between said driving means and said operating mechanism, and means automatically disconnecting said connections as the machine starts to operate when an amount key and a control key are both depressed.

5. A calculating machine having depressible keys, latch plates for said keys, an operating mechanism, driving means for said operating mechanism, disconnectible connections between said driving means and said operating mechanism, and means controlled by said latch plates causing said operating mechanism to be automatically disconnected from said driving means as the machine starts to operate when the depressible keys have not been properly conditioned.

6. A calculating machine having an operating mechanism, means for conditioning the machine for addition or subtraction, driving means for said operating mechanism, connections between said driving means and said operating mechanism, and means automatically disconnecting said connections as the machine starts to operate when said means for conditioning the machine for addition or subtraction has not been properly conditioned.

7. A calculating machine having an operating mechanism, driving means therefor, means for conditioning the machine for addition or subtraction, control keys for controlling different functions of the machine, and means automatically disconnecting said operating mechanism from said driving means as the machine starts to operate when the conditioning means has been moved toward subtraction position with one of the control keys depressed.

8. A calculating machine having an operating mechanism, driving means therefor, means for conditioning the machine for addition or subtraction, a total key for conditioning the machine for obtaining a total, and means automatically disconnecting said operating mechanism from said driving means when the machine is operated when the conditioning means is moved toward subtraction position with the total key depressed.

9. A calculating machine having an operating mechanism, driving means therefor, means for conditioning the machine for addition or subtraction, control keys for controlling different functions of the machine, and means causing said operating mechanism to be automatically disconnected from said driving means as the machine starts to operate when one of the control keys has been depressed while said conditioning means is in subtraction position.

10. A calculating machine having an operating mechanism, driving means therefor, means for conditioning the machine for addition or subtraction, a total key for conditioning the machine for printing a total, and means automatically disconnecting said operating mechanism from said driving means as the machine starts to operate when said total key is depressed with said conditioning means in subtraction position.

11. A calculating machine having an operating mechanism, a driving means therefor, a safety device for automatically disconnecting said operating mechanism from said driving means, a subtraction lever adapted to occupy an addition or a subtraction position, said subtraction lever having connections to said safety device for causing the latter to operate to automatically disconnect the operating mechanism from the driving means as the machine starts to operate when the subtraction lever is in an intermediate position between its addition and subtraction positions, control keys, and connections operated by depression of a control key for moving said subtraction lever, when it is in subtraction position, to an intermediate position.

12. A calculating machine having an operating mechanism, a manually operable driving means therefor, an electrically operated driving means therefor, connections between said manually operable driving means and said operating mechanism which are normally in connected position, connections between said electrically operated driving means and said operating mechanism which are normally in disconnected position, means for starting said electrically operated driving means and for simultaneously connecting said means to said operating mechanism, means for conditioning the machine to perform certain operations, and means automatically disconnecting both of said driving means from said operating mechanism as the machine starts to operate under the driving action of said electric driving means when said machine has not been properly conditioned for operation.

13. A calculating machine having an operating mechanism, driving means connected to said operating mechanism, disconnecting means normally in position to automatically disconnect said operating mechanism from said driving means as the machine starts to operate, and means acting automatically to move said disconnecting means out of disconnecting position as the machine starts to operate when it is properly conditioned for operation.

14. A calculating machine having an operating mechanism, a driving means for actuating the same, disconnectible connections between said operating mechanism and said driving means, a control means normally holding said connections in position to disconnect said operating mechanism from said driving means, and means controlled by said operating mechanism as it starts to operate normally causing movement of said control means to move said connections out of disconnecting position.

15. A calculating machine having an operating mechanism, driving means therefor, disconnectible connections between said driving means and said operating mechanism including an arm engaging a pivoted pawl, tripping means normally in the path of said pawl for moving it to disengage it from said arm, and means governed by said operating mechanism for moving said tripping means out of the path of said pawl as the machine starts to operate when it is properly conditioned for operation.

16. A calculating machine having an operating mechanism, a driving means therefor, depressible keys, a safety device normally positioned to disable said driving means from driving said operating mechanism but movable to a position to enable said driving means, and connections controlled by said keys preventing said safety device from moving to a position to enable said driving means when a key is only partially depressed.

17. A calculating machine having an operating mechanism, a driving means therefor, depressible amount keys, depressible control keys, a safety device normally positioned to disable said driving means from driving said operating mechanism but movable to a position to enable said driving means, and connections controlled by said amount keys and said control keys preventing said safety device from moving to a position to enable said driving means when an attempt is made to operate the machine with an amount key and a control key depressed.

18. A calculating machine having an operating mechanism, a driving means therefor, a calculating mechanism, means for conditioning said calculating mechanism to perform certain calculating operations, a safety device normally conditioned to disable said driving means from driving said operating mechanism but movable to a position to enable said driving means to operate said mechanism, and connections controlled by said conditioning means preventing said safety device from moving to a position to enable said driving means when said conditioning means has not been properly conditioned.

19. A calculating machine having an operating mechanism, a driving means therefor, conditioning means for conditioning the machine to perform certain functions, a safety device normally held by said operating mechanism in active position to automatically disconnect said operating mechanism from said driving means as the machine starts to operate, means urging said safety device away from its active position, said operating mechanism releasing said safety device for movement to inactive position as the machine starts to operate, and connections controlled by said conditioning means preventing said safety device from moving out of its active position as the machine starts to operate when said conditioning means has not been properly conditioned.

20. A calculating machine having an operating mechanism, a driving means therefor, a subtraction conditioning means, a safety device normally positioned to disable said driving means from driving said operating mechanism but movable, as the machine starts to operate, to a position to enable said driving means, and connections controlled by said substraction conditioning means preventing said safety device from moving to a position to enable said driving means as the machine starts to operate when said subtraction conditioning means is not properly conditioned.

21. A calculating machine having an operating mechanism, driving means therefor, a safety device normally in position to prevent operation of said mechanism, means normally moving said safety device to a non-operating position as the machine starts to operate, a member movable from one position to another to condition the machine for addition or subtraction, and means associated with said member preventing said safety device from being moved to non-operating position as the machine starts to operate when said member has not been properly positioned to condition the machine for addition or subtraction.

22. A calculating machine having an operating mechanism, driving means disconnectibly connected to said mechanism, a safety device acting to automatically disconnect said operating mechanism from said driving means as the machine starts to operate when not properly conditioned for operation, banks of depressible keys, latches for holding the keys in depressed position connected to said safety device, and means for returning the safety device beyond its normal position when said operating mechanism is disconnected from the driving means to thereby release all the keys that have been depressed.

23. A calculating machine having an operating mechanism, driving means disconnectibly connected to said mechanism, means for returning said operating mechanism to normal position when moved therefrom by said driving means, a safety device acting to automatically disconnect said operating mechanism from said driving means as the machine starts to operate when not properly conditioned for operation, banks of depressible keys, latches for holding the keys in depressed position, said latches being governed by said safety device, and means operated by said operating mechanism during its return to normal position after it has been disconnected for moving said safety device beyond normal position to release the keys that have been depressed.

24. A calculating machine having an operating mechanism, means urging said mechanism to a normal position, driving means disconnectibly connected to said mechanism, means for conditioning the machine to perform certain functions when operated, and means automatically disconnecting said operating mechanism from said driving means as the machine starts to operate when it has not been properly conditioned for operation, said operating mechanism including devices for automatically returning said conditioning means to normal position when the operating mechanism is returned to normal after it has been disconnected.

25. A calculating machine having an operating mechanism, means for urging said mechanism to a normal position, driving means disconnectibly connected to said mechanism, amount keys, control keys, and means disconnecting said driving means from said operating mechanism as the machine starts to operate when an amount key and a control key are both depressed, said urging means serving to return said operating mechanism to normal position and said operating mechanism serving to return the depressed control keys and amount keys to normal.

26. A calculating machine having an operating mechanism, a driving means for actuating said mechanism, a safety device for preventing said driving means from actuating said mechanism under certain conditions, and means controlled by said operating mechanism acting to move said safety device to a non-effective position as the operating mechanism starts to operate with the machine properly conditioned for operation, said operating mechanism including portions acting to return said safety device to effective position as operation of the machine is completed.

27. A calculating machine having an operating mechanism, a driving means for actuating said mechanism, a safety device for preventing operation of said mechanism by said driving means under certain conditions, said safety device being normally urged toward a position for permitting such operation, means for holding said safety device in position to prevent operation of said operating mechanism, and means for releasing said holding means as the operating mechanism starts to operate and for returning said holding means to normal position during the completion of the operation of said mechanism.

28. A calculating machine provided with an operating mechanism having a forward and a return stroke of movement, a safety device for preventing operation of said mechanism under certain conditions, means urging said device toward a position to permit operation of the machine, a driving unit, and a sliding member between said driving unit and said safety device normally preventing said safety device from moving to a position to permit operation of the machine, said sliding member being released by movement of said driving unit to permit movement of the safety device and being returned by said driving unit to return the safety device to normal position.

29. A calculating machine having an operating mechanism, a pivoted control rod having connections associated with it for preventing operation of the machine under certain conditions, means normally urging said rod toward a position permitting operation of the machine, a driving unit, a member responsive to movement of said driving unit having a shoulder in engagement with said control rod to normally prevent the latter moving to a position to permit operation of the machine, and a second shoulder on said control member for engaging said control rod on the return movement of the driving unit to return said rod past its normal position.

30. A calculating machine having an operating mechanism, a driving unit, a control device, and a member having a pivotal and a sliding movement and two shoulders for engaging said control device, said member being normally held with one of its shoulders in engagement with said control device but being released as the machine is operated, and means for swinging the member on its pivot as the machine is operated to bring its other shoulder in position to return said control device past normal as said driving unit returns to normal position.

31. A calculating machine having an operating mechanism, a safety device preventing operation of said mechanism under certain conditions, means urging said device toward a position to permit operation of the machine, a driving unit having a forward and a return stroke of movement, a member engaged by said driving unit and having a shoulder engaging said safety device, said member having a second shoulder which is moved into position to engage said safety device upon the return stroke of said driving unit to cause said safety device to be moved beyond its normal position.

32. A calculating machine having an operating mechanism, devices adapted to be moved from a normal to an operated position and to be restored to normal by being returned past their normal position, a control rod for holding said devices in normal position, a holding means for maintaining said control rod in normal position, said holding means having connections with the operating mechanism by means of which the holding means is released as the operating mechanism is operated and is returned as said mechanism completes its operation, and means for automatically changing the character of the connection between the control rod and said holding means when the latter is released so that, when said holding means is returned by the operating mechanism, said control rod will be moved past normal and then automatically released to return to normal.

33. A calculating machine having an operating mechanism, banks of depressible keys, latches for holding said keys in depressed position, a safety device for preventing operation of the operating mechanism as it starts to operate when the machine has not been properly conditioned for operation, connections between said latches and said safety device for controlling the latter by the former, and means for moving the safety device past its normal position at the end of an operation of the machine to release the keys that have been depressed.

34. A calculating machine having an operating mechanism, driving means therefor, a safety device for preventing operation of said operating mechanism under certain conditions, banks of depressible keys, latches for holding said keys depressed, said latches being connected to said safety device, releasing means governed by said operating mechanism for releasing said safety device as the machine starts to operate and for momentarily returning it beyond its normal position at the end of the operation of the machine to move said latches to release the keys that have been depressed, and means governed by a control key for preventing said releasing means from returning said safety device beyond normal position.

35. A calculating machine having an operating mechanism, a control rod normally urged in one direction and serving to control certain parts of the machine which are adapted to be moved from a normal to an operated position and to be restored by being returned past normal, a holding member having a shoulder engaging said control rod to normally prevent movement thereof, said holding member being slidably and pivotally mounted and being released by movement of said operating mechanism, means for retracting the holding member and turning it on its pivot to position a second shoulder for contact with said control rod, and connections between said operating mechanism and said holding member serving to return said holding member while said second shoulder is in engagement with said control rod to move the latter past normal position and subsequently turn said holding member about its pivot to permit said control rod to move into engagement with said first shoulder to thereby return to normal.

36. A calculating machine having an operating mechanism, a control rod normally urged in one direction and serving to control the operation of certain parts of the machine which are adapted to be moved from a normal to an operated position and to be restored by being returned past normal, a holding member having a shoulder for engaging said control rod to prevent movement thereof, said holding member being slidably and pivotally mounted and being released by operation of said operating mechanism, means for retracting said holding member and turning it about its pivot to present a second shoulder for operative contact with said control rod so that when said holding member is returned by said operating mechanism said second shoulder will return the control rod past normal position, and means operated by a control key for preventing said holding member from turning about its pivot when released by the operating mechanism to prevent engagement of the second shoulder with the control rod and thereby prevent the control rod from being returned past normal position.

37. A calculating machine having an operating mechanism, driving means therefor, banks of depressible keys, and latches for holding said keys in depressed position, a safety device for preventing operation of the machine by said driving means while leaving the operating means free to operate, said latches being connected to the safety device so that, when a key is only partly depressed, the limited movement of its latch will render said safety device active to prevent operation of the machine while leaving said operating means free to operate.

38. In a calculating machine having operating mechanism, a driving means disconnectibly connected to said operating mechanism, banks of depressible keys, and latches for holding said keys depressed; a safety device for automatically disconnecting said driving means from said operating mechanism, and connections between said latches and said safety device so that the limited movement of a latch, when a key is only partly depressed, renders said safety device effective to automatically disconnect the driving means from the operating mechanism.

39. In a calculating machine having operating mechanism, driving means therefor, banks of depressible keys, and latches for holding said keys in depressed position; a safety device for preventing operation of the machine by said driving means while leaving said operating means free to operate, said safety device being movable from effective to ineffective position and returned in each normal operation of the machine, said latches being connected to said safety device so that the limited movement of a latch when a key is only partially depressed will prevent said safety device from being moved to ineffective position as the machine starts to operate to thereby prevent operation of the mechanism.

40. In a calculating machine having operating mechanism, a driving means disconnectibly connected to said operating means, banks of depressible amount keys, latches for holding said keys in depressed position, and control keys; a safety device for automatically disconnecting said operating mechanism from said driving means, connections between said key latches and said safety device conditioned by depression of a control key so that, when both an amount key and a control key are depressed and the machine operated, the operating mechanism is automatically disconnected from the driving means as the machine starts to operate.

41. In a calculating machine having an operating mechanism, banks of depressible amount keys, control keys, and latches for holding said keys in depressed position; a safety device for preventing operation of said operating mechanism, and means connected with said safety device and governed by said control keys and cooperating with said amount key latches for rendering said safety device effective to prevent operation of the mechanism when the machine starts to operate with an amount key and a control key depressed.

42. In a calculating machine having operating mechanism, a driving means disconnectibly connected to said operating mechanism, banks of depressible amount keys, control keys, and latches for holding the keys in depressed position; a safety device for automatically disconnecting said driving means from said operating mechanism, means connected with said safety device and governed by said control keys and cooperating with said amount key latches for conditioning the safety device to automatically disconnect said driving means from said operating mechanism as the machine starts to operate when both a control key and an amount key are depressed.

43. The combination in a calculating machine having an operating mechanism, a driving means disconnectibly connected to said operating mechanism, banks of depressible keys, and latches for latching the keys in depressed position, each of said keys serving, when depressed, to arrest movement of its latch, and control keys; of a safety device for automatically disconnecting said operating mechanism from said driving means, and arresting means for said safety device operatively related with said latches and said control keys so that, when the machine is operated with a control key and an amount key depressed, said arresting means engages the latch of the amount key that has been depressed to arrest said arresting means to cause it to cause said safety device to disconnect said operating mechanism from said driving means.

44. The combination in a calculating machine having an operating mechanism, a driving means disconnectibly connected to said operating mechanism, banks of depressible amount keys, and latches for latching said keys in depressed position, each of said keys serving, when depressed, to arrest movement of its latch; of a safety device for automatically disconnecting said operating mechanism from said driving means, an arresting means movable with said safety device, a bail for moving the key latches, said bail being movable by said arresting means but being normally disconnected therefrom, and control keys which, when depressed, act to connect said arresting means to said bail to cause said arresting means to move the latches as the machine starts to operate whereby, if an amount key is depressed, it will limit movement of its latch to limit movement of the bail and the arresting means to thereby cause said safety device to disconnect the operating mechanism from the driving means.

45. A calculating machine having an operating mechanism, a driving means disconnectibly connected to said operating mechanism, actuators, zero stops adapted to be positioned, under predetermined conditions, to limit the movement of the actuators, and means controlled by said zero stops for automatically disconnecting said operating mechanism from said driving means as the machine starts to operate when the zero stops are not properly positioned.

46. In a calculating machine having operating mechanism, a driving means disconnectibly connected to said operating mechanism, actuators, zero stops for the actuators, banks of depressible keys, and latches for holding said keys in depressed position; a safety device for automatically disconnecting said operating mechanism from said driving means, said latches being connected through said zero stops to said safety device to enable said latches to control said safety device to cause the latter to automatically disconnect the operating mechanism from the driving means as the machine starts to operate when a key has been only partially depressed.

47. In a calculating machine having operating mechanism, a driving means disconnectibly connected to said operating mechanism, actuator banks of depressible keys and latches for holding the keys in depressed position; zero stop members connected to said latches, connections for automatically disconnecting said operating mechanism from said driving means, and a control means for controlling said connections, said control means also controlling said zero stops and, through them, the latches, said latches, in turn, controlling said control means through said zero stops to thereby govern said connections for automatically disconnecting the operating mechanism from the driving means.

48. In a calculating machine having operating mechanism, actuators, banks of depressible keys, and latches for holding the keys in depressed position; zero stop members connected to the latches, connections for preventing operation of the machine, and a control means for controlling said connections, said control means also controlling the zero stops and, through said stops, the latches, said latches, in turn, controlling the control means through the zero stops to thereby govern the connections for preventing operation of the machine.

49. A calculating machine having an operating mechanism urged toward a normal position, a power driving means therefor, disconnectible connections between said driving means and said operating mechanism, controlling means for said driving means, means automatically disconnecting said operating mechanism from said driving means as the machine starts to operate when it has not been properly conditioned for operation, and means automatically moving said controlling means to position to stop said driving means as the machine returns to normal after being disconnected.

50. A calculating machine having an operating mechanism urged toward a normal position, a power driving means, disconnectible connections between said driving means and said operating mechanism, controlling means for said driving means, means automatically disconnecting said operating mechanism from said driving means as the machine starts to operate when it has not been properly conditioned for operation, and means operated by said operating mechanism as it returns to normal after being disconnected for moving said controlling means to position to stop said driving means.

51. A calculating machine having an operating mechanism urged toward a normal position, an electric motor for driving the same, disconnectible connections between said motor and said operating mechanism, a switch adapted to be closed to start the motor, means for automatically disconnecting said operating mechanism from said motor as the machine starts to operate when it has not been properly conditioned for operation, and means automatically opening said switch as the machine returns to normal after being disconnected.

52. A calculating machine having an operating mechanism urged toward a normal position, an electric motor, disconnectible connections between said motor and said operating mechanism, an electric switch adapted to be closed to start the motor, means for automatically disconnecting said operating mechanism from said motor as the machine starts to operate when it has not been properly conditioned for operation, and means operated by said operating mechanism as it return stroke of movement, an electric motor for opening said switch.

53. A calculating machine having an operating mechanism urged toward a normal position, an electric motor for driving the same, disconnectible driving connections between said motor and said operating mechanism, an electric switch for the motor, an operating member for closing said switch and for conditioning said driving connections to connect the operating mechanism to the motor, means for automatically disconnecting said operating mechanism from said driving means as the machine starts to operate when it has not been properly conditioned for operation, and means operated by said operating mechanism as it returns to normal after being disconnected acting to move said operating member to open the switch and to permit said driving connections to remain in disconnected condition.

54. A calculating machine having an operating mechanism having a forward and a return stroke of movement, an electric motor for driving the same, disconnectible connections urged toward a position to connect said operating mechanism to the motor, a latch for restraining said connections, a switch for the motor, an operating member for closing said switch and for releasing said latch and holding it in position to permit said disconnectible connections to move to connecting position, said latch being carried by said operating mechanism so that, as said operating mechanism moves, the latch is removed from the control of the operating member, means for automatically disconnecting the operating mechanism from the driving means as the machine starts to operate when it has not been properly conditioned for operation, and means operated by said operating mechanism as it returns to normal after being disconnected for restoring said operating member to thereby open the switch and prevent the latch from being tripped as the operating mechanism restores to normal.

55. A calculating machine having a plurality of banks of depressible amount keys, a sliding stop bar for each bank, said stop bars being released by operation of the machine to move into engagement with stops set by depression of keys in their respective banks, a pivoted zero stop for each stop bar adapted to be positioned to prevent movement of its respective bar but normally positioned to permit it to move, and means for moving all the zero stops for banks in which no keys have been depressed into position to engage their respective stop bars when said bars are released to thereby prevent movement of the stop bars in banks in which no keys are depressed.

56. A calculating machine having a plurality of banks of depressible amount keys, a stop bar for each bank, said stop bars being released by operation of the machine for movement against stops set by depression of amount keys in their respective banks, a zero stop for each stop bar, said zero stops being normally positioned to permit movement of the stop bars, means for moving the zero stops into position to prevent movement of the stop bars when they are released, and means operated by the setting of the key stops for preventing the zero stops for the banks in which key stops have been set from moving to position to prevent movement of their stop bars.

57. In a calculating machine having a series of stop bars released by operation of the machine for movement against key stops positioned by keys on the machine, banks of depressible keys, and a latch for each key bank normally urged toward a position for latching a depressed key in depressed position; a zero stop member for each key bank connected directly to the latch for said bank and adapted to move to a position to arrest the stop bar for said bank, control means for normally holding the zero stop members against movement to arresting position, and means for moving the control means to release the zero stop members as the machine is operated.

58. The combination in a calculating machine having a series of stop bars released by operation of the machine for movement against stops positioned by keys on the machine, and banks of depressible keys; of a slidable latch for each bank of keys for latching a depressed key in depressed position, pivoted zero stop members connected directly to the latches and having projections movable into the path of the stop bars for arresting the latter, a control rod for normally holding the zero stop members against movement to arresting position, and means for moving the control rod to release the zero stop members as the machine is operated.

59. In a calculating machine having a series of stop bars released by operation of the machine for movement against key stops positioned by keys on the machine, banks of depressible keys, and a latch for each key bank normally urged in a direction to latch a depressed key in depressed position; a zero stop member for each key bank connected directly to the latch for said bank and adapted to move to a position to arrest the stop bar for said bank, control means for normally holding the zero stop members against movement to arresting position, and means for moving the control means to release the zero stop members as the machine is operated, said keys and latches having coacting parts which limit the movement of a latch when a key in its bank is depressed to thereby prevent its zero stop from moving to arresting position when released by operation of the machine.

60. The combination in a calculating machine having a series of stop bars released by operation of the machine for movement against key stops positioned by keys on the machine, banks of depressible keys, and a latch for each key bank urged toward latching position; of a zero stop member for each key bank connected directly to the latch for its key bank so as to be movable by the latch to a position to arrest the stop bar for said bank, control means for holding the zero stop members against movement to position to arrest the stop bars, means acting during operation of the machine to move the control means to release the zero stop members as the machine is operated, and control keys and connections for preventing the latches from moving to permit the zero stops to move to arresting position when the machine is operated with one of the control keys depressed.

61. The combination in a calculating machine having a series of stop bars released by operation of the machine for movement against key stops positioned by keys on the machine, banks of depressible keys, and a latch for each key bank urged toward latching position; of a zero stop member for each key bank connected directly to the latch for its bank so as to be movable by the latch to a position to arrest the stop bar for said bank, control means for holding the zero stop members against movement to position to arrest the stop bars, means acting during operation of the machine to move the control means to release the zero stops, and means governed by control keys and acting directly on all the latches to limit their movement to thereby prevent the zero stops from moving to arresting position when the machine is operated with one of the control keys depressed.

62. The combination in a calculating machine having a series of stop bars released by operation of the machine for movement against key stops positioned by keys on the machine, and banks of depressible keys; of a latch for each bank normally urged to move past a latching to a locking position, a zero stop member for each key bank connected directly to the latch for its bank for movement by the latch to a position to arrest the stop bar for said bank, control means for detaining the latches in latching position and preventing movement of the zero stops to arresting position, and means for moving the control means during operation of the machine to release the latches for movement to locking position and to release the zero stop members to permit them to move to arresting position.

63. The combination in a calculating machine having a series of stop bars released by operation of the machine for movement against key stops positioned by keys on the machine, and banks of depressible keys; of a latch for each bank normally urged to move past a latching to a locking position and released for movement to locking position by operation of the machine, and a zero stop member for each key bank having a portion adapted to be positioned in the path of the stop bar for said bank, said zero stops being connected directly to their respective latches so as to be moved by the latches to arresting position as the latter move to locking position.

64. The combination in a calculating machine having a series of stop bars released by operation of the machine for movement against key stops positioned by keys on the machine, and banks of depressible keys; of a latch for each bank normally urged to move past a latching to a locking position and released for movement to locking position by operation of the machine, and a zero stop member for each key bank having a portion adapted to be positioned in the path of movement of the stop bar for said bank, said zero stops being directly connected to their respective latches to be moved by the latter to arresting position when the latches are moved to locking position, said keys and latches having cooperating portions for causing a depressed key to limit the locking movement of its latch to prevent the zero stop for its bank from moving to arresting position as the machine is operated.

65. The combination in a calculating machine having a series of stop bars released by operation of the machine for movement against key stops positioned by keys on the machine, and banks of depressible keys; of a slidable latch for each bank of keys for latching a depressed key in depressed position, a pivoted zero stop for each key bank connected directly to its latch, each zero stop being provided with a projecting arm adapted to be moved into the path of its stop bar, a control rod for normally holding the zero stop members against movement to arresting position, means for moving the control rod to release the zero stop members as the machine is operated, and a member movable transversely of the latch plates by a control key on the machine for limiting the movement of the latches to prevent the zero stop members from moving to arresting position when released by the control rod when the control key is operated.

66. The combination in a calculating machine having a series of stop bars released by operation of the machine for movement against key stops positioned by keys on the machine, banks of depressible keys, and a latch for each key bank for latching a depressed key in depressed position; of a zero stop member for each key bank connected directly to the latch for said key bank and adapted to be moved to a position to arrest the stop bar for said bank, control means for normally holding the zero stop members against movement to arresting position but released by operation of the machine, and means for returning said control means past its normal position during the latter part of the operation of the machine to thereby move the latches to release depressed keys.

67. The combination in a calculating machine of a series of slidable stop bars released by operation of the machine for movement against key stops positioned by keys on the machine, banks of depressible keys, a slidable latch for each key bank for latching a depressed key in depressed position, a pivoted zero stop for each key bank connected directly to the latch for said bank and adapted to be moved to a position to arrest the stop bar for said bank, a control rod normally holding the zero stop members against movement to arresting position but released by operation of the machine for permitting them to move, and means for returning the control rod past its normal position during the latter part of the operation of the machine for moving the zero stops to move the latches to release depressed keys.

68. The combination in a calculating machine having actuator racks of a counter comprising pinions movable into and out of engagement with said racks, a stop device movable to and from the racks with the counter for stopping the counter pinions at zero position when they are rotated to take a total, said stop device being normally held out of active position, and means positioned by a total key for engaging the stop device as it moves with the counter toward the actuator racks to move the stop device to position to stop the pinions.

69. The combination in a calculating machine having actuator racks of a counter comprising pinions movable into and out of engagement with said racks, trip pawls set by transfer projections on the pinions, a locking plate movable to and from the racks with the counter for locking the pawls to cause them to act as stops for stopping the pinions at zero position in the taking of a total, means normally urging said locking plate to inactive position, and means set by a total key in the path of a portion of said locking plate so that when said counter is moved toward the racks the locking plate engages said means and is moved to a position to lock the pawls.

70. In a calculating machine having a plurality of actuator racks, a counter having a plurality of pinions movable into and out of engagement with said racks, and a total-taking means; a transfer mechanism for said counter including a tripping pawl for each counter pinion adapted to be engaged by a tripping projection on its pinion, a locking means for said pawls movable with said counter as it moves into and out of engagement with said racks, and means adapted to be set by said total-taking means for engaging said locking means as the counter moves into engagement with the racks to thereby move the locking means to locking position to cause the pawls to act as stops for the counter pinions.

71. In a calculating machine having actuator racks, a counter having counter pinions carried by a frame which is movable to move the counter into and out of engagement with said racks, and a total key and connections for taking a total; a transfer mechanism for said counter including a tripping pawl for each counter pinion adapted to be engaged by a tripping projection on its pinion, a pivoted locking plate carried by said counter frame, and connections adapted to be set by said total key for engaging the locking plate as the counter frame moves to move the counter into engagement with the racks to thereby turn the locking plate to locking position to lock the pawls in position to cause them to act as stops for the counter pinions.

72. A calculating machine having two spaced frame plates supporting the main operating mechanism of the machine including actuator segments, and a keyboard on top of the side plates projecting over one of them to a substantial distance to one side, certain of said actuator segments having arms projecting through an opening in one of the frame plates and carrying stop bars on the outside of said frame plate to cooperate with the projecting portion of the keyboard.

73. The combination in a calculating machine of an oscillating drive plate carrying two studs and having a forward and a return stroke of movement, a pitman connected at one end to a movable counter, the other end of said pitman having divided arms one of which carries a pawl for normally engaging one of said studs at the beginning of the return stroke of said drive plate to move the pitman in one direction, the other of said arms having a hook for engaging the other stud at the end of the return movement of the drive plate to move the pitman in the opposite direction, a normally inactive pawl carried by said second arm, a hook member carried by said pitman, and means operated by depression of a control key for moving the second pawl and the hook member to operative position and the first pawl to inoperative position.

74. The combination in a calculating machine of an oscillating drive plate carrying two studs and having a forward and a return stroke of movement, a pitman connected at one end to a movable counter, the other end of said pitman having spaced arms one of which carries a pawl for engaging the first of said studs on the drive plate at the beginning of its return movement to move the pitman in one direction, the other arm having a hook for engaging the second stud at the end of the return movement of the drive plate to move the pitman in the opposite direction, said second arm also carrying a pawl which is normally in inoperative position, and means operated by depression of a control key for moving said second pawl to operative position to cause it to engage said second stud at the beginning of the forward stroke of the drive plate, said means also moving the first pawl to inoperative position.

75. A keyboard unit for calculating machines comprising a key supporting structure, a shaft mounted at the front of said structure, a plurality of zero stops carried by said shaft, and a rod for controlling the operativeness of said calculating machine carried by arms pivoted to said shaft, said rod being positioned relative to said zero stops to control their operation and to be controlled by them.

In testimony whereof, I have subscribed my name.

ALLEN A. HORTON.

CERTIFICATE OF CORRECTION.

Patent No. 1,853,050. Granted April 12, 1932, to

ALLEN A. HORTON.

It is hereby certified that error appears in the printed specification of the above numbered patent requiring correction as follows: Page 34, line 79, claim 52, strike out the words "return stroke of movement, an electric motor" and insert instead returns to normal after being disconnected; and that the said Letters Patent should be read with this correction therein that the same may conform to the record of the case in the Patent Office.

Signed and sealed this 17th day of May, A. D. 1932.

M. J. Moore,
Acting Commissioner of Patents.

(Seal)